(12) United States Patent
Fukami et al.

(10) Patent No.: US 6,816,208 B2
(45) Date of Patent: Nov. 9, 2004

(54) LIQUID CRYSTAL DISPLAY DEVICE

(75) Inventors: Tetsuo Fukami, Osaka (JP); Katsuhiko Kumagawa, Osaka (JP); Masanori Kimura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 292 days.

(21) Appl. No.: 09/911,305

(22) Filed: Jul. 23, 2001

(65) Prior Publication Data

US 2002/0012077 A1 Jan. 31, 2002

(30) Foreign Application Priority Data

Jul. 24, 2000 (JP) ........................................ 2000-222274

(51) Int. Cl.[7] .................... G02F 1/1368; G02F 1/1343
(52) U.S. Cl. ............................ 349/39; 349/43; 349/38
(58) Field of Search ............................. 349/38, 39, 43, 349/139, 143

(56) References Cited

U.S. PATENT DOCUMENTS

| 6,028,650 A | 2/2000 | Kuroha et al. | |
| 2003/0063233 A1 * | 4/2003 | Takagi | 349/65 |

FOREIGN PATENT DOCUMENTS

| JP | 3-239229 | 10/1991 |
| JP | 10-39328 | 2/1998 |
| JP | 11-125840 | 5/1999 |

* cited by examiner

Primary Examiner—Kenneth Parker
Assistant Examiner—Tai Duong
(74) Attorney, Agent, or Firm—Merchant & Gould P.C.

(57) ABSTRACT

This is an active matrix liquid crystal display device comprising a capacitive accumulation portion formed by overlapping a pixel electrode, an insulating layer and a common electrode for each pixel area, and a non-electrode area in a part of the pixel area which is not covered with a pixel electrode, wherein a peripheral shape of said capacitive accumulation portion on a side contacting said non-electrode area is substantially the same between the respective pixels, and a value of a storage capacity in said capacitive accumulation portion differs on a feeding side and on a termination side, the value on the feeding side being larger than the value on the termination side. Thereby, a constant aperture ratio can be maintained by changing the storage capacity value for each pixel. Furthermore, by using a lateral electric field method liquid crystal display device, the storage capacity value can be changed while maintaining the aperture ratio of the pixel constant, and the electric fields applied to the liquid crystal layer in the display portion can be kept evenly. As a result, deterioration and unevenness of display characteristics do not occur. Moreover, even in the case of using a light shield film to improve contrast and so forth, a light shield film with a narrower width than that in a conventional configuration can be used, so that the aperture ratio does not drop drastically.

3 Claims, 39 Drawing Sheets

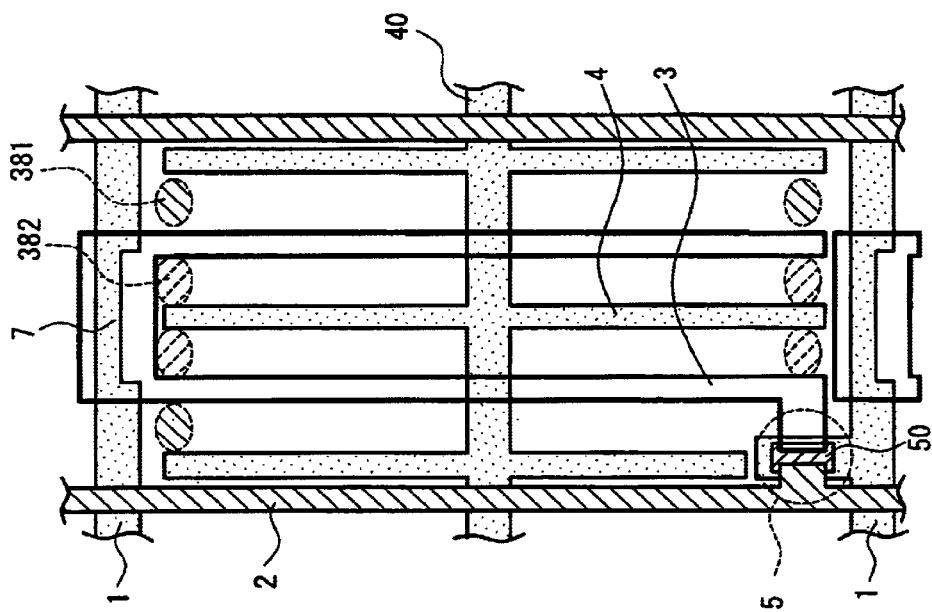
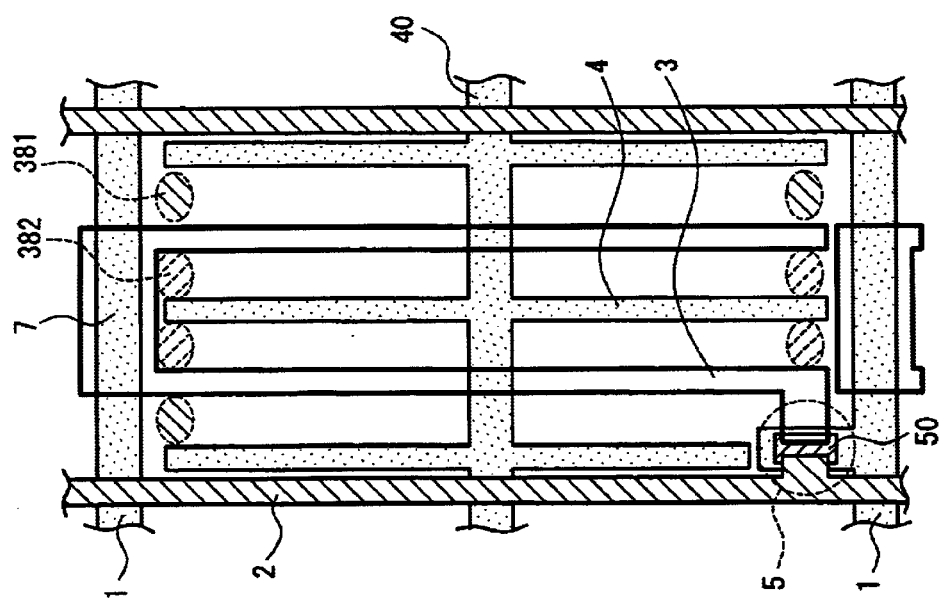

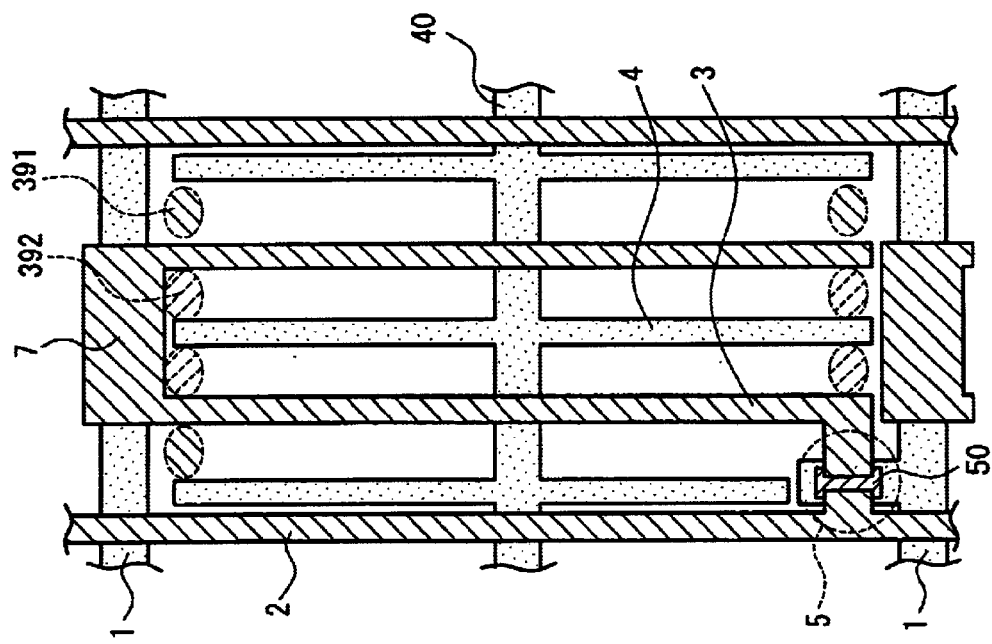
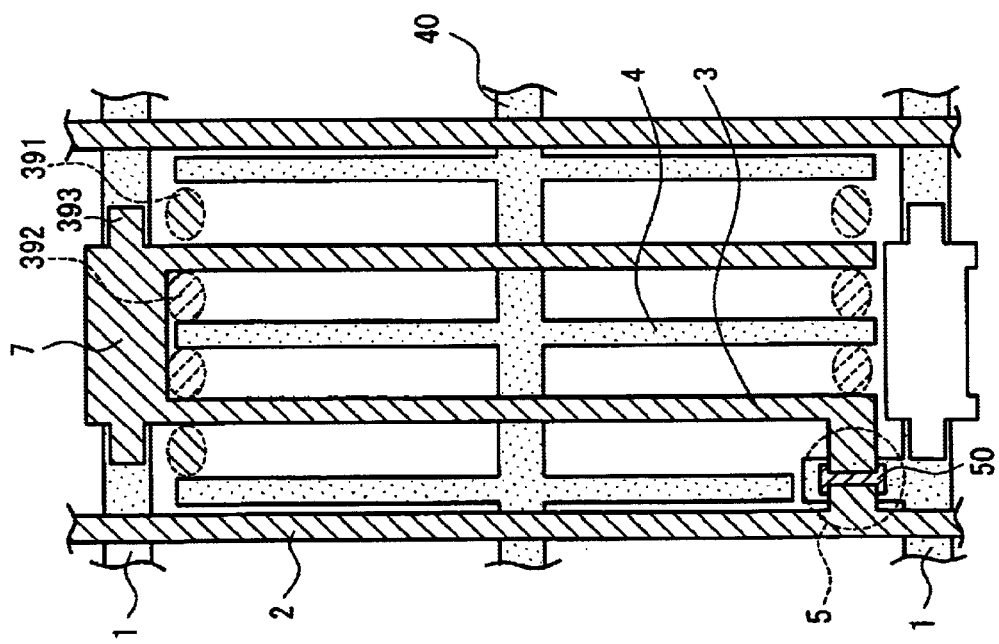
FIG. 21A
FIG. 21B

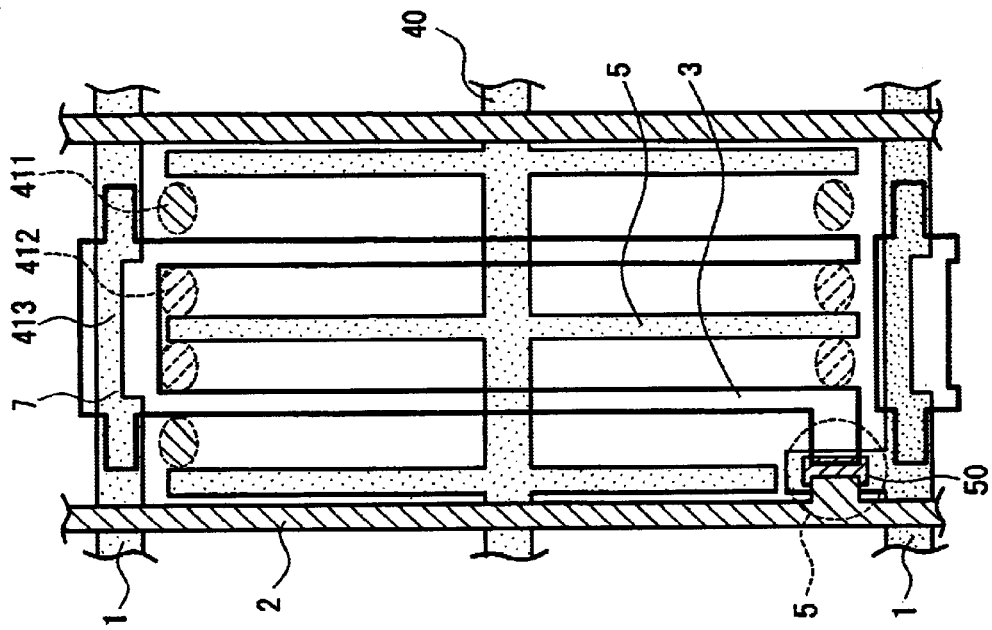
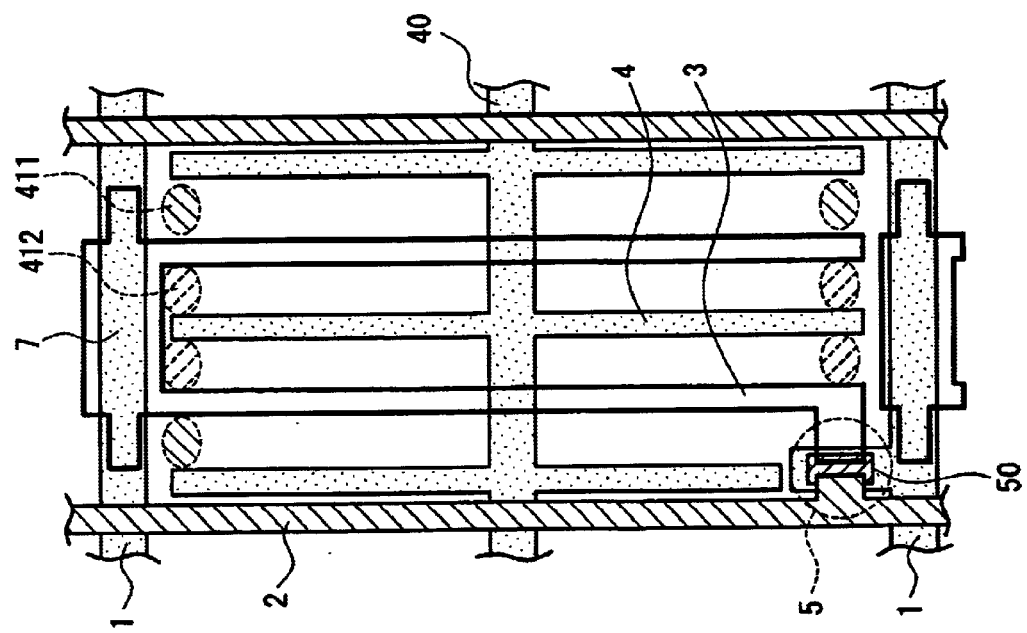

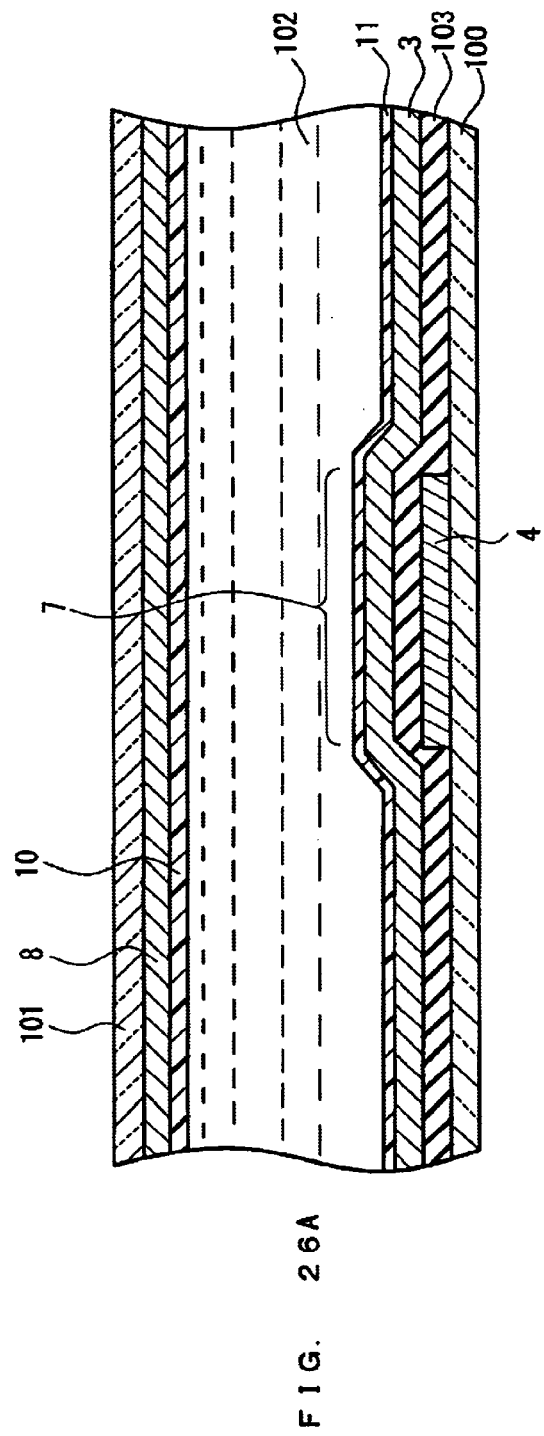
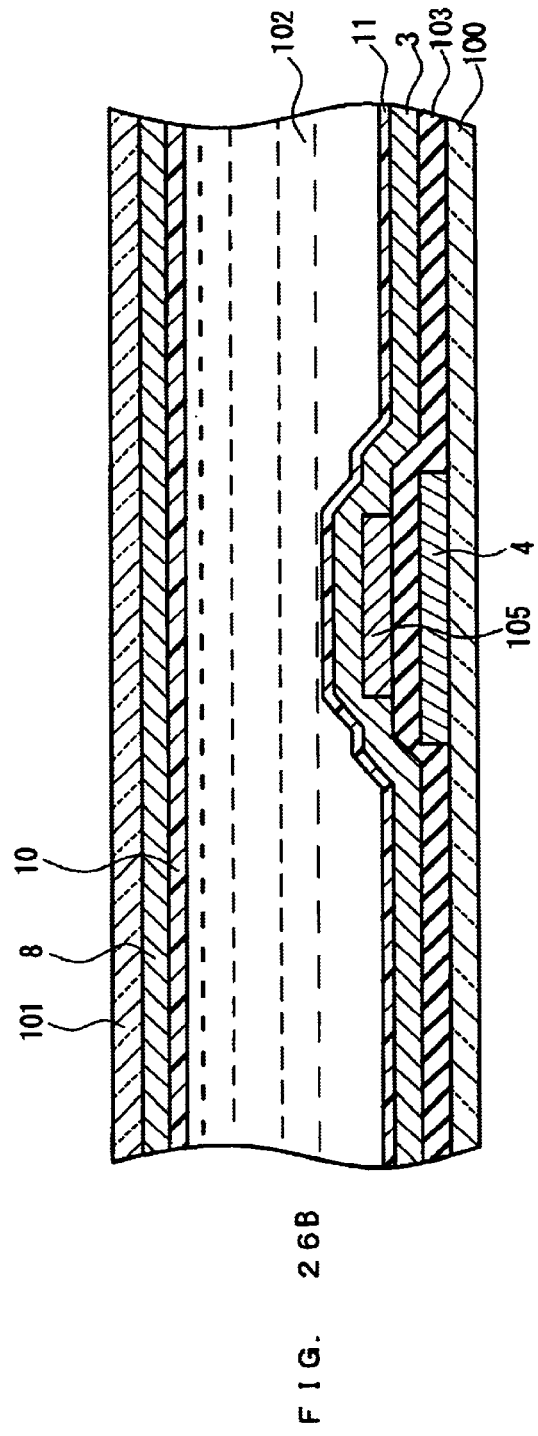
FIG. 26A
FIG. 26B

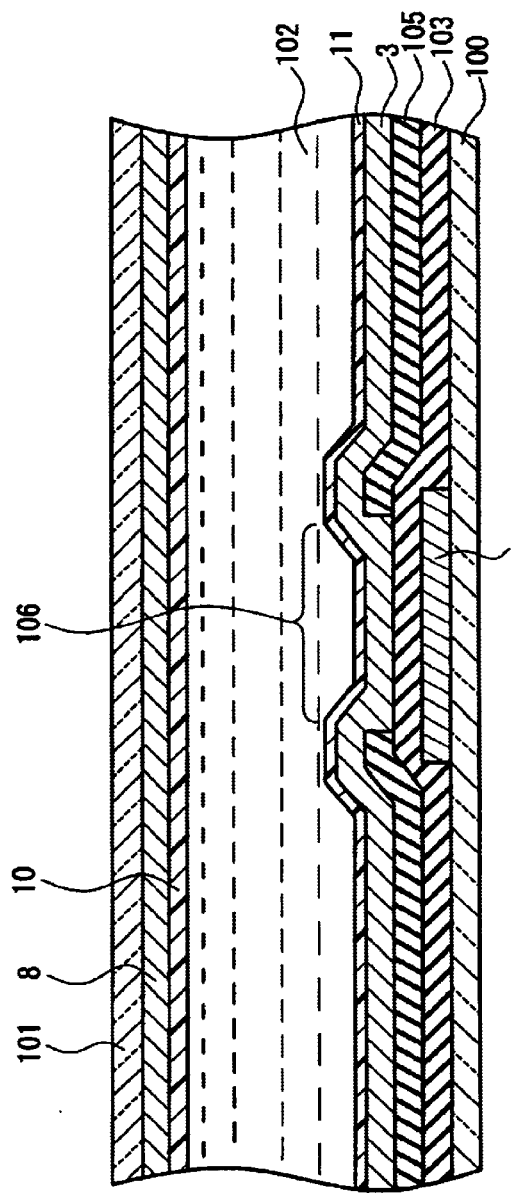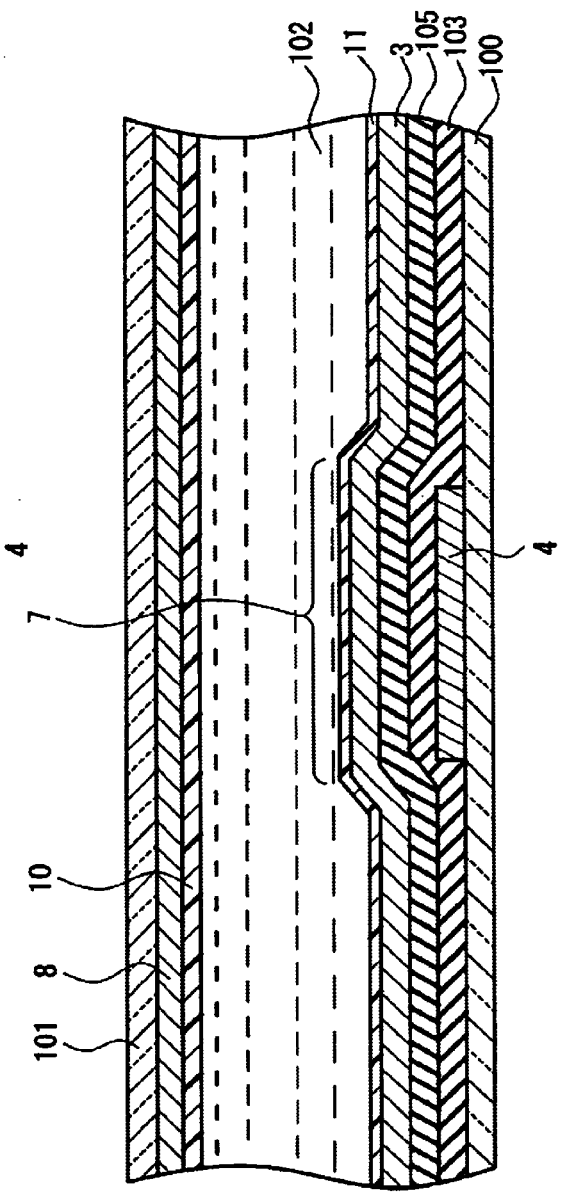
FIG. 28A
FIG. 28B

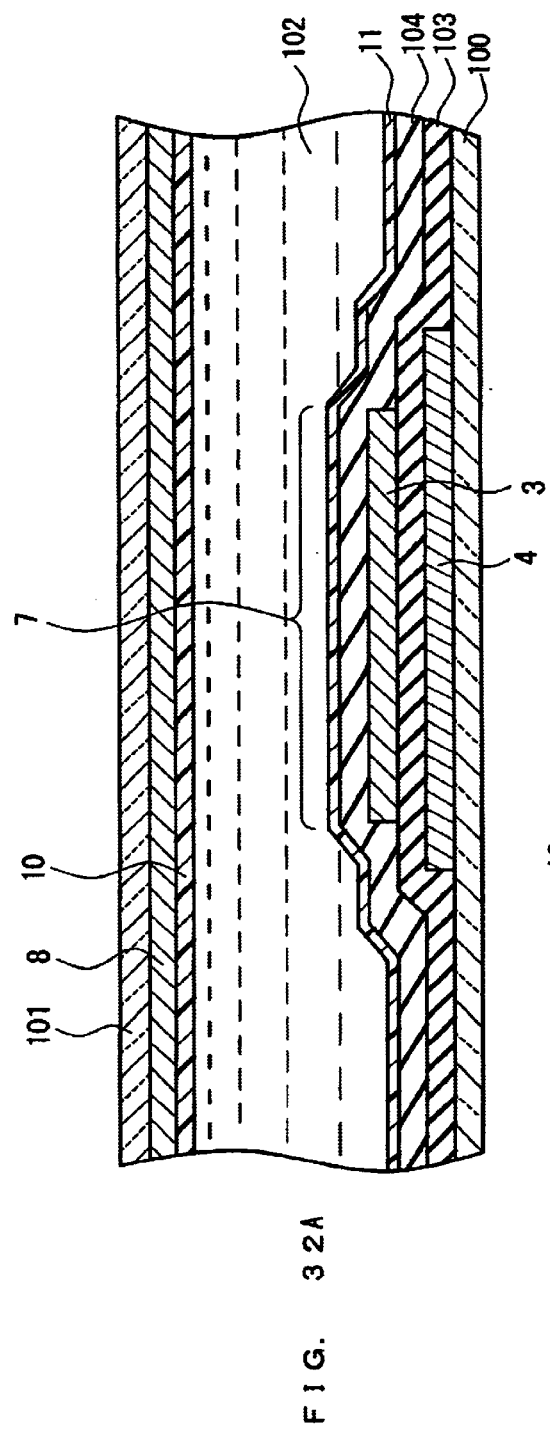
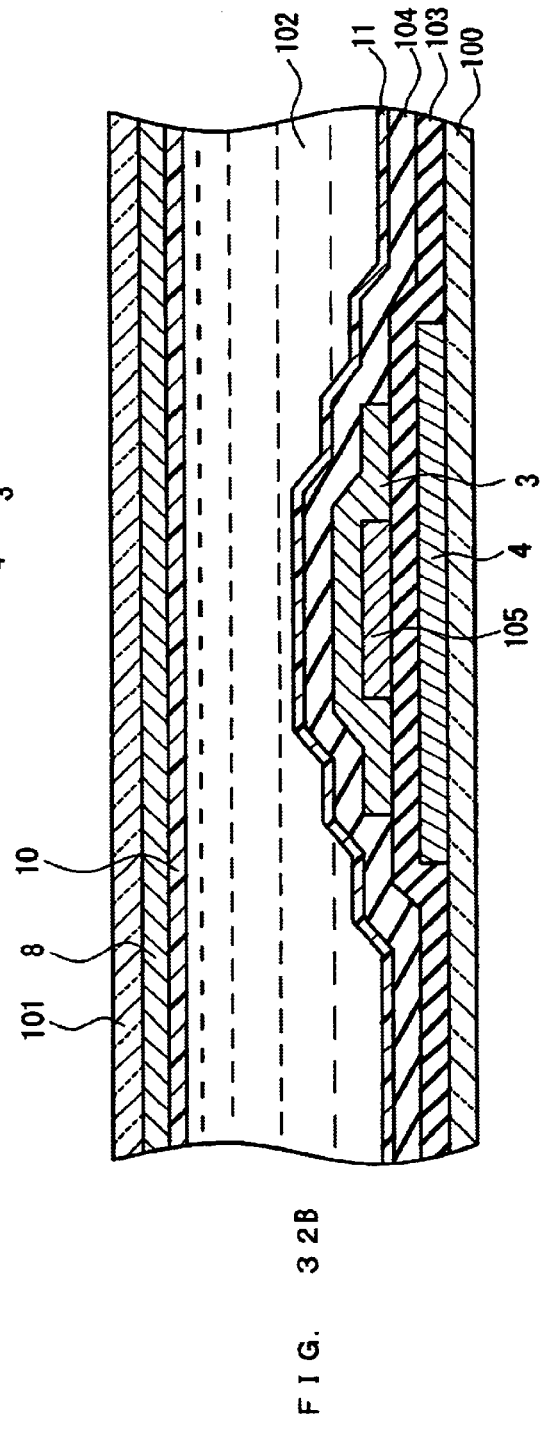
FIG. 32A
FIG. 32B

LIQUID CRYSTAL DISPLAY DEVICE

BACKGROUND OF THE INVENTION

1. Field of the Invention

The present invention relates to an active matrix liquid crystal display device.

2. Description of the Related Art

Along with the trend to develop a liquid crystal display device of a larger size and higher resolution, display unevenness has become a problem. This results from a distortion of the scanning voltage waveform caused by the time constant of scanning lines. In other words, the scanning voltage pulse is neither deformed nor broken at the feeding end of scanning wirings, but as it departs from the feeding end, a deformation or a collapse occurs in the waveform of the scanning voltage pulse. As a result thereof, a difference arises in the field-through-voltage to be applied to each pixel when the scanning pulse is at the trailing edge, and this difference remains as a direct current (DC) component of the liquid crystal applied voltage, so that flicker (flickering) is observed. Furthermore, this DC voltage component also causes problems such as a phenomenon of residual image or smear in the display.

The technique to solve the aforementioned problem by allowing this field-through-voltage to become equal within the screen is proposed in JP10(1998)-39328A. FIG. 36 and FIGS. 37A–37C show the configuration thereof. FIG. 36 is a plan view of a liquid crystal display device, wherein 211 is a liquid crystal panel, 212 is a driving circuit on the scanning side, and 213 is a driving circuit on the image signal side. FIGS. 37A–37C are enlarged views showing the pixel part in portions a, b and c of FIG. 36 respectively. With respect to the area of overlapping portions 210a–210c between an auxiliary capacity line 204 disposed under an interlayer insulating film and a pixel electrode 203, the part of the overlapping portion 210a is set to be larger than the part of the overlapping portion 210b, and the part of overlapping portion 210c is set to be smaller than the part of the overlapping portion 210b. As a result, as it departs from the feeding end of the scanning wirings, the storage capacity formed in the aforementioned overlapping portions is reduced, and thus, it is described that the difference in the field-through-voltage accompanied by a deformation or a collapse of the scanning voltage waveform can be eliminated. Moreover, by forming the auxiliary capacity line 204 with the use of a transparent electrode, it is described that the area of the light transmitting through the a portion, the b portion and the c portion can be made equal.

However, since a signal delay occurs when a resistance of the auxiliary capacity line is high, a metal film with a low resistance generally is used. Due to the fact that the metal film used here is an opaque body, a difference in the area of the common electrode leads to a difference in the aperture ratio for each pixel in such a configuration. When the difference in the aperture ratio is to be eliminated by a light shield film 205 as shown in FIGS. 38A–38C, a bonding margin of the substrates needs to be taken into consideration, so that the aperture ratio drops drastically.

Furthermore, when the aforementioned configuration is applied to a lateral electric field type (e.g., IPS-type: In-Plane Switching type) liquid crystal display device or the like, in which an area which is not covered with a pixel electrode is included in a part of the pixel, a change in the area of the capacitive accumulation portion disturbs the electric fields applied to the liquid crystal layer. As a result, problems such as deterioration of display characteristics or a difference in the display characteristics for each pixel occur.

SUMMARY OF THE INVENTION

To solve the aforementioned problems, an active matrix liquid crystal display device of the present invention is an active matrix liquid crystal display device comprising a capacitive accumulation portion formed by overlapping a pixel electrode, an insulating layer and a common electrode for each pixel area, and a non-electrode area in a part of the pixel area which is not covered with a pixel electrode. The liquid crystal display device is characterized in that a peripheral shape of said capacitive accumulation portion on a side contacting said non-electrode area is substantially the same between the respective pixels, and that a value of a storage capacity in said capacitive accumulation portion differs on a feeding side and on a termination side, and also that the value on the feeding side is larger than the value on the termination side.

In the aforementioned device, "substantially the same" means that a difference to the extent of the permissible quality variation during manufacturing is included herein.

According to this structure, the aperture ratio and the electric fields in the vicinity of the liquid crystal display area can be maintained substantially constant independently of the pixel, and a uniform display is possible from the termination side to the feeding side.

BRIEF DESCRIPTION OF THE DRAWINGS

FIG. 19A is a plan view of a feeding side of a liquid crystal display device according to an eleventh embodiment of the present invention; FIG. 19B is a plan view of a termination side of the same.

FIG. 21A is a plan view of a feeding side of a liquid crystal display device according to a twelfth embodiment of the present invention; FIG. 21B is a plan view of a termination side of the same.

FIG. 22A is a plan view of a feeding side of a liquid crystal display device according to a thirteenth embodiment of the present invention; FIG. 22B is a plan view of a termination side of the same.

FIG. 26A is a cross-sectional view taken on line IV—IV of FIG. 25A; FIG. 26B is a cross-sectional view taken on line V—V of FIG. 25B.

FIG. 28A is a cross-sectional view taken on line VI—VI of FIG. 27A; FIG. 28B is a cross-sectional view taken on line VII—VII of FIG. 27B.

FIG. 32A is a cross-sectional view taken on line VIII—VIII of FIG. 31A; FIG. 32B is a cross-sectional view taken on line IX—IX of FIG. 31B.

DETAILED DESCRIPTION OF THE INVENTION

Figure 1B:
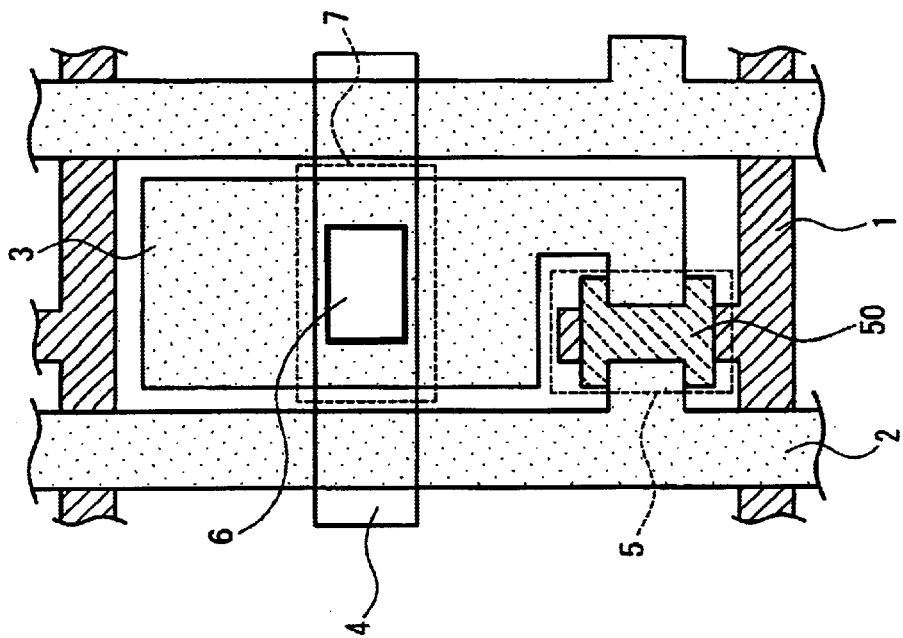
FIG. 1B is a plan view of a termination side of the same.

In the present invention, it is preferable that the value of the storage capacity in the capacitive accumulation portion is in a range from 10 to less than 100 on the termination side when the value thereof on the feeding side is set to be 100. According to this preferable example, by changing an area of an aperture of the storage capacity for each pixel, the storage capacity value can be changed while maintaining an aperture ratio of the pixel constant. Therefore, the aperture ratio and the electric fields in the vicinity of the liquid crystal display area can be maintained constant independently of the pixel, and a more uniform display is possible from the termination side to the feeding side.

Furthermore, the value of the storage capacity in the capacitive accumulation portion also can be varied by forming an aperture in the capacitive accumulation portion.

Furthermore, the value of the storage capacity in the capacitive accumulation portion can be varied by changing an area of the pixel electrode comprising the capacitive accumulation portion either on a feeding direction side or on a termination direction side of the common electrode. According to this preferable example, electric fields in each domain can be optimized, and image uniformity can be obtained.

Furthermore, it is preferable that means for varying the area of the pixel electrode comprising the capacitive accumulation portion is at least one shape selected from a protruding portion and a concave portion either on a feeding direction side or a termination direction side of the common electrode.

Furthermore, it is preferable that the area of the pixel electrode is in a range from 10 to less than 100 on the termination side when the area thereof on the feeding side is set to be 100.

Furthermore, it is preferable that the value of the storage capacity in the capacitive accumulation portion is varied by varying a thickness of an interlayer insulating film comprising the capacitive accumulation portion.

Furthermore, it is preferable that the thickness of the interlayer insulating film comprising the capacitive accumulation portion is in a range from more than 100 to less than 300 when the thickness thereof on the feeding side is set to be 100.

Furthermore, it is preferable that two or more layers of the interlayer insulating film are formed. Accordingly, the storage capacity value can be increased.

Furthermore, it is preferable that the two or more layers of interlayer insulating films are formed as a first dielectric layer and a second dielectric layer.

Furthermore, it is preferable that an aperture is formed in the second dielectric layer, and that the storage capacity value is changed by changing an area of the aperture. Thereby, it is easier to change the thickness.

Furthermore, it is preferable that the display device is at least one liquid crystal display device selected from a lateral electric field type active matrix liquid crystal display device and a twisted nematic (TN) type active matrix liquid crystal display device.

Furthermore, a width of the pixel electrode may be wider or narrower than a width of the common electrode.

Furthermore, the capacitive accumulation portion may be formed on a scanning wiring. According to this preferable example, the aperture ratio can be improved.

Furthermore, means for varying the value of the storage capacity in the capacitive accumulation portion may be a combination of a configuration of deforming or opening a shape of the electrode with a configuration of changing a thickness of an interlayer insulating film.

According to the liquid crystal display apparatus of the present invention described above, a constant aperture ratio can be maintained while changing the storage capacity value for each pixel. Furthermore, with the use of a lateral electric field method liquid crystal display device, the storage capacity value can be changed while maintaining the aperture ratio of the pixel constant, and in addition, electric fields applied to the liquid crystal layer in the display portion can be maintained evenly. Thus, deterioration and unevenness of display characteristics do not occur. Moreover, even in the case of using a light shield film to improve contrast or the like, a light shield film with a narrower width than that in a conventional configuration can be used, so that the aperture ratio also does not drop drastically.

In the following, embodiments of the present invention will be described with reference to the drawings.

First Embodiment

Figure 1A:
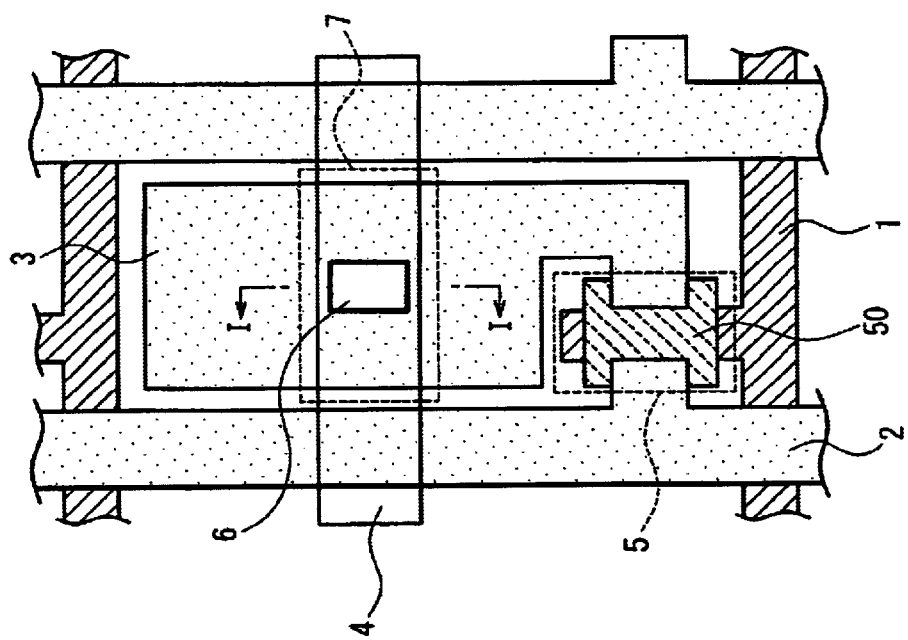
FIG. 1A is a plan view of a feeding side of a liquid crystal display device according to a first embodiment of the present invention.

FIGS. 1A–1B are plan views showing the configuration of a twist nematic (TN) type liquid crystal display device according to a first embodiment of the present invention. FIG. 1A shows the feeding side, and FIG. 1B shows the termination side.

In FIGS. 1A–1B, 1 is a scanning wiring, 2 is an image signal wiring, and a thin film transistor (TFT: Thin Film Transistor) 5 is formed at a cross point thereof as a switching element. 50 is a semiconductor layer for forming a channel of the TFT, wherein the gate electrode is connected to the scanning wiring, the source wiring is connected to the image signal wiring, and the drain electrode is connected to a pixel electrode 3 made of a transparent conductive material respectively.

Figure 2:
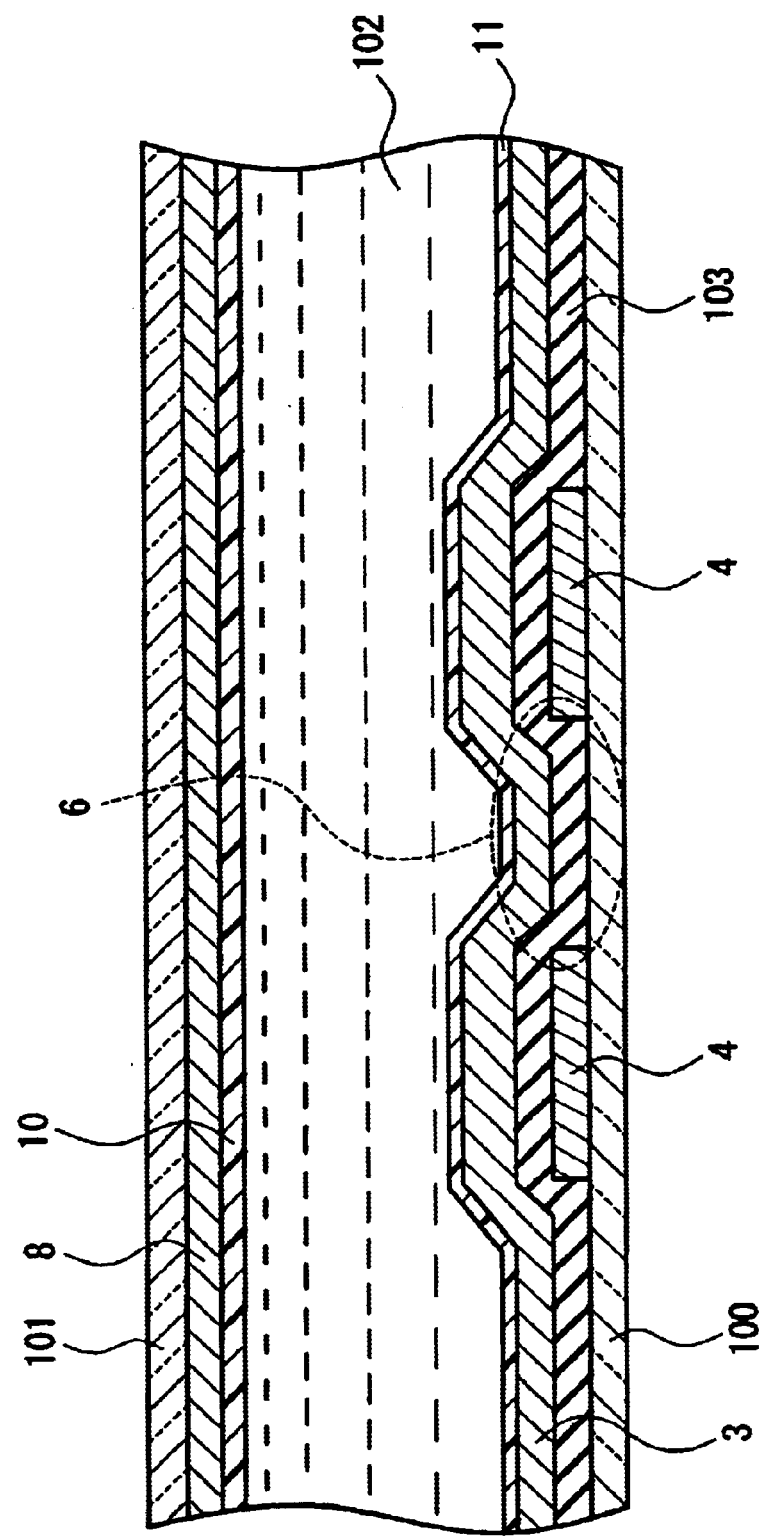
FIG. 2 is a cross-sectional view taken on line I—I of FIG. 1.

FIG. 2 is a cross-sectional view taken on line I—I of FIG. 1. A common electrode 4 is formed on an array substrate 100, and after an interlayer insulating film 103 is deposited thereon, the pixel electrode 3 is formed, and an alignment film 11 is formed on a surface thereof. On the other hand, an opposing electrode 8 made of a transparent conductive material is formed on an opposing substrate 101, and an alignment film 10 is formed on a surface thereof. Then, by applying electric fields generated by an electric potential difference with the pixel electrode to a liquid crystal layer 102, the orientation of the liquid crystal molecules is controlled so as to perform a display. Other than the aforementioned components, the liquid crystal display device also needs to have an alignment film for orientating the liquid crystal, a spacer for keeping a gap between the substrates, and also a color filter or a light shield film, but they are not shown in the drawing.

In this structure, an overlapping portion of the pixel electrode 3 with the common electrode 4 is a capacitive accumulation portion 7, and by maintaining the electric potential applied to the liquid crystal layer, a compensation with respect to a fluctuation of a pixel voltage due to an off-leak current of the TFT is achieved. In the liquid crystal display device of the present invention, an aperture 6 is provided in the common electrode 4 portion comprising the capacitive accumulation portion 7, and the storage capacity value is changed by changing an area thereof for each pixel. In particular, the area of the aperture may be enlarged so as to reduce the value of the storage capacity gradually from the feeding side toward the termination side of the scanning signal.

When the common electrode 4 is formed by using a non-transparent conductive material, light is transmitted from the aperture 6, so that an aperture ratio of the pixel changes according to its area. To achieve a constant aperture ratio of the pixel, a light shield film is required, but according to the configuration of the present embodiment, only the aperture of the capacitive accumulation portion 7 needs to be shielded, so that the aperture ratio does not drop drastically, compared to the conventional example. Moreover, when the common electrode 4 is a non-transparent conductive material, the storage capacity value can be varied by providing an aperture in the pixel electrode and changing the area of the aperture. In this case, since light is not transmitted from the capacitive accumulation portion 7, there is a benefit in that it is no longer necessary to use a light shield film.

In this case, when an external shape of the common electrode 4 is the same, the aperture ratio can be maintained constant also by changing the storage capacity for each pixel. Here, a deformation due to the process or a shape difference due to a change in the size is included in the category of the same shape.

Second Embodiment

Figure 3B:
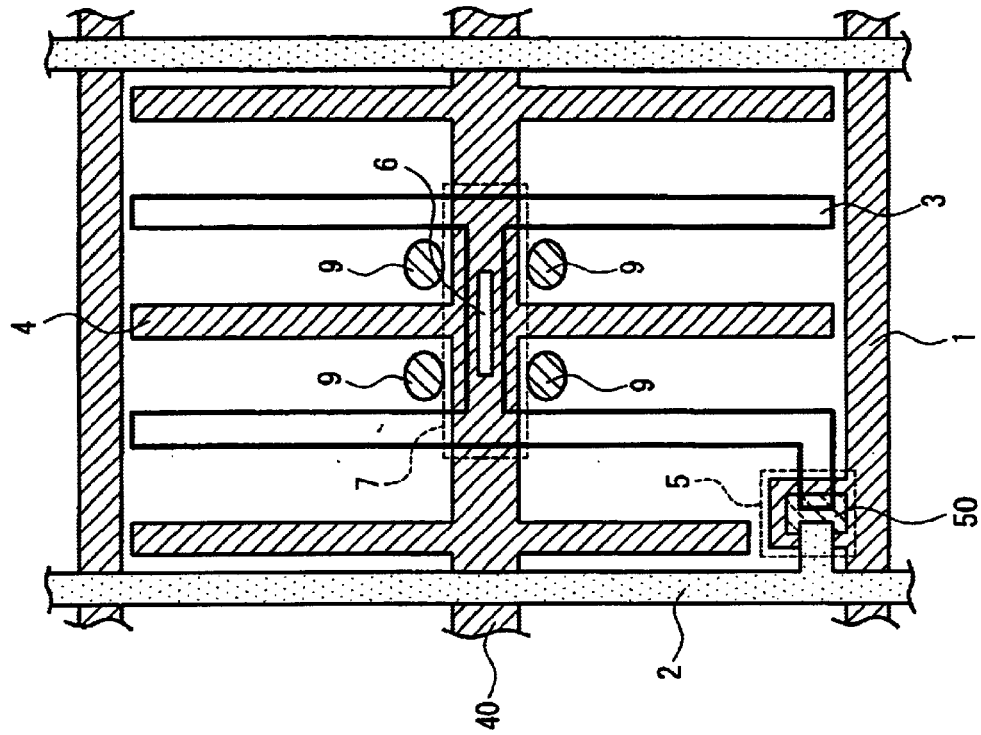
FIG. 3B is a plan view of a termination side of the same.
Figure 3A:
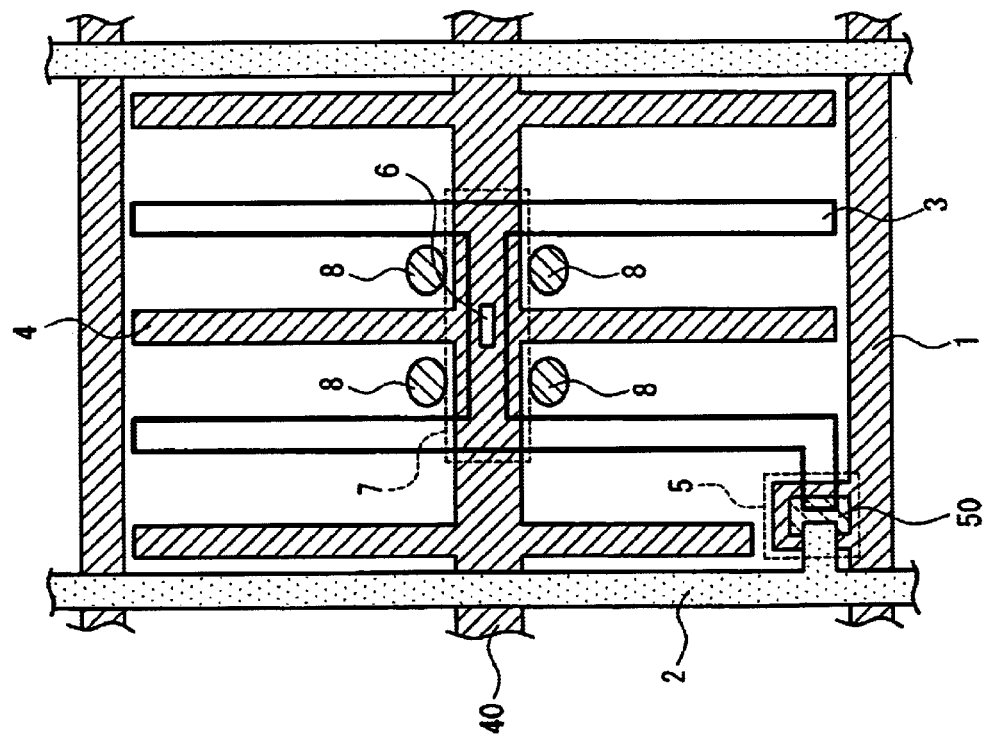
FIG. 3A is a plan view of a feeding side of a liquid crystal display device according to a second embodiment of the present invention.

FIGS. 3A–3C and FIGS. 4A–4B are plan views showing the configuration of a lateral electric field method liquid crystal display device according to a second embodiment of the present invention. In FIGS. 3A–3B, a pixel electrode 3 is not hatched, but this electrode is formed with the same conductive layer as an image signal wiring 2.

In FIGS. 3A–3C and FIGS. 4A–4B, 1 is a scanning wiring, 2 is an image signal wiring, and a thin film transistor 5 is formed at a cross point thereof as a switching element. 50 is a semiconductor layer for forming a channel of the TFT, wherein the gate electrode is connected to the scanning wiring 1, the source wiring is connected to the image signal wiring 2, and the drain electrode is connected to the pixel electrode 3 respectively. Both the pixel electrode 3 and a common electrode 4 have a herringbone shape, and the orientation of the liquid crystal molecules that are present between them is controlled by the electric fields between both the electrodes so as to perform a display.

Figure 3C:
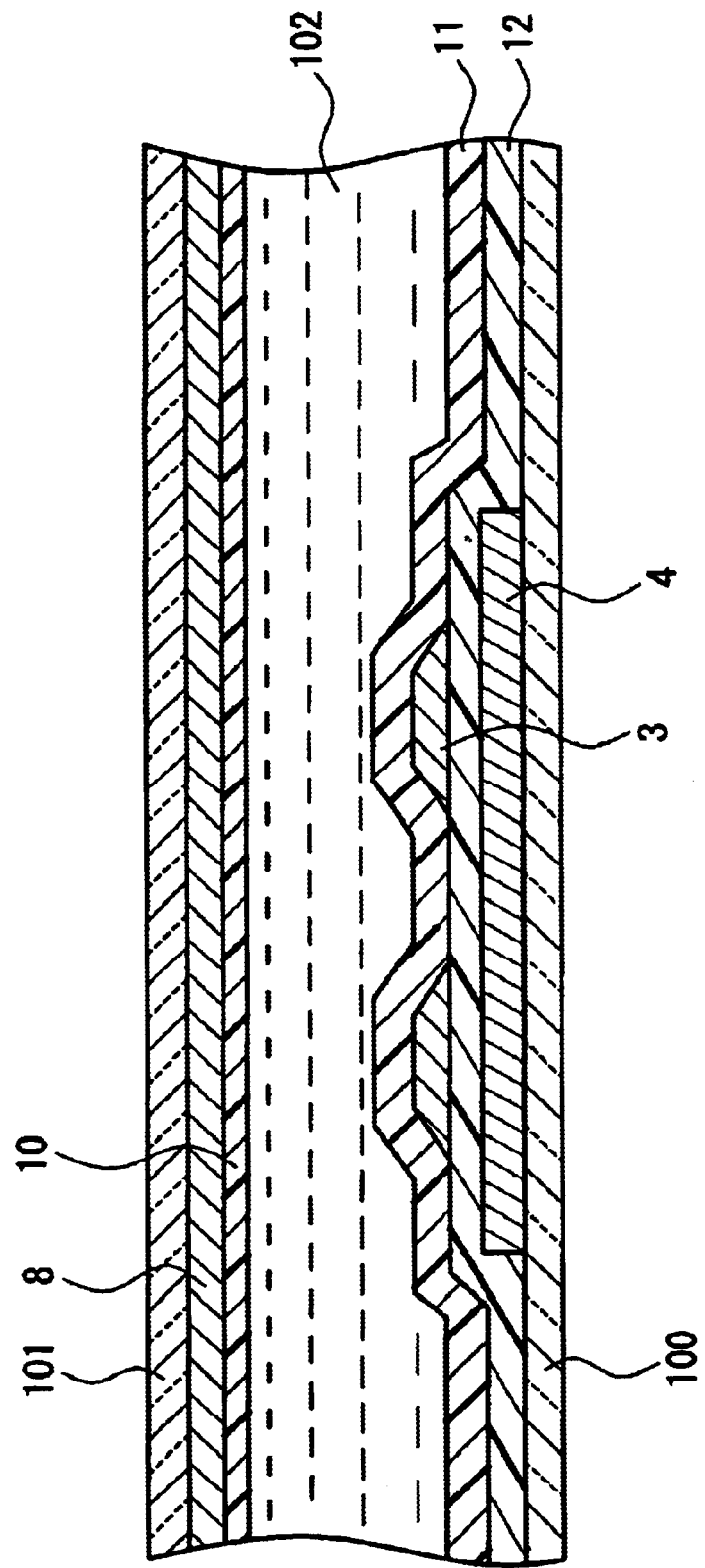
FIG. 3C is a cross-sectional view of the device according to the second embodiment.
Figure 4B:
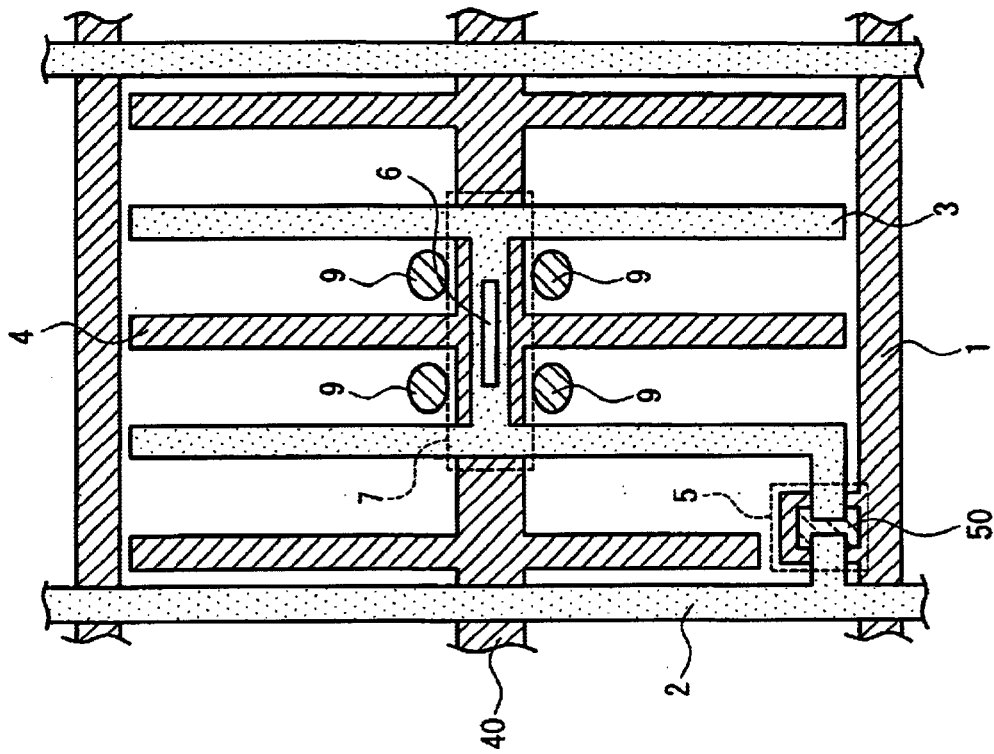
FIG. 4B is a plan view of a termination side of the same.
Figure 4A:
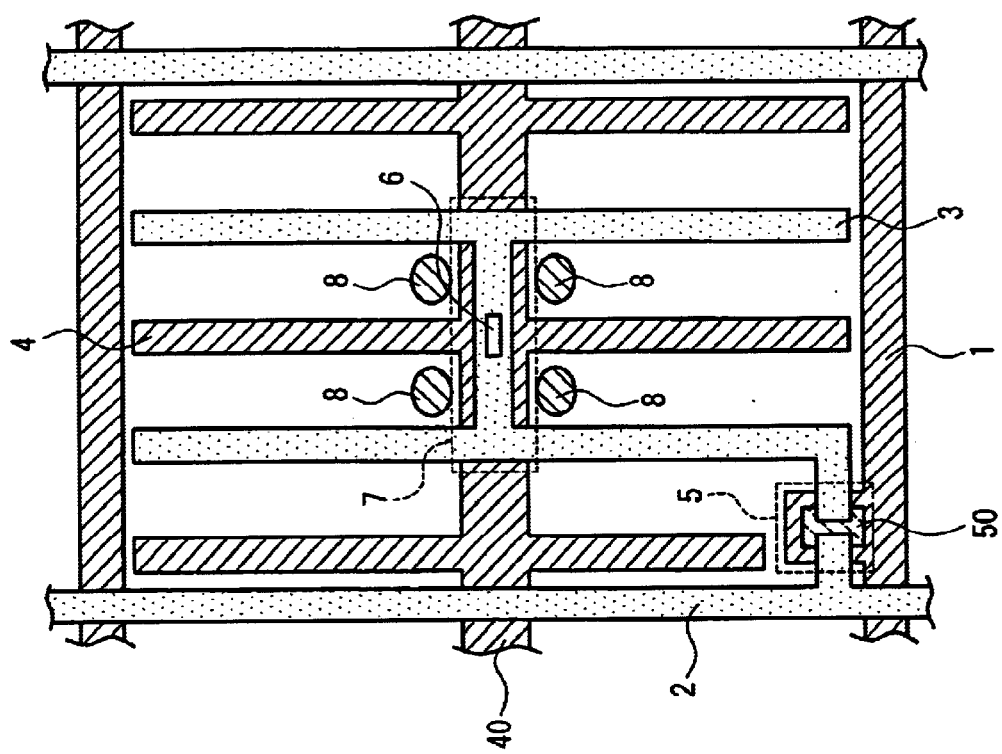
FIG. 4A is a plan view of a feeding side of a liquid crystal display device according to a second embodiment of the present invention.

The common electrodes 4 are connected electrically to each other by a bus bar 40 of the common electrode. 11 is a passivation film (this is a film for protecting the TFT and is not an alignment film). As shown in FIG. 3C, a part of the pixel electrode is overlapped on this bus bar, and an interlayer insulating film 12 is disposed between a first conductive layer comprising the pixel electrode 3 and a second conductive layer comprising the common electrode 4, thereby forming a capacitive accumulation portion 7 as shown in FIGS. 3A–3B. That is, the bus bar 40 acts as an opposing electrode for the capacitive accumulation portion 7.

An area of the overlapping portion, that is, a capacity value of the capacitive accumulation portion 7, is reduced gradually by providing an aperture 6 in either the pixel electrode portion (FIGS. 3A–3B) comprising the storage capacity or the bus bar (FIG. 4) and by enlarging this aperture area from the feeding side toward the termination.

The overlapping portion of the present embodiment is patterned such that the pixel electrode 3 within the two conductive layers comprising the capacitive accumulation portion is located inside the bus bar 40 of the common electrode. Therefore, the periphery of the plurality of electrodes comprising the capacitive accumulation portion has the same shape independently of the pixel, and the aperture ratio is maintained constant independently of the pixel. Furthermore, since this periphery comprises the same electrode independently of the pixel, the electric fields applied to the liquid crystal layers 8, 9 located in the vicinity of the capacitive accumulation portion also are maintained constant independently of the pixel. Thus, a uniform display without any display unevenness can be achieved.

Figure 11B:
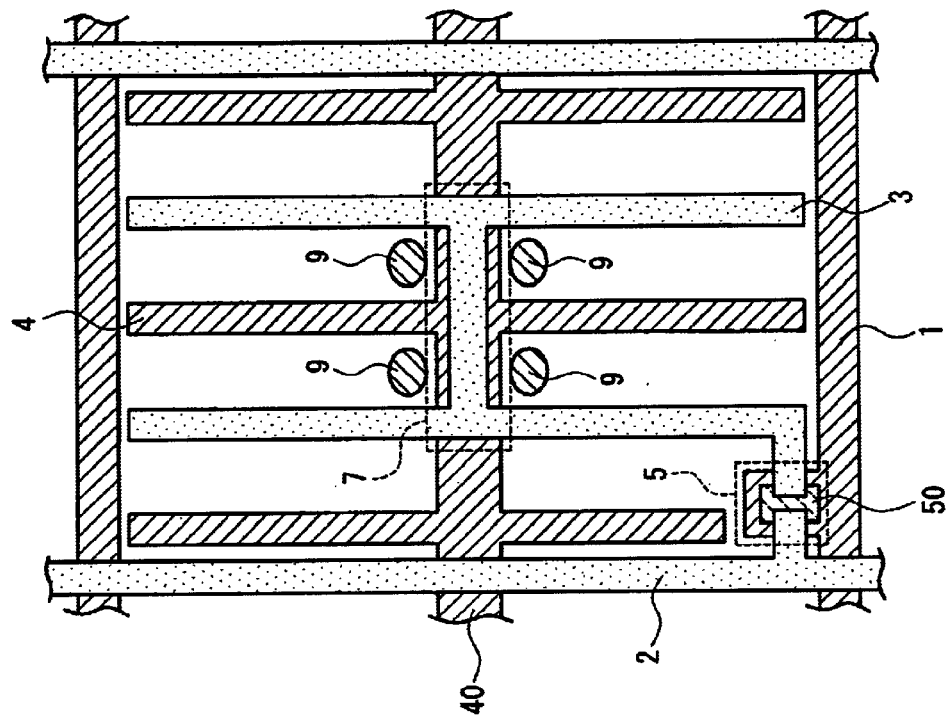
FIG. 11B is a plan view of a termination side of the same.
Figure 11A:
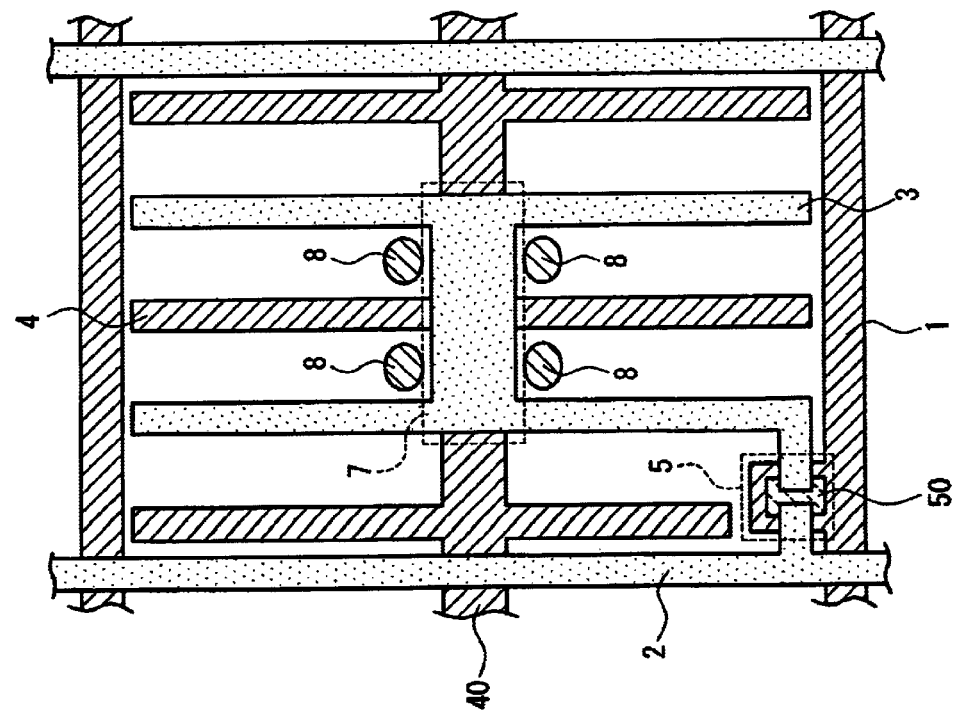
FIG. 11A is a plan view of a feeding side of a liquid crystal display device used for comparison.

This aspect will be explained with reference to FIGS. 11A–11B. In this configuration, a width of the pixel electrode 3 formed on the bus bar 40 of the common electrode is changed for each pixel so as to change the storage capacity value. On the feeding side, the pixel electrode is extending beyond the bus bar, but on the termination side, the pixel electrode is formed inside the bus bar. Thus, the aperture ratio differs depending on the pixel in such a configuration.

The aperture ratio can be maintained constant by forming the pixel electrode with a transparent conductive material or by shielding light with a light shield film such as a black matrix to prevent a difference in the aperture area from arising. However, the following problems still remain to be solved. That is, the liquid crystal layers 8, 9 located in the vicinity of the capacitive accumulation portion shown by oblique lines in FIGS. 11A–11B are contacting the pixel electrode on the feeding side and the bus bar of the common electrode on the termination side from the storage capacity side respectively. Usually, the electric potentials of the pixel electrode and the bus bar are different, so that the electric fields applied to these liquid crystal layers also are different. Accordingly, the orientation of the liquid crystal differs between the feeding side and the termination side to cause a difference in the display luminance, which is observed as display unevenness. When this display unevenness is eliminated by using a light shield film, due to the fact that the light shield film is formed on the opposing substrate, the aperture ratio drops drastically because of a bonding margin of the substrates.

On the other hand, in the configuration of FIGS. 3A–3B according to the present invention, the electrode that the liquid crystal layers 8, 9 located in the vicinity of the capacitive accumulation portion are contacting from the side of the storage capacity 7 certainly is the bus bar 40 of the common electrode on the feeding side as well as on the termination side. Therefore, even if an area of the capacitive accumulation portion (storage capacity value) is changed for each pixel, the electric fields in a portion related to the display are maintained evenly. Furthermore, even if a light shield film is not used, the aperture area of the pixel is the same.

In the present embodiment, a time constant of the scanning wiring can be reduced because the capacitive accumulation portion is not provided on the scanning wiring, and a recharge of the pixel due to a deformation or a collapse of the scanning signal can be suppressed, so that an excellent display can be obtained.

The configuration shown in FIGS. 3A–3B is provided with the aperture 6 on the bus bar 40 of the common electrode, which is effective when the pixel electrode does not have a sufficient width and thus it is difficult to provide an aperture due to the process. Furthermore, by providing an aperture in the pixel electrode 3 as shown in FIG. 4, the parasitic capacitance of the bus bar can be reduced, so that the time constant can be reduced, which is suitable to achieve higher definition.

Third Embodiment

Figure 5B:
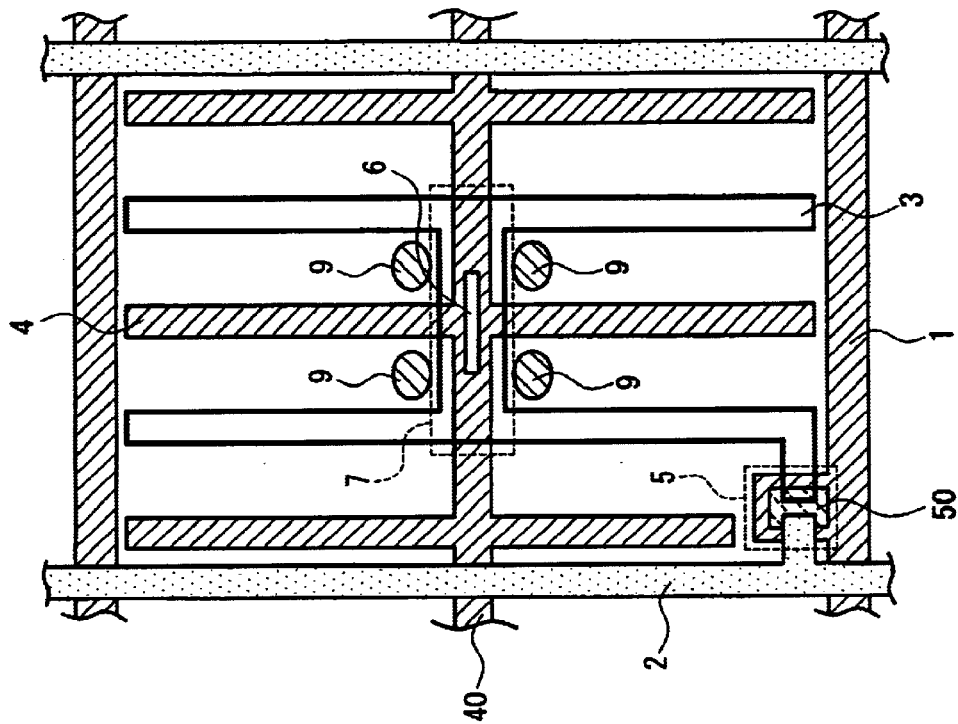
FIG. 5B is a plan view of a termination side of the same.
Figure 5A:
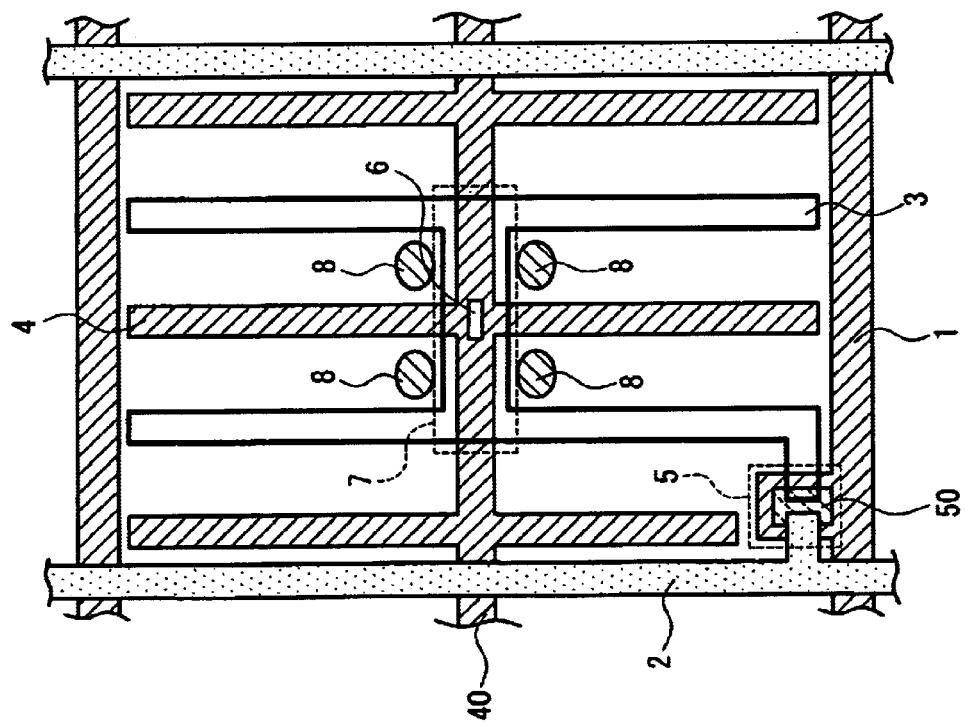
FIG. 5A is a plan view of a feeding side of a liquid crystal display device according to a third embodiment of the present invention.
Figure 6A:
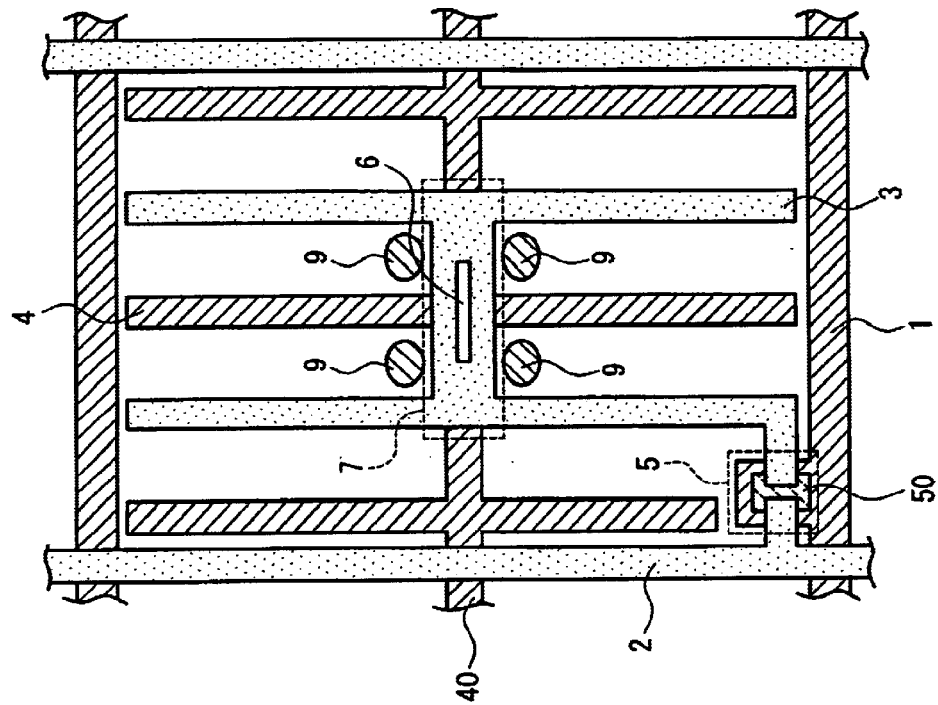
FIG. 6A is a plan view of a feeding side of a liquid crystal display device according to a third embodiment of the present invention.
Figure 6B:
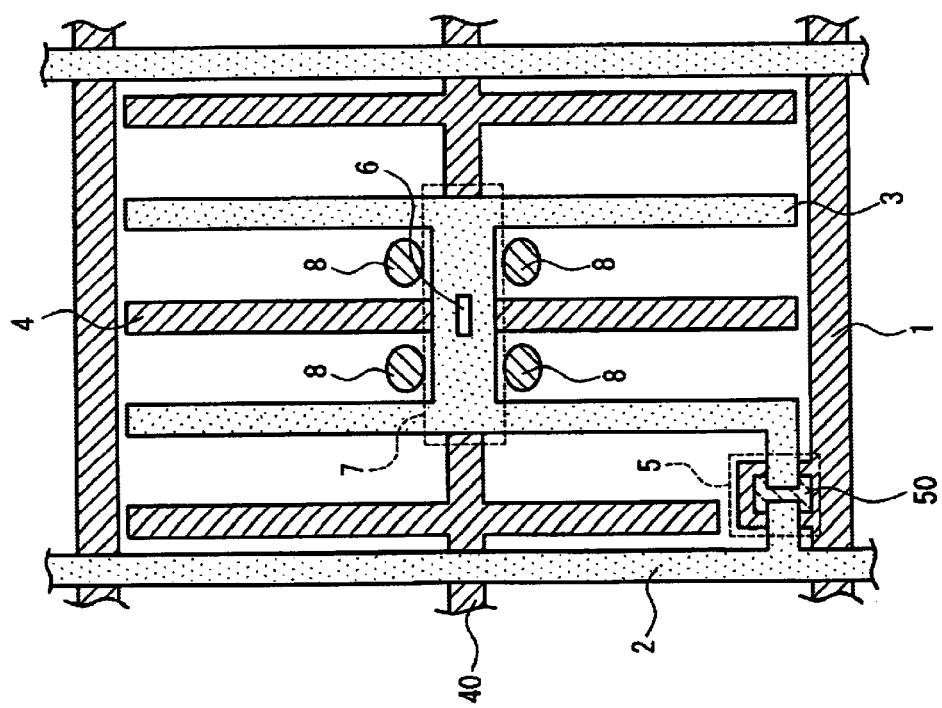
FIG. 6B is a plan view of a termination side of the same.

FIGS. 5A–5B and 6A–6B are plan views showing the configuration of a lateral electric field method liquid crystal display device according to a third embodiment of the present invention. In FIGS. 5A–5B, a pixel electrode 3 is not hatched, but this electrode is formed with the same conductive layer as an image signal wiring 2.

In the second embodiment, the capacitive accumulation portion 7 was constructed by forming the pixel electrode 3 on a part of the bus bar 40 of the common electrode. In the present embodiment, however, the capacitive accumulation portion is constructed by forming the pixel electrode such that the bus bar of the common electrode is covered completely. Furthermore, an aperture 6 is provided in a common electrode 4 in FIG. 5, whereas the aperture 6 is provided in the pixel electrode 3 in FIG. 6, and by enlarging an area thereof from the feeding side toward the termination side, the storage capacity value is varied.

According to the present embodiment, the electrode that the liquid crystal layers 8, 9 located in the vicinity of the storage capacity are contacting from the side of the capacitive accumulation portion 7 is the pixel electrode 3 on the feeding side as well as on the termination side. Therefore, the same effect as that explained in the first embodiment can be obtained. That is, the electric fields in a portion related to the display (a gap portion between the pixel electrode 3 and the common electrode 4) are maintained evenly while changing the area of the capacitive accumulation portion 7 for each pixel.

Other characteristics of the present embodiment will be described in the following.

First, the present embodiment is suitable to achieve higher definition due to the fact that a time constant of the scanning wiring can be reduced because the capacitive accumulation portion is not formed on the scanning wiring, and that the aperture of the pixel can be formed wider, since a width of the bus bar can be reduced when the storage capacity value is set to be the same as in the first embodiment.

Secondly, a yield is improved. For forming the capacitive accumulation portion, the pixel electrode 3 needs to be deposited on the bus bar 40 of the common electrode. In the configurations shown in FIGS. 3A–3B and FIGS. 4A–4B, the herringbone shape portion of the pixel electrode runs onto a stepped region of the bus bar, so that a disconnection may occur in this step, thereby causing pixel deficiency. According to the configuration of the present embodiment, the pixel electrode runs onto the stepped portion by using the overall width of the capacitive accumulation portion. Therefore, a disconnection is less likely to occur, and a yield is improved.

Thirdly, the capacitive accumulation portion is constructed such that the pixel electrode located close to the liquid crystal layer covers the bus bar located in the lower layer completely, thereby completely preventing the electric fields of the bus bar from leaking. Due to this configuration, a more uniform display can be achieved.

Furthermore, by providing the aperture 6 in the pixel electrode (FIG. 6), which was provided in the bus bar of the common electrode in FIG. 5, a resistance of the bus bar drops and thus the time constant can be reduced, so that it is suitable to achieve higher definition.

Fourth Embodiment

Figure 7B:
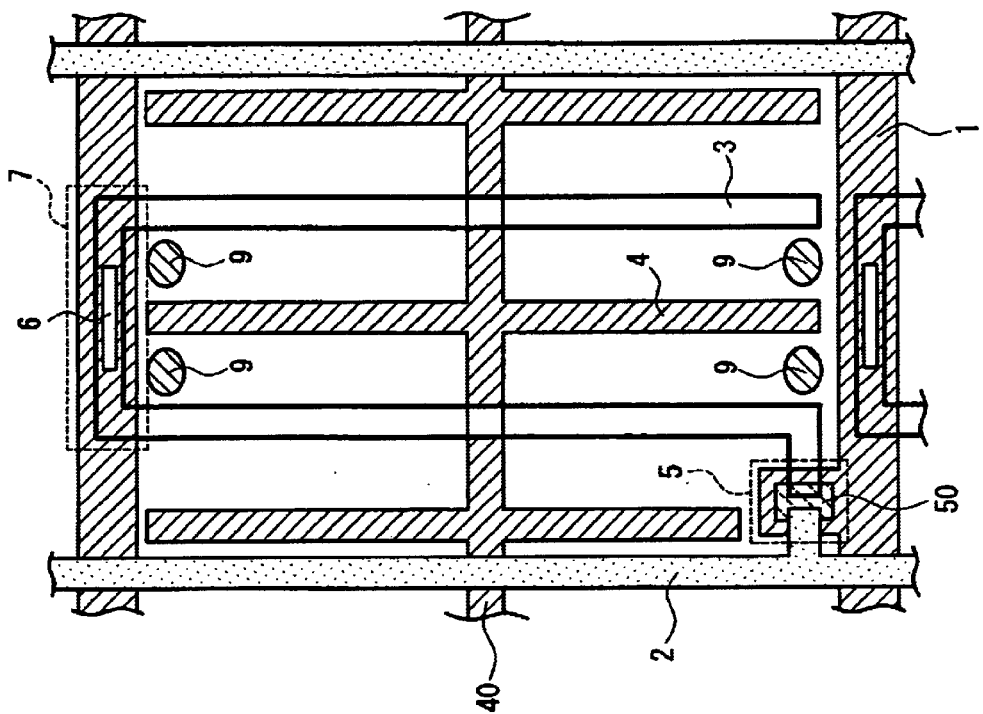
FIG. 7B is a plan view of a termination side of the same.
Figure 7A:
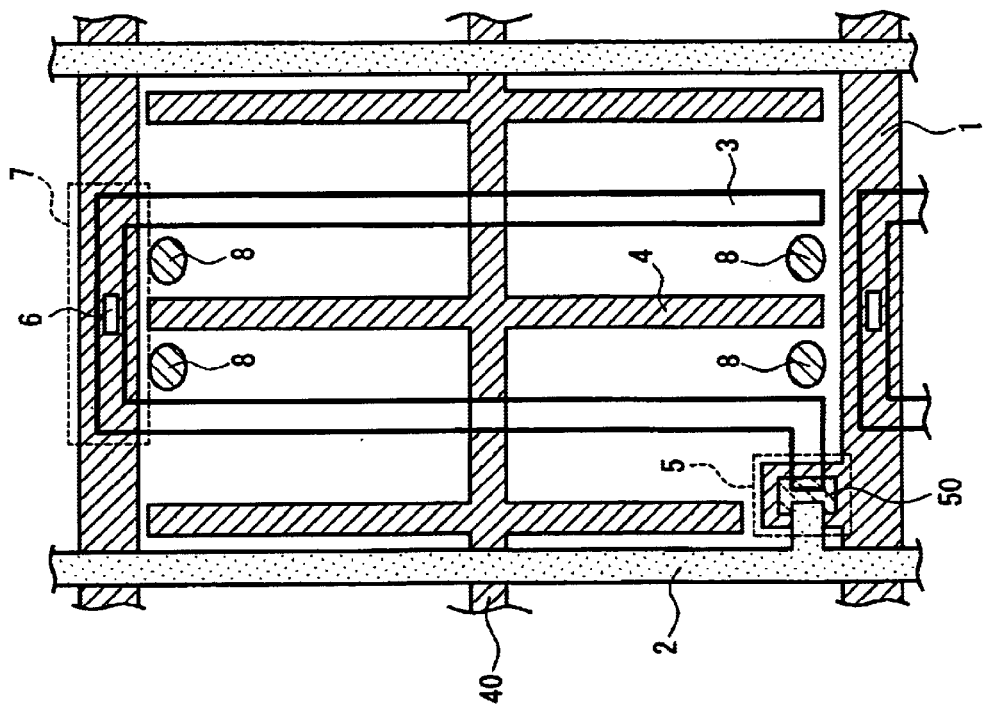
FIG. 7A is a plan view of a feeding side of a liquid crystal display device according to a fourth embodiment of the present invention.
Figure 8B:
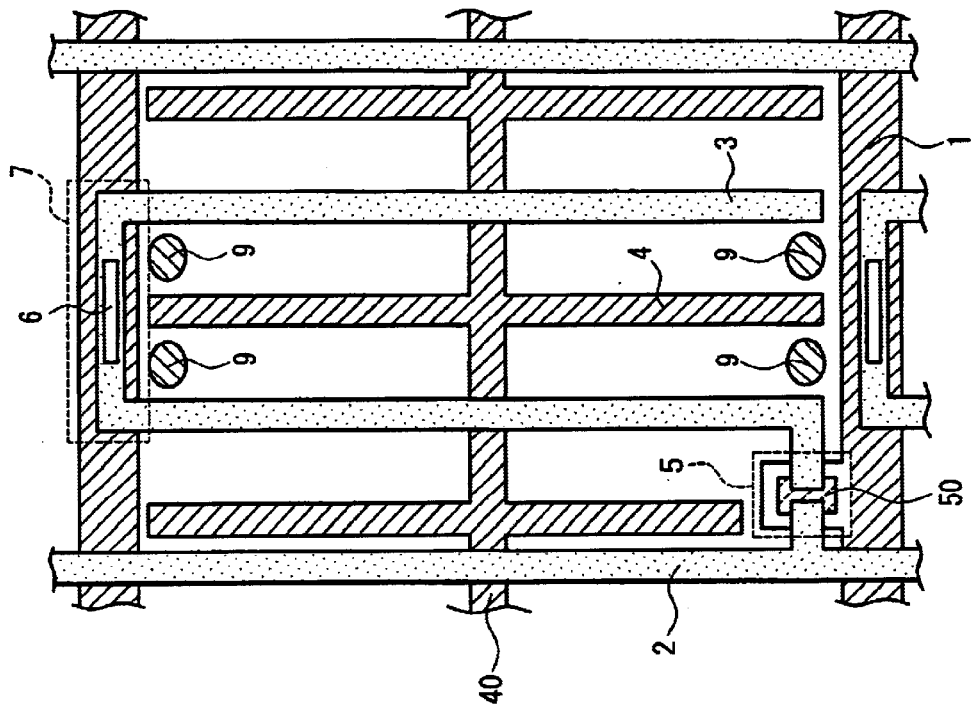
FIG. 8B is a plan view of a termination side of the same.
Figure 8A:
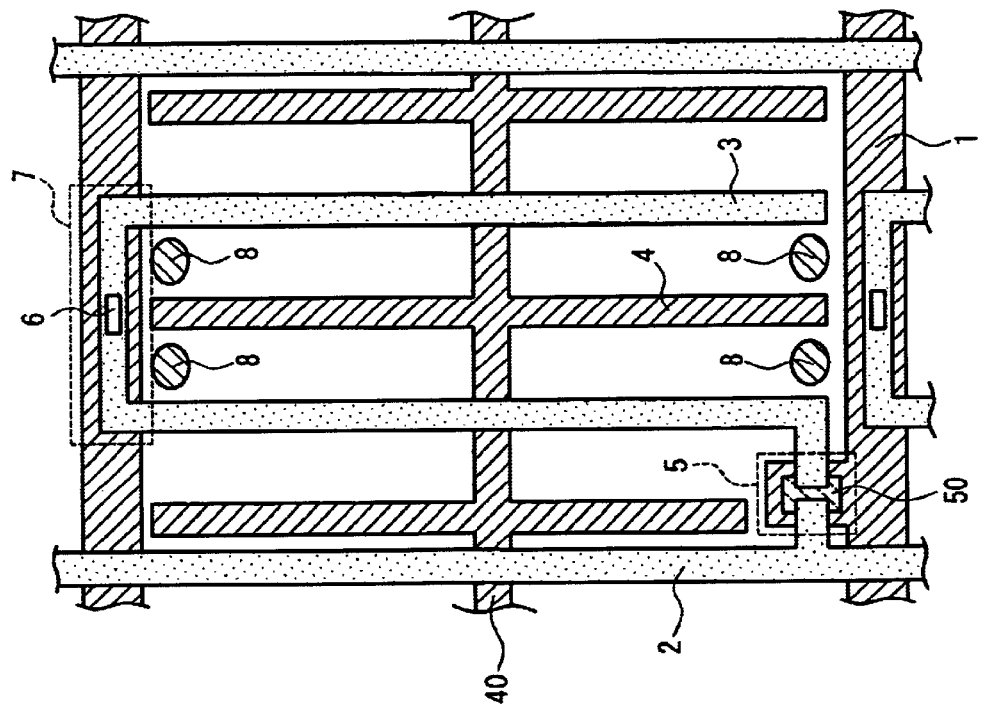
FIG. 8A is a plan view of a feeding side of a liquid crystal display device according to a fourth embodiment of the present invention.

FIGS. 7 and 8 are plan views showing the configuration of a liquid crystal display device according to a fourth embodiment of the present invention. In FIG. 7, a pixel electrode 3 is not hatched, but this electrode is formed with the same conductive layer as an image signal wiring 2.

In the second and third embodiments, the capacitive accumulation portion 7 was constructed of the bus bar 40 of the common electrode and the pixel electrode 3. In the present embodiment, however, the capacitive accumulation portion is constructed of a scanning wiring 1 formed via an interlayer insulating film and a pixel electrode 3, and the storage capacity value is changed by providing an aperture 6 in the scanning wiring (FIG. 7) or in the pixel electrode (FIG. 8) and by changing an area thereof for each pixel. Furthermore, the pixel electrode is formed such that the pixel electrode runs onto the scanning wiring completely.

According to the present embodiment, the conductive layer that the liquid crystal layers 8, 9 located in the vicinity of the capacitive accumulation portion are contacting from the side of the storage capacity certainly is the scanning wiring on the feeding side as well as on the termination side. Therefore, also in the configuration of the present embodiment, even if an area of the storage capacity is changed, the electric fields in a portion related to the display are maintained evenly, and an excellent display can be achieved. In addition, the bus bar 40 of the common electrode is not used as the conductive layer for forming the storage capacity, so that a width of the bus bar can be reduced while an aperture area of the pixel can be increased.

The configuration shown in FIG. 7 is provided with an aperture in the scanning wiring, which is effective when the pixel electrode does not have a sufficient width and it is difficult to provide an aperture due to the process. Furthermore, by providing the aperture in the pixel electrode portion as shown in FIG. 8, a resistance of the scanning wiring drops and thus the time constant can be reduced, so that it is suitable to achieve higher definition.

Fifth Embodiment

Figure 9B:
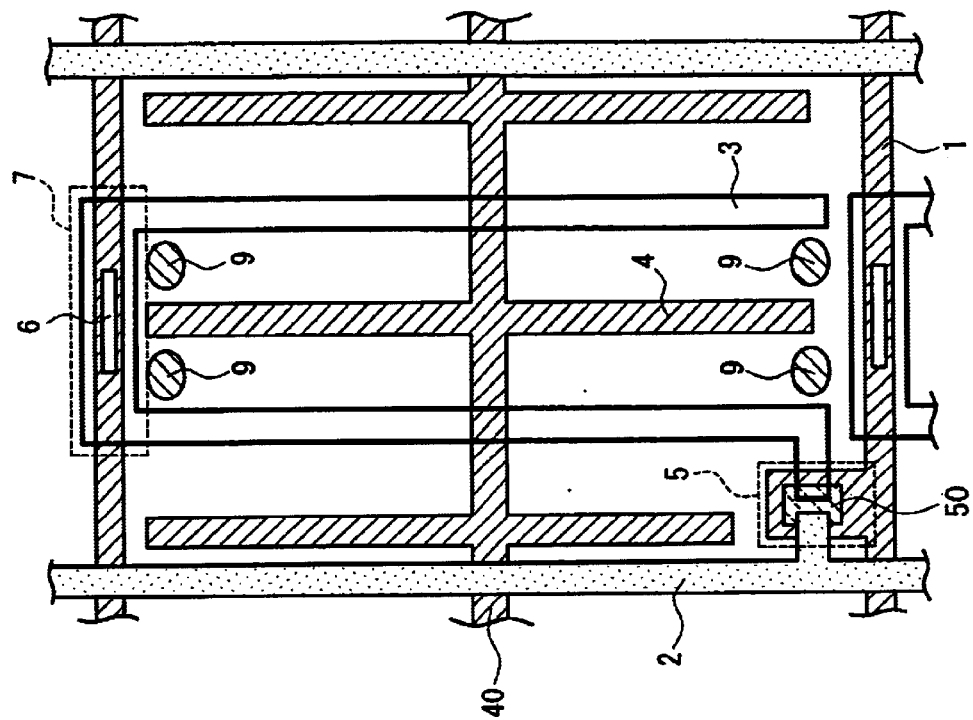
FIG. 9B is a plan view of a termination side of the same.
Figure 9A:
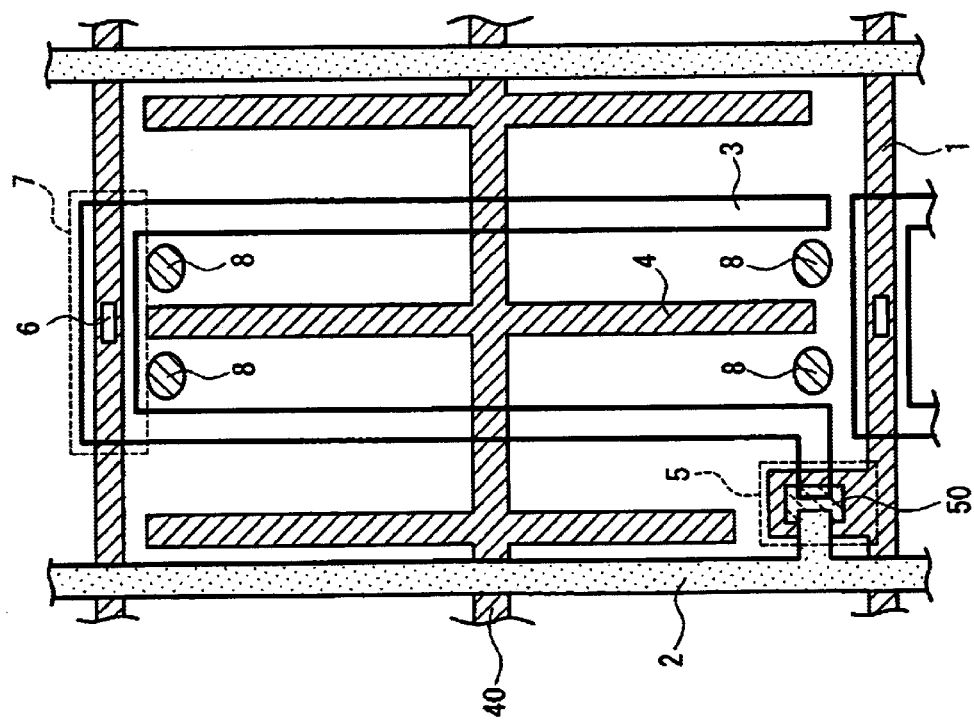
FIG. 9A is a plan view of a feeding side of a liquid crystal display device according to a fifth embodiment of the present invention.
Figure 10B:
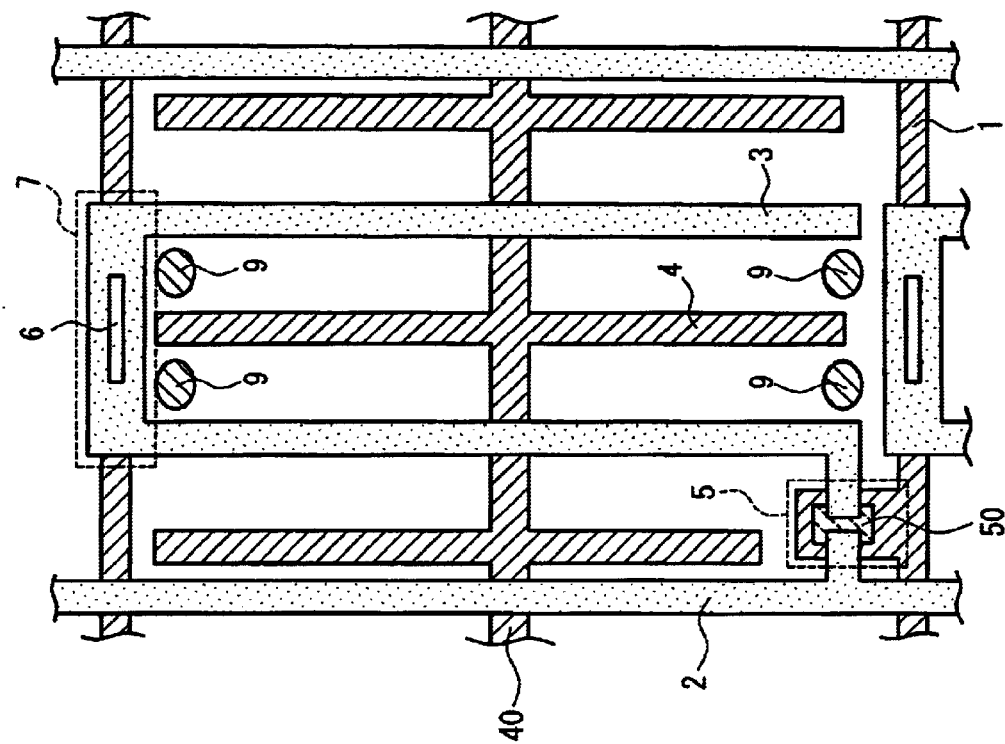
FIG. 10B is a plan view of a termination side of the same.
Figure 10A:
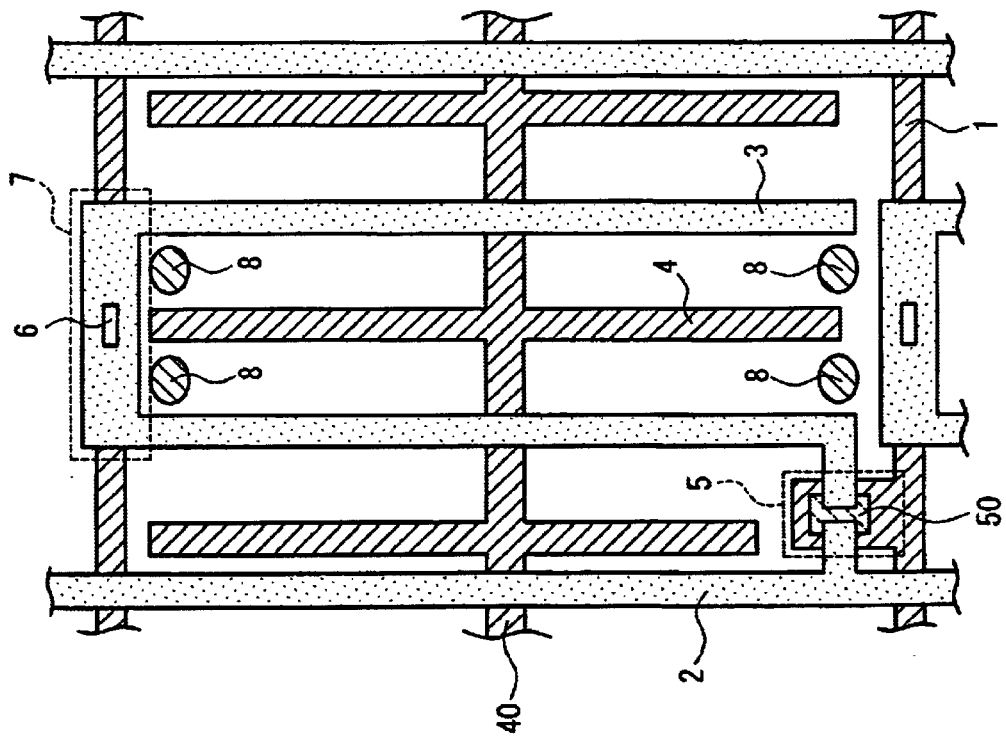
FIG. 10A is a plan view of a feeding side of a liquid crystal display device according to a fifth embodiment of the present invention.

FIGS. 9 and 10 are plan views showing the configuration of a liquid crystal display device according to a fifth embodiment of the present invention. In FIG. 9, a pixel electrode 3 is not hatched, but this electrode is formed with the same conductive layer as an image signal wiring 2.

As in the fourth embodiment, a capacitive accumulation portion 7 is formed with a scanning wiring 1 and a pixel electrode 3, but in the present embodiment, the capacitive accumulation portion is formed such that the pixel electrode covers the scanning wiring completely. Furthermore, an aperture 6 is provided in the capacitive accumulation portion either of the scanning wiring (FIG. 9) or the pixel electrode (FIG. 10), so that the storage capacity value is reduced gradually by changing an area thereof from the feeding side toward the termination side.

In the present embodiment, the conductive layer that the liquid crystal layers 8, 9 located in the vicinity of the capacitive accumulation portion are contacting certainly is the pixel electrode even if an area of the storage capacity is changed, and the electric fields in a portion related to the display are maintained evenly, thereby achieving an excellent display.

Furthermore, according to the present embodiment, the pixel electrode is formed so as to cover the scanning wiring completely in the capacitive accumulation portion, so that the electric fields caused by scanning signals can be shielded with the pixel electrode. Thus, the electric fields caused by the scanning signals are prevented from leaking into the liquid crystal layers 8, 9 located in the vicinity of the storage capacity completely, thereby enabling an excellent display.

Furthermore, a disconnection does not occur in the herringbone-shaped portion of the pixel electrode due to a step in the scanning wiring, so that the occurrence of pixel deficiency is suppressed, and a yield is improved.

By providing the aperture in the pixel electrode as shown in FIG. 10, a resistance of the scanning wiring drops and thus the time constant can be reduced, so that it is suitable to achieve higher definition.

Sixth Embodiment

Figure 12A:
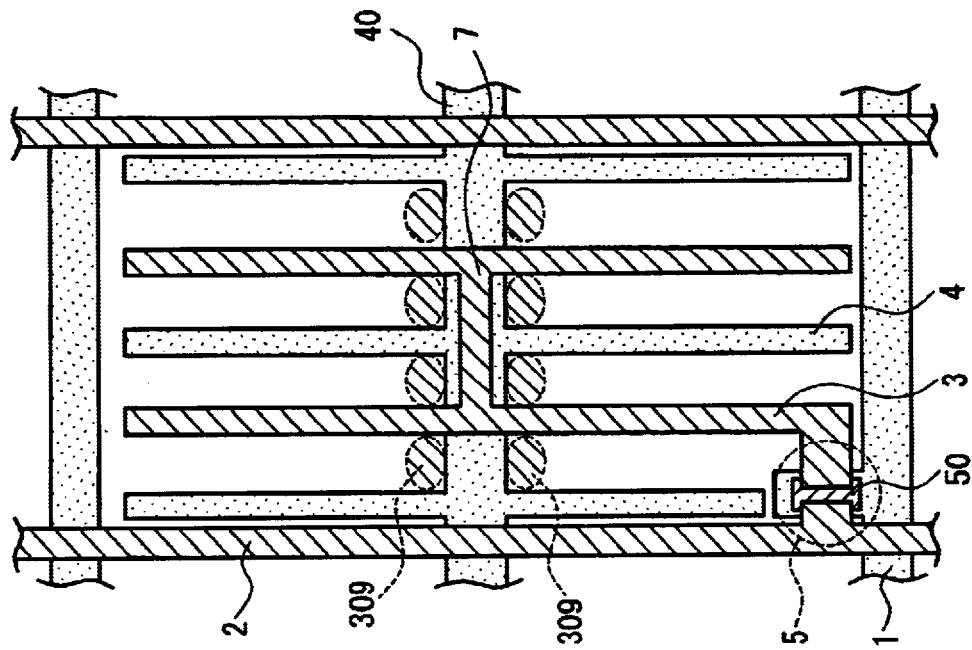
FIG. 12A is a plan view of a feeding side of a liquid crystal display device according to a sixth embodiment of the present invention.
Figure 12B:
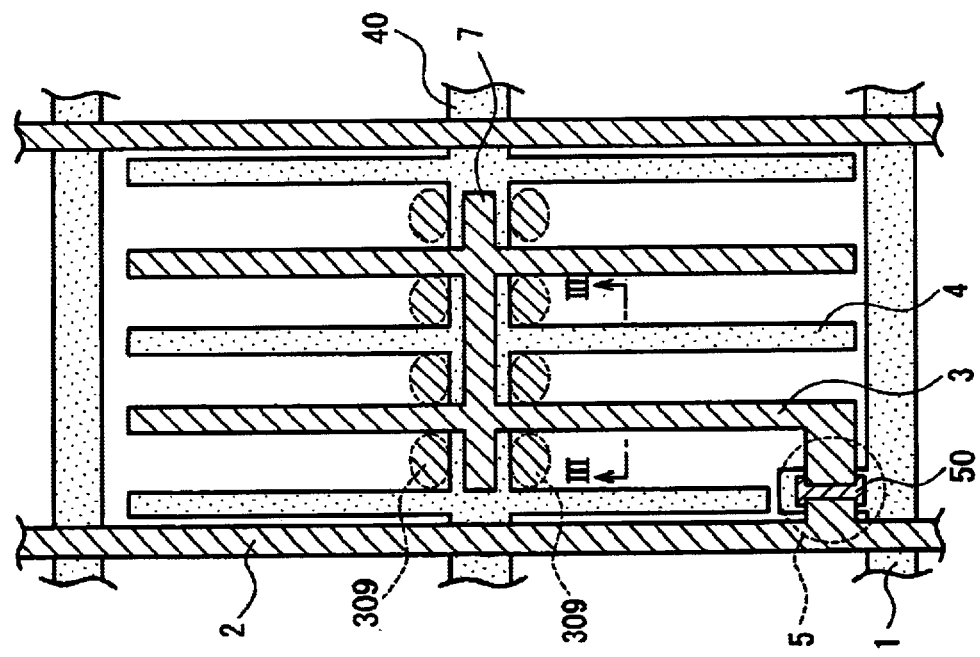
FIG. 12B is a plan view of a termination side of the same.

FIGS. 12A–12B are plan views showing the configuration of a liquid crystal display device according to a sixth embodiment of the present invention. In FIGS. 12A–12B, 1 is a scanning electrode, 2 is an image signal electrode, and a thin film transistor (hereinafter abbreviated as TFT) 5 is formed at a cross point thereof as a switching element. 50 is a semiconductor layer for forming a channel of the TFT 5. The gate electrode of the TFT 5 is connected to the scanning electrode 1, the source electrode is connected to the image signal electrode 2, and the drain electrode is connected to a pixel electrode 3 respectively. The pixel electrode 3 and a common electrode 4 form a herringbone shape, and the liquid crystal therebetween is operated by the electric fields between the two electrodes 3, 4 so as to perform a display.

Figure 13:
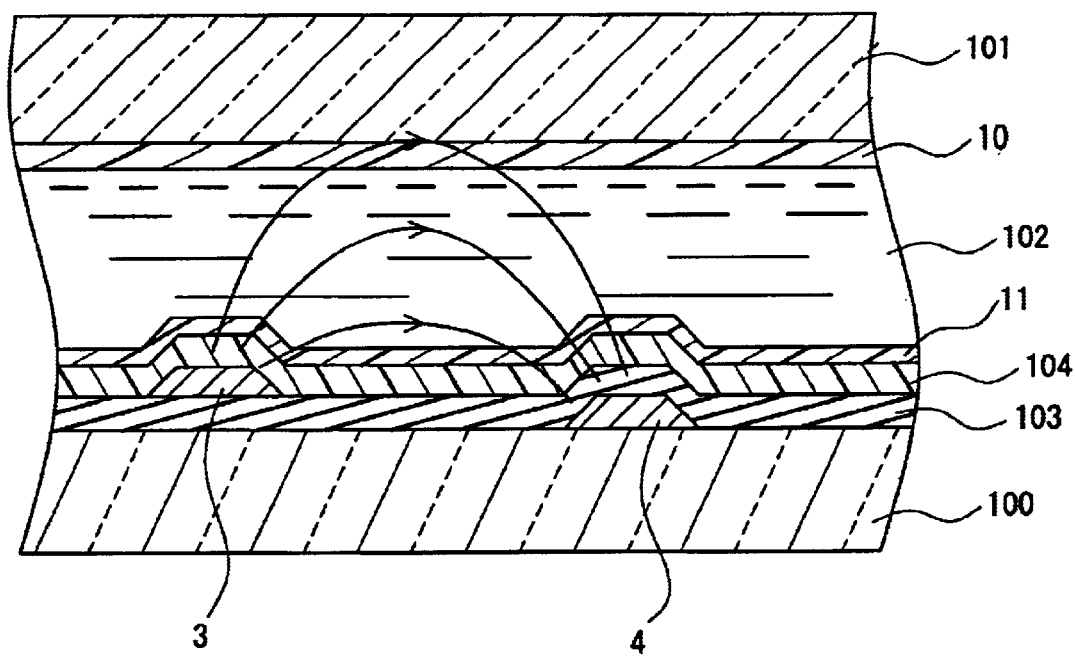
FIG. 13 is a cross-sectional view showing the pixel cross section of a liquid crystal display device according to a sixth embodiment of the present invention.

FIG. 13 is a cross-sectional view taken on line III—III of FIG. 12A. In FIG. 13, 100 is a substrate on one side where the pixel electrode 3 and the common electrode 4 are formed. 103 is an interlayer insulating film used for separation of the two electrodes, and 104 is a passivation film for protecting the thin film transistor. 102 is a liquid crystal layer, which is disposed between the substrate 100 and a substrate 101 on the other side.

As shown in FIG. 13, due to an electric voltage difference between the pixel electrode 3 and the common electrode 4, lines of electric force shown by arrows are generated. The drawing shows the lines of electric force passing inside the liquid crystal layer 102. In portions excluding the top parts of the electrodes, the lines of electric force are mainly composed of components parallel to the substrate 100, and the electric fields parallel to this substrate 100 operate the liquid crystal. In such a liquid crystal display device, the pixel electrode 3 does not necessarily exist in the entire region where the liquid crystal is actually operated, so that the electric fields are likely to be changed due to a slight difference in the shape or the position of the electrode edge portion, which is observed as display unevenness.

As shown in FIG. 12, a plurality of the common electrodes 4 are brought into electrical contact with each other by a bus bar 40. A part of the pixel electrode 3 is overlapped on this bus bar 40, and an interlayer insulating film is disposed between a first conductive layer comprising the common electrode 4 and a second conductive layer comprising the pixel electrode 3, thereby forming a capacitive accumulation portion 7. That is, the bus bar 40 acts as the common electrode for the capacitive accumulation portion 7.

An area of the overlapping portion is reduced gradually from the feeding side toward the termination side by changing the shape of the pixel electrode 3 for each pixel. As one example, the pixel electrode may be formed in a H shape on the termination side as shown in FIG. 12B, while the pixel electrode may be formed on the feeding side so as to protrude from both sides as shown in FIG. 12A, and this protrusion amount can be changed gradually. As a result, the value of the capacitive accumulation portion 7 also is reduced gradually from the feeding side toward the termination.

The overlapping portion of the present embodiment is patterned such that the pixel electrode 3 whose shape changes for each pixel is located inside the bus bar serving as the other electrode. Therefore, the periphery of the plurality of electrodes comprising the capacitive accumulation portion 7 has the same shape in all the pixels, and thus an aperture ratio is maintained constant independently of the pixel. Furthermore, since this periphery comprises the same electrode in all the pixels, the electric fields in the circumference of the capacitive accumulation portion 7 also are maintained constant independently of the pixel. Therefore, a uniform display without any display unevenness can be achieved. Hereinafter, this aspect will be described.

Figure 14A:
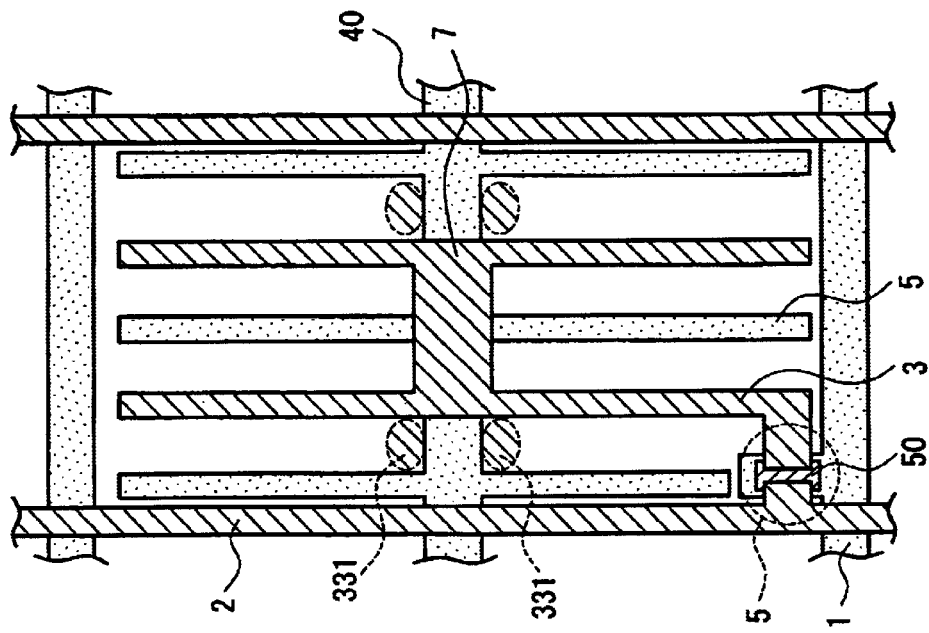
FIG. 14A is a plan view of a feeding side of a liquid crystal display device used for a comparative explanation.
Figure 14B:
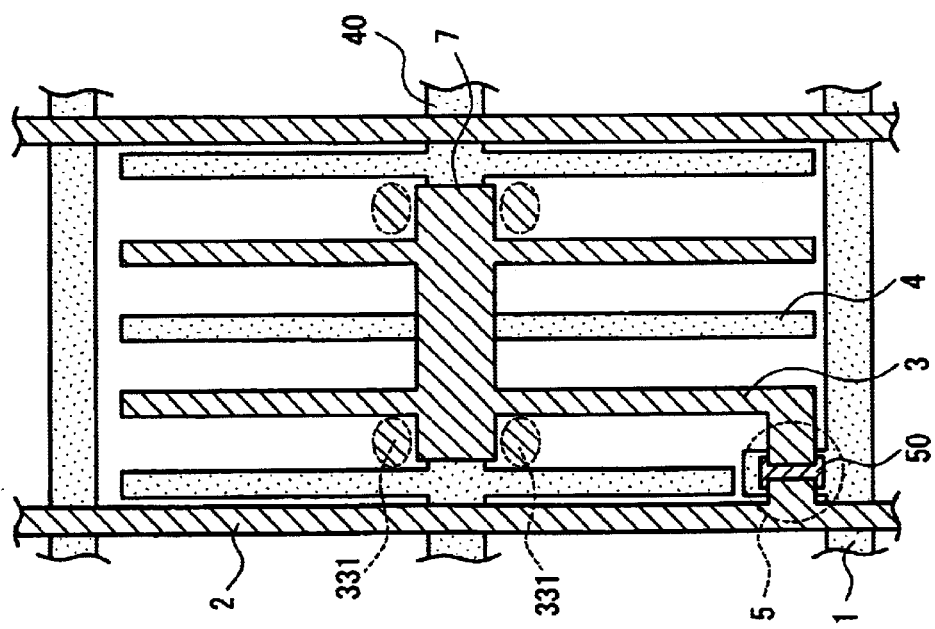
FIG. 14B is a plan view of a termination side of the same.

First, a comparative example will be explained by referring to FIGS. 14A–14B. In the configuration shown in these drawings, a pixel electrode 3 whose shape changes for each pixel is extending beyond a bus bar 40 serving as the common electrode. Thus, the aperture ratio differs depending on the pixel as shown on the feeding side in FIG. 14A and the termination side in FIG. 14B. To solve this problem, by forming the pixel electrode 3 with a transparent electrode or by covering a portion causing a difference in the area of the aperture with a light shield film, the aperture ratio can be maintained constant. However, the problem of unevenness in the electric fields still remains to be solved as will be explained below.

In other words, with respect to storage capacity neighboring portions 331 shown by oblique lines, the pixel electrode 3 is contacting on the feeding end (FIG. 14A) and the bus bar 40 is contacting on the termination side (FIG. 14B) from the side of the capacitive accumulation portion 7. Since both electric potentials are different, a difference in the electric fields arises in the storage capacity neighboring portions 331 between the feeding side and the termination side. Therefore, the orientation of the liquid crystal is changed, and a difference in the display luminance arises, which is observed as display unevenness. When this difference in the display luminance is eliminated by covering this portion using a light shield film, the aperture ratio drops drastically. This is because an area of the light shield film needs to be made considerably large due to the following two reasons. One is that a difference in the liquid crystal orientation caused by the electric fields ranges to several microns from the electrode end, and the other is that several microns are required for patterning when the light shield film is formed or as a dimensional margin for bonding the two substrates together.

On the other hand, according to the configuration of the present invention shown in FIGS. 12A–12B, the electrode that is contacting storage capacity neighboring portions 309 from the side of the capacitive accumulation portion 7 (above or below in the drawings) is the bus bar 40 on the feeding side (FIG. 12A) as well as on the termination side (FIG. 12B). Therefore, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration of FIGS. 14A–14B is sufficient, so that the aperture ratio does not drop drastically.

The configuration of the present embodiment is suitable for achieving a larger size and higher definition than the other embodiments to be described below for the following reasons. One is that a time constant of the scanning electrode 1 is low because the storage capacity is not formed on the scanning electrode 1. The other is that a resistance of the common electrode does not rise and a time constant of the common electrode does not increase, since it is not necessary to form a neck portion in the bus bar 40 serving as the common electrode. Furthermore, due to its simple structure, the design and the processing procedure are advantageously easy.

Seventh Embodiment

Figure 15A:
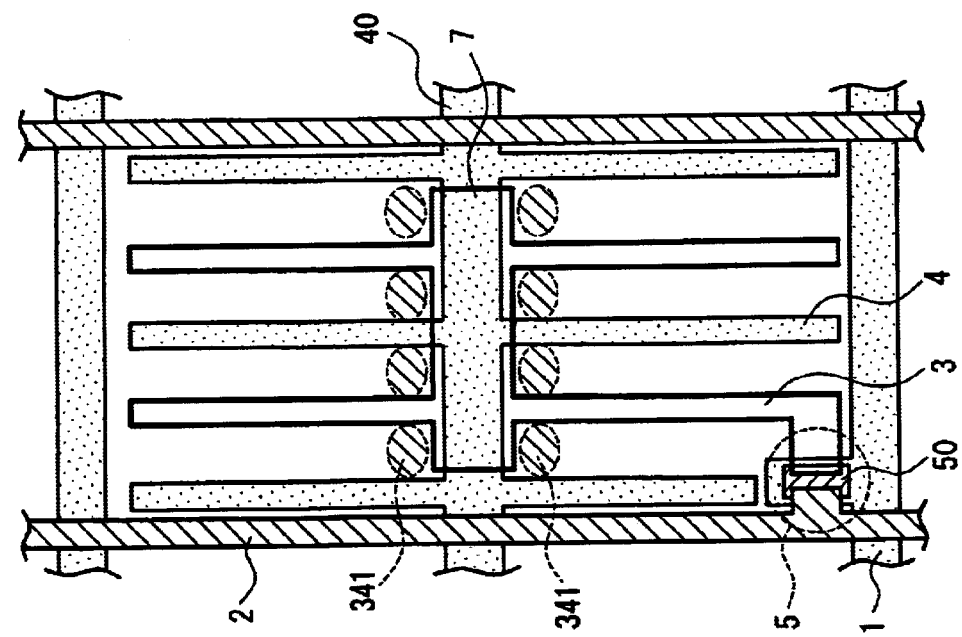
FIG. 15A is a plan view of a feeding side of a liquid crystal display device according to a seventh embodiment of the present invention.
Figure 15B:
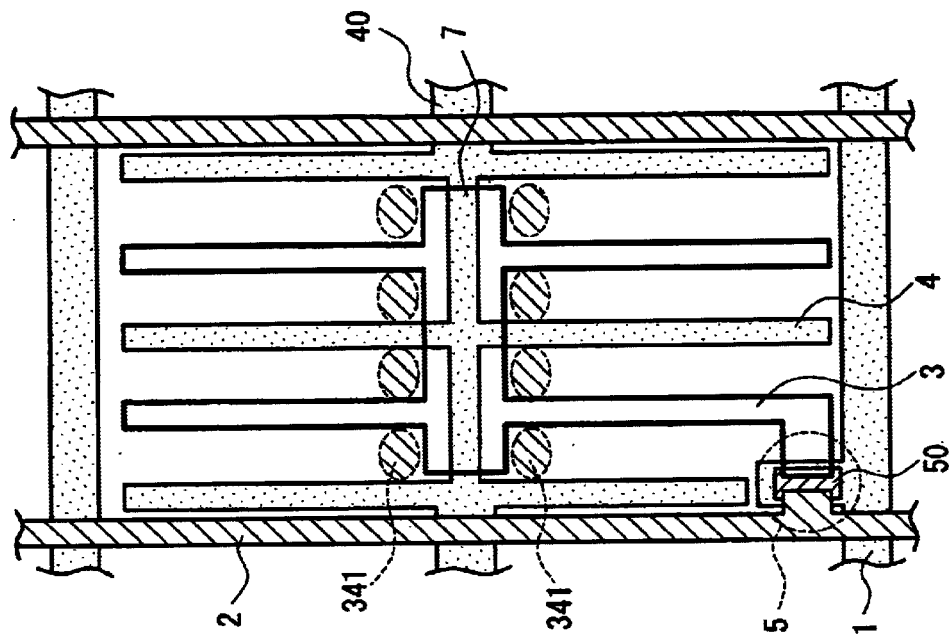
FIG. 15B is a plan view of a termination side of the same.

FIGS. 15A–15B are plan views showing the configuration of a liquid crystal display device according a seventh embodiment of the present invention. In these drawings, a pixel electrode 3 is formed with the same electrode layer as an image signal wiring 2 in the aforementioned embodiment, but hatching is omitted for easiness in seeing, and the outline is drawn thicker.

In the Sixth Embodiment, the area of the pixel electrode 3 comprising the capacitive accumulation portion 7 was changed for each pixel, but in the present embodiment, the storage capacity value is reduced from the feeding side (FIG. 15A) toward the termination side (FIG. 15B) by changing a thickness of a bus bar 40 of a common electrode 4 serving as the common electrode.

According to the configuration of the present embodiment, the electrode that is contacting storage capacity neighboring portions 341 from the side of the capacitive accumulation portion 7 is the pixel electrode 3 on the feeding side as well as on the termination side. Thus, the same effect as that in the Sixth Embodiment can be obtained. In other words, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

Other characteristics of the present embodiment will be described in the following.

First, the present embodiment is suitable for achieving a larger size and higher definition due to the fact that a time constant of the scanning wiring 1 is low because the capacitive accumulation portion 7 is not formed on the scanning wiring 1, and that a resistance of the common electrode does not rise and a time constant of the common electrode does not increase, since it is not necessary to form a neck portion in the bus bar 40.

Secondly, it is effective in improving the yield. For forming the capacitive accumulation portion 7, the pixel electrode 3 needs to run onto a stepped portion formed by the side edge of the bus bar 40. In the configuration shown in FIGS. 12A, 12B, the herringbone-shaped electrode portion runs onto this stepped portion, so that a disconnection may occur in this stepped portion, thereby causing pixel deficiency. According to the configuration of the present embodiment, the pixel electrode 3 runs onto the stepped portion by using the overall width of the capacitive accumulation portion, and the herringbone-shaped electrode portion is positioned on a flat surface. Therefore, a disconnection is less likely to occur in the stepped portion, and a yield is improved.

Thirdly, the capacitive accumulation portion 7 is constructed such that the pixel electrode 3 located in the upper layer close to the liquid crystal layer covers the bus bar 40 located in the lower layer completely, thereby completely preventing the electric fields of the bus bar 40 from leaking. Therefore, even if the shape of the bus bar 40 is varied to change the storage capacity value, the electric fields do not leak, so that a more uniform display can be achieved than the configuration in the Sixth Embodiment.

Eighth Embodiment

Figure 16A:
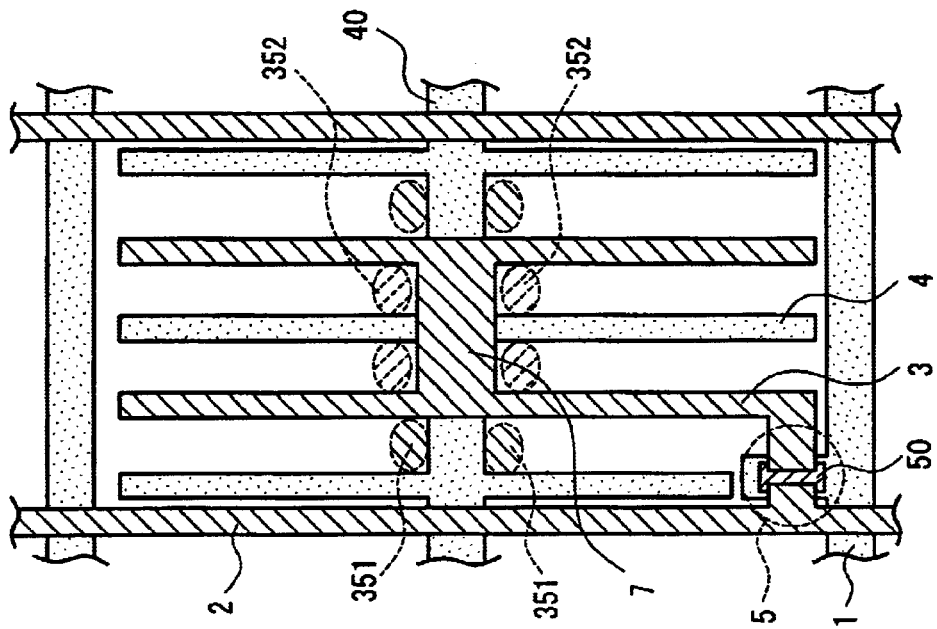
FIG. 16A is a plan view of a feeding side of a liquid crystal display device according to an eighth embodiment of the present invention.
Figure 16B:
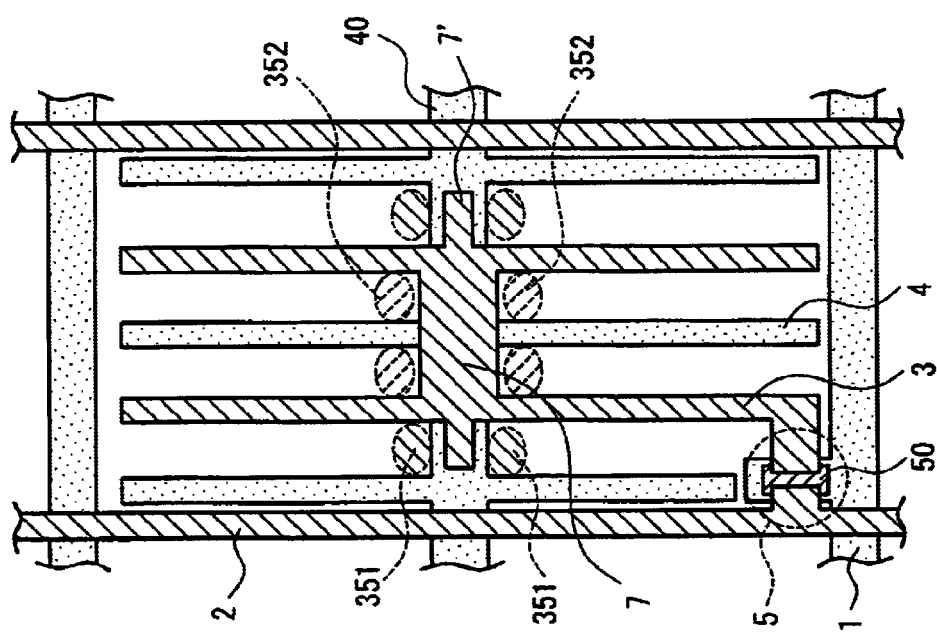
FIG. 16B is a plan view of a termination side of the same.

FIGS. 16A–16B are plan views showing the configuration of a liquid crystal display device according an eighth embodiment of the present invention. This embodiment differs from the Sixth Embodiment in that a portion having a common shape (common shape portion) on the feeding side (FIG. 16A) as well as on the termination side (FIG. 16B) within portions comprising a capacitive accumulation portion 7 in a pixel electrode 3 is extending beyond a bus bar 40, and a portion added on the feeding side 7' is located inside the bus bar 40. In addition, as the aforementioned embodiment, the bus bar 40 acts as the common electrode of the capacitive accumulation portion 7.

According to the configuration of the present embodiment, the electrode that is contacting storage capacity neighboring portions 52 corresponding to the common shape portion of the capacitive accumulation portion 7 from the side of the storage capacity is the pixel electrode 3 on the feeding side as well as on the termination side. On the other hand, the electrode that is contacting storage capacity neighboring portions 51 corresponding to the changed portion of the capacitive accumulation portion 7 from the side of the capacitive accumulation portion 7 is the bus bar 40 on the feeding side as well as on the termination side.

Therefore, also in the present embodiment, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

In the liquid crystal display device of the present embodiment, the portion of the pixel electrode 3 comprising the common portion of the capacitive accumulation portion 7 is constructed so as to extend beyond the bus bar 40. Therefore, the storage capacity can be increased compared to the configuration in the First Embodiment. As a result, the stability of electric potentials in the pixels is enhanced, and a liquid crystal display device that is highly resistant to image disturbance caused by the noise of driving voltage waveforms can be obtained.

Furthermore, since the storage capacity 7 is not formed on the scanning electrode 1, it is suitable for achieving a larger size and higher definition because a time constant of the scanning electrode 1 is low. Furthermore, the present embodiment also has the advantage as that in the Seventh Embodiment in that a disconnection is less likely to occur, and a yield of the product is improved.

Ninth Embodiment

Figure 17A:
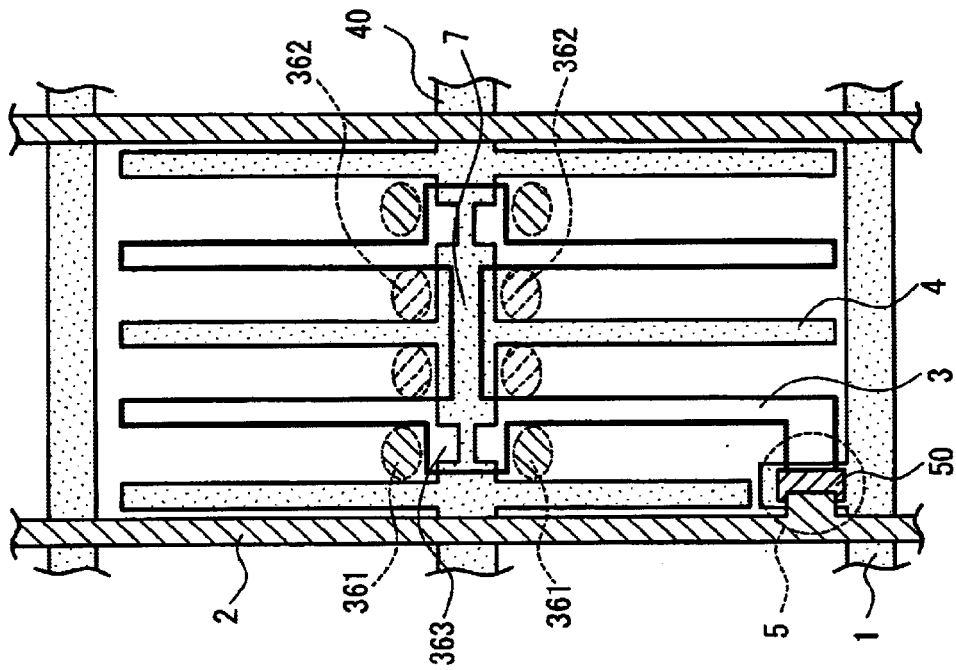
FIG. 17A is a plan view of a feeding side of a liquid crystal display device according to a ninth embodiment of the present invention.
Figure 17B:
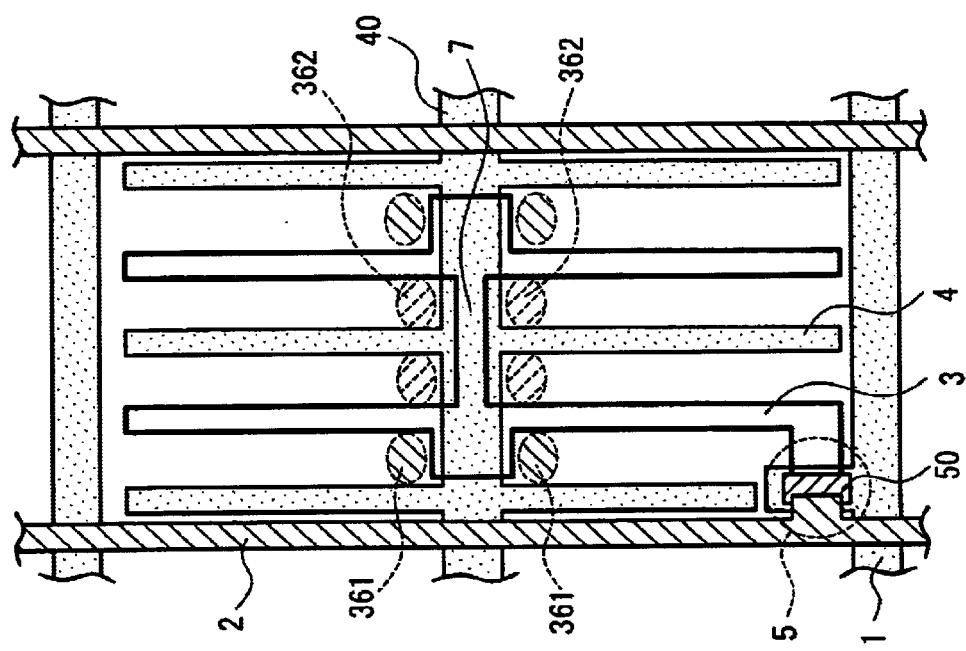
FIG. 17B is a plan view of a termination side of the same.

FIGS. 17A–17B are plan views showing the configuration of a liquid crystal display device according a ninth embodiment of the present invention. In these drawings, a pixel electrode 3 is formed with the same electrode layer as an image signal wiring 2 in the aforementioned embodiment, but hatching is omitted for easiness in seeing, and the outline is drawn thicker.

The feature of the present embodiment is that a common shape portion on the feeding side (FIG. 17A) as well as on the termination side (FIG. 17B) within portions comprising a capacitive accumulation portion 7 in a bus bar 40 is extending beyond the pixel electrode 3, and that a narrowed portion 63 on the termination side is located inside the pixel electrode 3. In addition, as the aforementioned embodiment, the bus bar 40 acts as the common electrode of the capacitive accumulation portion 7.

According to the present embodiment, the electrode that is contacting storage capacity neighboring portions 62 corresponding to the common shape portion of the capacitive accumulation portion 7 from the side of the capacitive accumulation portion 7 is the bus bar 40 on the feeding side as well as on the termination side. The electrode that is contacting storage capacity neighboring portions 61 corresponding to the changed portion of the capacitive accumulation portion 7 from the side of the capacitive accumulation portion 7 certainly is the pixel electrode 3 on the feeding side as well as on the termination side.

Therefore, also in the configuration of the present embodiment, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

Furthermore, since the storage capacity 7 is not formed on the scanning electrode 1, it is suitable for achieving a larger size and higher definition because a time constant of the scanning electrode 1 is low.

Tenth Embodiment

Figure 18A:
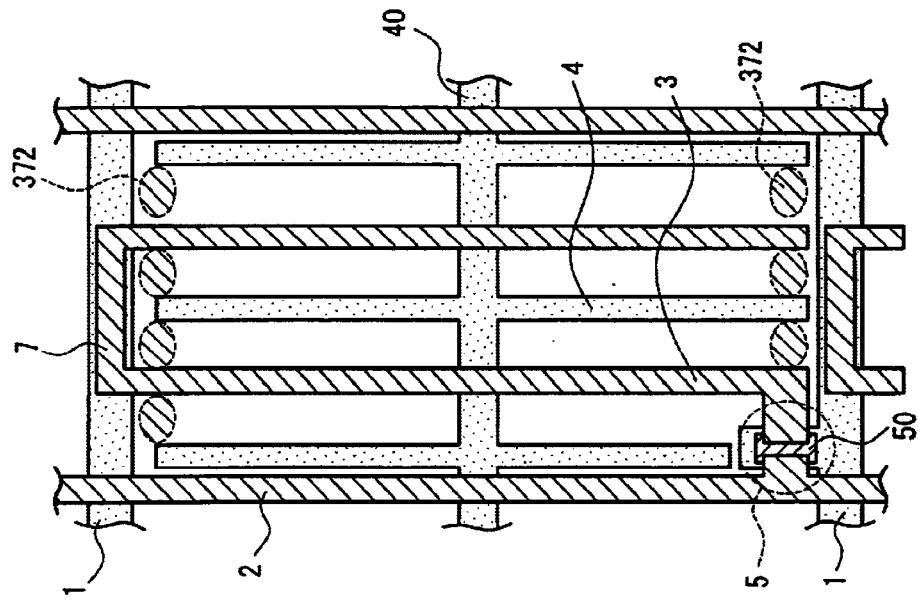
FIG. 18A is a plan view of a feeding side of a liquid crystal display device according to a tenth embodiment of the present invention.
Figure 18B:
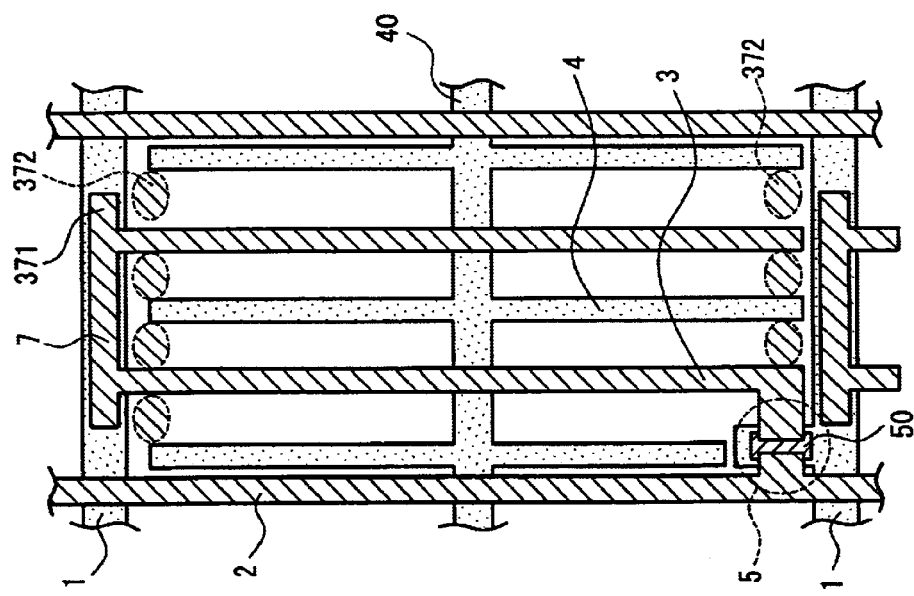
FIG. 18B is a plan view of a termination side of the same.

FIGS. 18A–18B are plan views showing the configuration of a liquid crystal display device according a tenth embodiment of the present invention. In the present embodiment, as a place for forming a capacitive accumulation portion 7, a scanning electrode 1 is used instead of the bus bar 40 in the aforementioned embodiment, and the capacitive accumulation portion 7 is formed by disposing an interlayer insulating film between the scanning electrode 1 and a pixel electrode 3.

In the portion where the capacitive accumulation portion 7 is formed, the outline of the pixel electrode 3 is located inside the scanning electrode 1. An overlapping area is reduced gradually from the feeding side (FIG. 18A) toward the termination side (FIG. 18B) by changing the shape of the pixel electrode 3 for each pixel. As a result thereof, the value of the storage capacity also is reduced gradually from the feeding end toward the termination.

Also, the present embodiment, as in the First Embodiment, is patterned such that the pixel electrode 3 serving as one electrode whose shape changes for each pixel is located inside the scanning electrode 1 serving as the other electrode in the overlapping portion. Therefore, even if a protruding portion 71 is provided in the pixel electrode 3, the electric fields in the circumference of the capacitive accumulation portion 7 and the aperture ratio of the pixel can be maintained constant independently of the pixel. Thus, a uniform display without any display unevenness can be achieved.

Furthermore, according to the configuration of the present embodiment, the electrode that is contacting storage capacity neighboring portions 72 from the side of the capacitive accumulation portion 7 is the scanning electrode 1 on the feeding side as well as on the termination side. Therefore, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

In the configuration of the present embodiment, the capacitive accumulation portion 7 is formed on the scanning electrode 1, so that there is an advantage in that a width of the bus bar 40 of the common electrode 4 can be reduced and thus the aperture ratio is raised, compared to the devices of the Sixth Embodiment to the Ninth Embodiment. Furthermore, due to its simple structure, the design and the processing procedure are advantageously easy.

Eleventh Embodiment

FIGS. 19A–19B are plan views showing the configuration of a liquid crystal display device according an eleventh embodiment of the present invention. In these drawings, a pixel electrode 3 is formed with the same electrode layer as an image signal wiring 2, but hatching is omitted for easiness in seeing, and the outline is drawn thicker.

In the Tenth Embodiment, the area of the pixel electrode 3 comprising the capacitive accumulation portion 7 was changed, but in the present embodiment, a storage capacity value is reduced from the feeding side (FIG. 19A) toward the termination side (FIG. 19B) by changing a thickness of a scanning electrode 1 for each pixel.

Also, the present embodiment, as in the Tenth Embodiment, is patterned such that the scanning electrode 1 whose shape changes for each pixel is located inside the pixel electrode 3 whose shape does not change in the overlapping portion. Therefore, even if a concave portion is provided in the scanning electrode 1, the electric fields in the circumference of the storage capacity and the aperture ratio of the pixel are maintained constant independently of the pixel. Thus, a uniform display without any display unevenness can be achieved.

According to the present embodiment, the electrode that is contacting storage capacity neighboring portions 81 from the side of the capacitive accumulation portion 7 is the scanning electrode 1 on the feeding side as well as on the termination side. The electrode that is contacting storage capacity neighboring portions 82 is the pixel electrode 3 on the feeding side as well as on the termination side.

Therefore, even if an area of the capacitive accumulation portion 7 differs for each pixel as in the aforementioned embodiments, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

In the liquid crystal display device of the present embodiment, since the capacitive accumulation portion 7 is formed on the scanning electrode 1, there is an advantage in that a width of the bus bar 40 of the common electrode 4 can be reduced and thus the aperture ratio is raised.

Figure 20A:
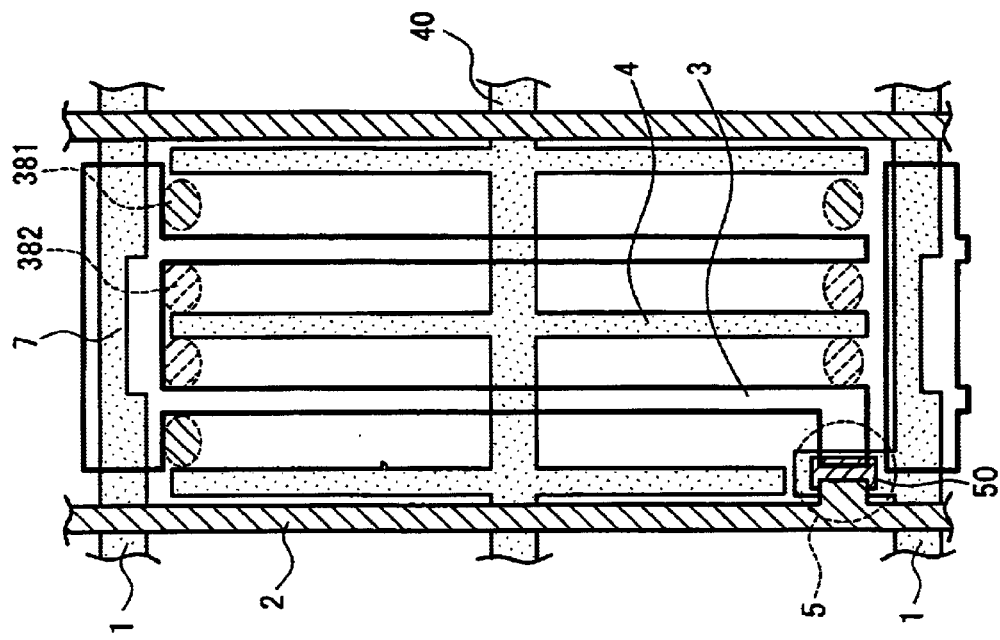
FIG. 20A is a plan view of a feeding side of a liquid crystal display device according to a twelfth embodiment of the present invention.
Figure 20B:
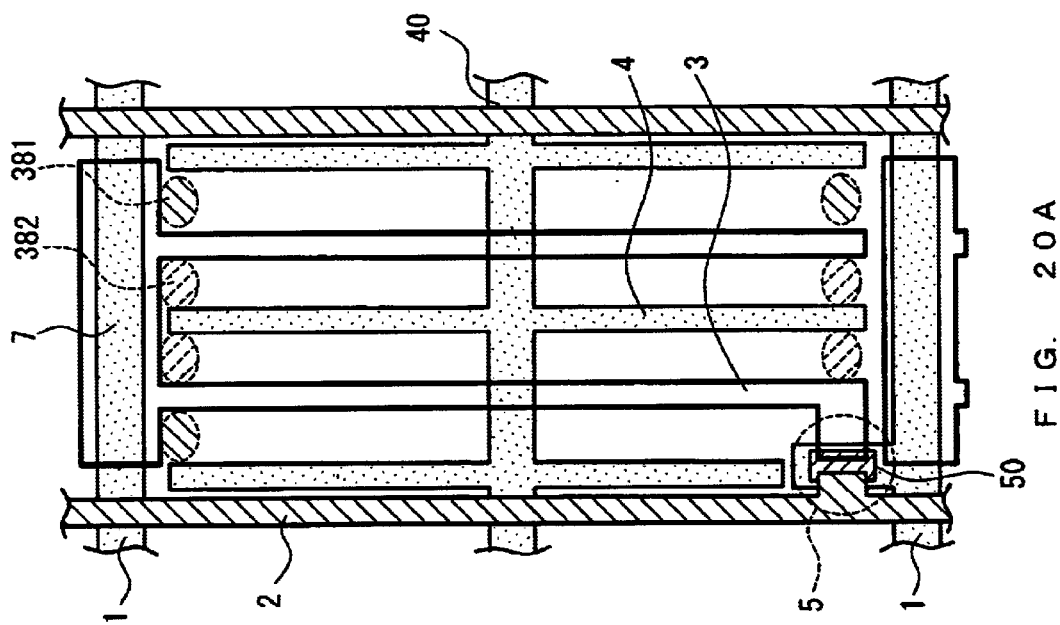
FIG. 20B is a plan view of a termination side of the same.

Furthermore, as shown in FIGS. 20A–20B, when the portion where the capacitive accumulation portion 7 is formed has a structure that is extending toward right and left sides, the capacitive accumulation portion 7 can be enlarged. As a result, the stability of electric potentials in the pixels is enhanced, and a liquid crystal display device that is highly resistant to image disturbance caused by the noise of driving voltage waveforms can be obtained.

Twelfth Embodiment

FIGS. 21A–21B are plan views showing the configuration of a liquid crystal display device according a twelfth embodiment of the present invention. This embodiment differs from the Tenth Embodiment in that a common shape portion on the feeding side (FIG. 21A) as well as on the termination side (FIG. 21B) within portions comprising a capacitive accumulation portion 7 in a pixel electrode 3 is extending beyond a scanning electrode 1, and that a portion added on the feeding side 93 is located inside the scanning electrode 1.

According to the present embodiment, the electrode that is contacting storage capacity neighboring portions 92 corresponding to the common shape portion of the capacitive accumulation portion 7 from the side of the capacitive accumulation portion 7 is the pixel electrode 3 on the feeding side as well as on the termination side. The electrode that is contacting storage capacity neighboring portions 91 corresponding to the changed portion of the capacitive accumulation portion 7 from the side of the capacitive accumulation portion 7 is the scanning electrode 1 on the feeding side as well as on the termination side.

Therefore, also in the configuration of the present embodiment, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

In the liquid crystal display device of the present embodiment, the pixel electrode 3 comprising the common shape portion of the capacitive accumulation portion 7 is constructed so as to extend beyond the scanning electrode 1, so that the storage capacity can be increased compared to the configuration in the Tenth Embodiment. As a result, the stability of the electric electrode 3 is enhanced, and a liquid crystal display device that is highly resistant to image disturbance caused by the noise of driving voltage waveforms can be obtained.

Furthermore, since the capacitive accumulation portion 7 is formed on the scanning electrode 1, there is an advantage in that a width of the bus bar 40 can be reduced and thus the aperture ratio is raised. Furthermore, as in the configuration described in the Seventh Embodiment and so on, there is also an advantage that a disconnection is less likely to occur and thus a yield of the product is improved.

Thirteenth Embodiment

FIGS. 22A–22B are plan views showing the configuration of a liquid crystal display device according a thirteenth embodiment of the present invention. In these drawings, a pixel electrode 3 is formed with the same electrode layer as an image signal wiring 2, but hatching is omitted for easiness in seeing, and the outline is drawn thicker.

The feature of the present embodiment is that a common shape portion on the feeding side (FIG. 22A) as well as on the termination side (FIG. 22B) within portions comprising a capacitive accumulation portion 7 in a scanning electrode 1 is extending beyond the pixel electrode 3, and that in a narrowed portion 413 on the termination side, the scanning electrode 1 is located inside the pixel electrode 3. By changing a width of the scanning electrode 1 in this portion 413, the storage capacity value is varied.

According to the configuration of the present embodiment, the electrode that is contacting storage capacity neighboring portions 412 corresponding to the changed portion of the capacitive accumulation portion 7 from the side of the capacitive accumulation portion 7 is the pixel electrode 3 on the feeding side as well as on the termination side. The electrode that is contacting storage capacity neighboring portions 411 corresponding to the common shape portion of the capacitive accumulation portion 7 from the side of the capacitive accumulation portion 7 is the scanning electrode 1 on the feeding side as well as on the termination side.

Therefore, also in the present embodiment, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 14A–14B is sufficient, so that the aperture ratio does not drop drastically.

Furthermore, since the capacitive accumulation portion 7 is formed on the scanning electrode 1, there is an advantage in that a width of the bus bar 40 can be reduced and thus the aperture ratio is raised.

Fourteenth Embodiment

Figure 23A:
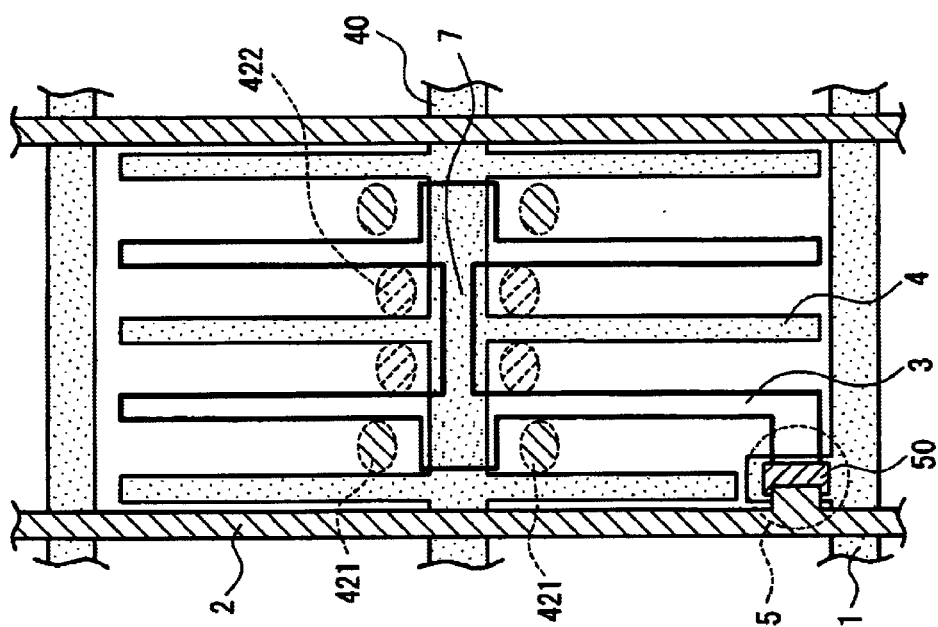
FIG. 23A is a plan view of a feeding side of a liquid crystal display device according to a fourteenth embodiment of the present invention.
Figure 23B:
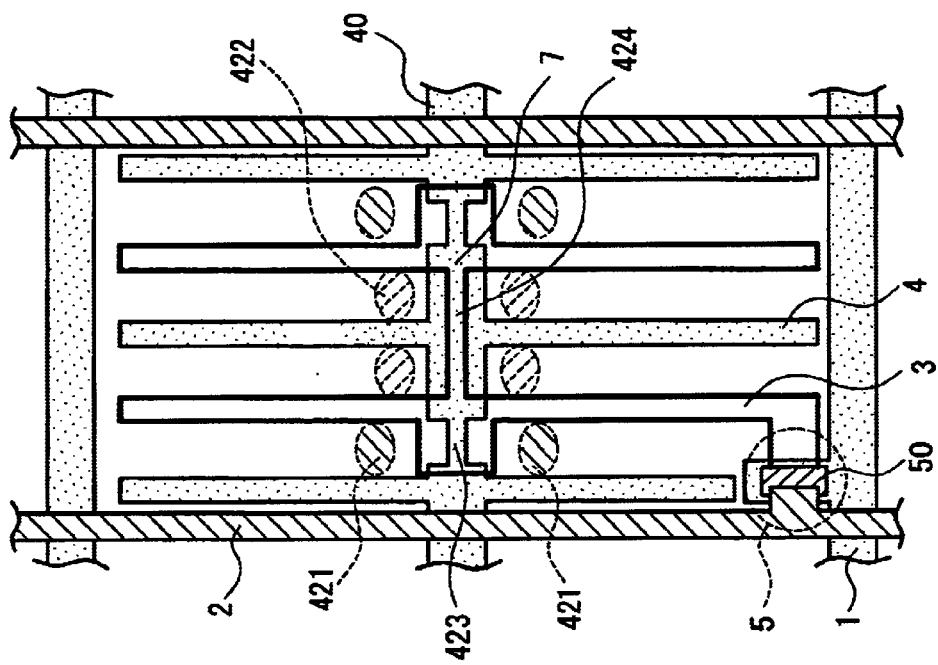
FIG. 23B is a plan view of a termination side of the same.

FIGS. 23A–23B are plan views showing the configuration of a liquid crystal display device according a fourteenth embodiment of the present invention. In these drawings, a pixel electrode 3 is formed with the same electrode layer as an image signal wiring 2, but hatching is omitted for easiness in seeing, and the outline is drawn thicker.

The feature of the present embodiment is that a capacitive accumulation portion 7 is formed between the pixel electrode 3 and a bus bar 40 acting as the common electrode, and by changing the shapes of both the pixel electrode 3 and the bus bar 40, the storage capacity value is varied for each pixel. In a narrow portion 424 of the pixel electrode 3 in FIG. 23B and in a portion corresponding thereto in FIG. 23A, the bus bar 40 is extending beyond the pixel electrode 3. In a narrow portion 423 of the bus bar 40 in FIG. 23B and in a portion corresponding thereto in FIG. 23A, the pixel electrode 3 is extending beyond the bus bar 40.

According to the present embodiment, the electrode that is contacting storage capacity neighboring portions 421 from the side of the capacitive accumulation portion 7 is the pixel electrode 3 on the feeding side (FIG. 23A) as well as on the termination side (FIG. 23B). The electrode that is contacting storage capacity neighboring portions 422 from the side of the capacitive accumulation portion 7 is the bus bar 4 on the feeding side as well as on the termination side.

Therefore, also in the configuration of the present embodiment, even if an area of the capacitive accumulation portion 7 differs for each pixel, the electric fields in a portion related to the display (a gap portion between the pixel electrode 3 and the common electrode 4) are maintained evenly. Furthermore, the aperture ratio is the same even if a light shield film is not formed. Moreover, even in the case of forming a light shield film to improve contrast, a light shield film with a narrower width than that in the configuration shown as a comparative example in FIGS. 3A–3B is sufficient, so that the aperture ratio does not drop drastically.

In the present embodiment, the storage capacity value is changed by changing the two electrode patterns. For manufacturing a liquid crystal display device, electrodes generally are patterned by the photolithographic method, and this patterning often causes unevenness in the size due to a production lot or a position within the screen. When the storage capacity is differentiated by changing one electrode pattern, this pattern unevenness directly leads to the unevenness in the storage capacity. On the contrary, the present embodiment uses a combination of pattern changes in two electrodes, so that the dimensional unevenness in the patterning is less likely to lead to the unevenness in the storage capacity. In other words, an occurrence of display unevenness is reduced, and defective products are less likely to be produced, so that the yield is improved.

Figure 24A:
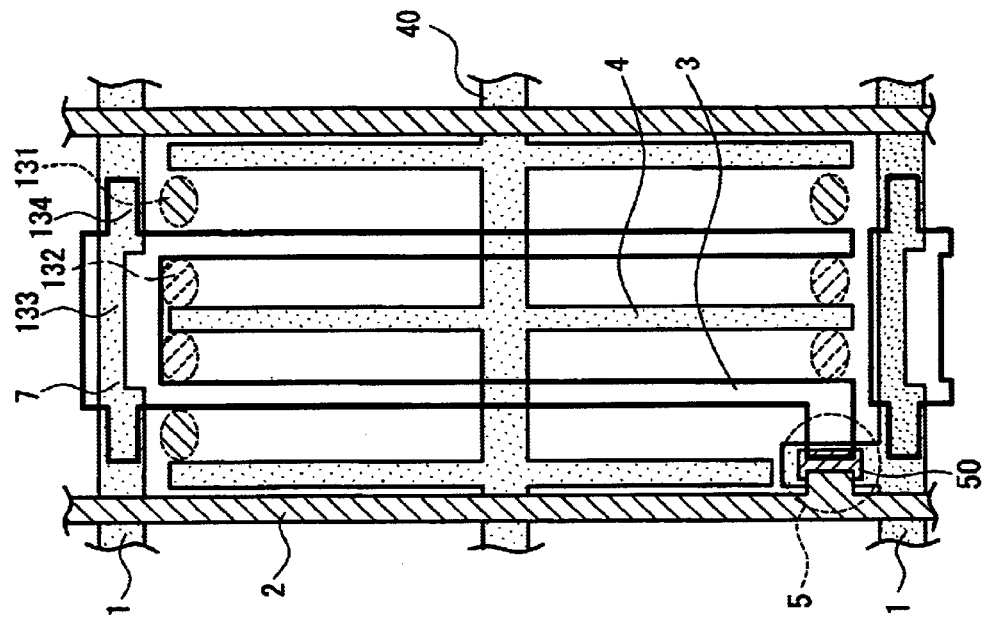
FIG. 24A is a plan view of a feeding side of a liquid crystal display device according to a fourteenth embodiment of the present invention.
Figure 24B:
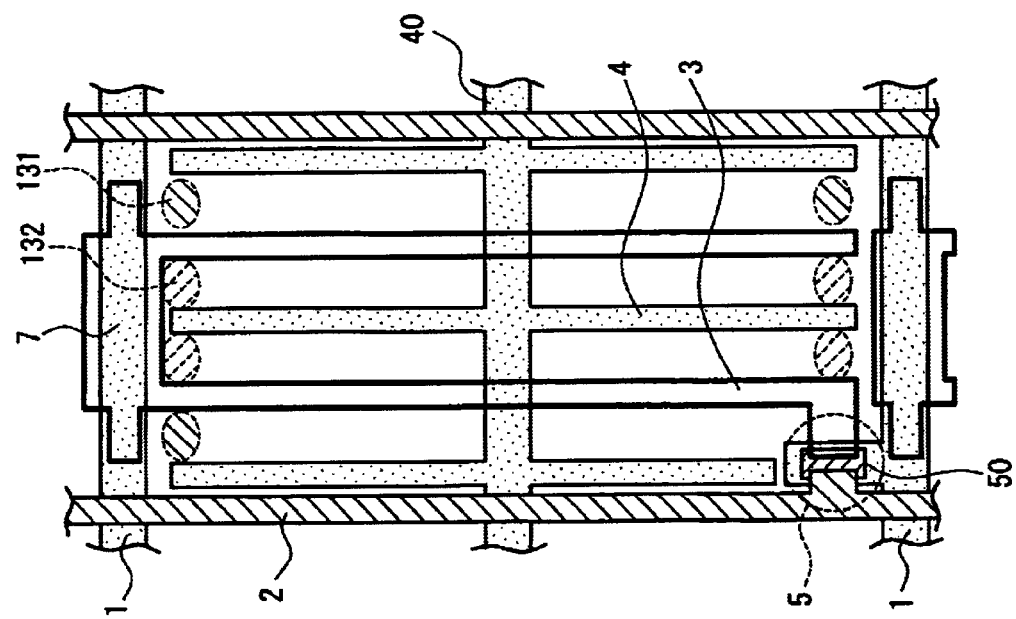
FIG. 24B is a plan view of a termination side of the same.

In addition, the idea of the present embodiment is effective also for the configuration in which the capacitive accumulation portion 7 is formed between the pixel electrode 3 and the scanning electrode 1. In this case, the configuration of FIGS. 24A–24B may be used instead of the configuration of FIGS. 23A–23B. In a narrow portion 134 of the pixel electrode 3 in FIG. 24B and in a portion corresponding thereto in FIG. 24A, the scanning electrode 1 is extending beyond the pixel electrode 3. In a narrow portion 133 of the scanning electrode 1 and in a portion corresponding thereto in FIG. 24A, the pixel electrode 3 is extending beyond the scanning electrode 1.

Fifteenth Embodiment

Figure 25B:
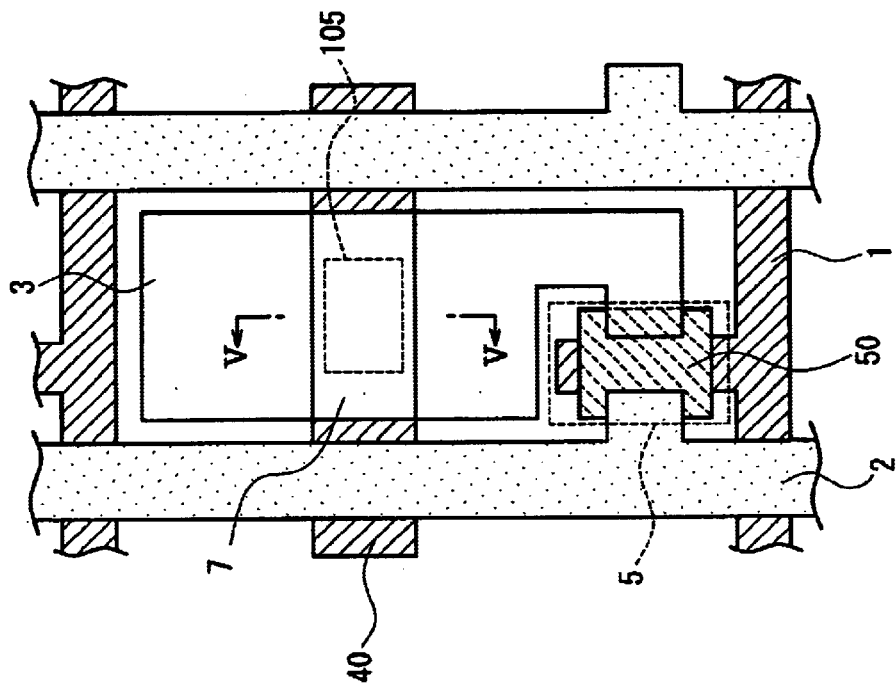
FIG. 25B is a plan view of a termination side of the same.
Figure 25A:
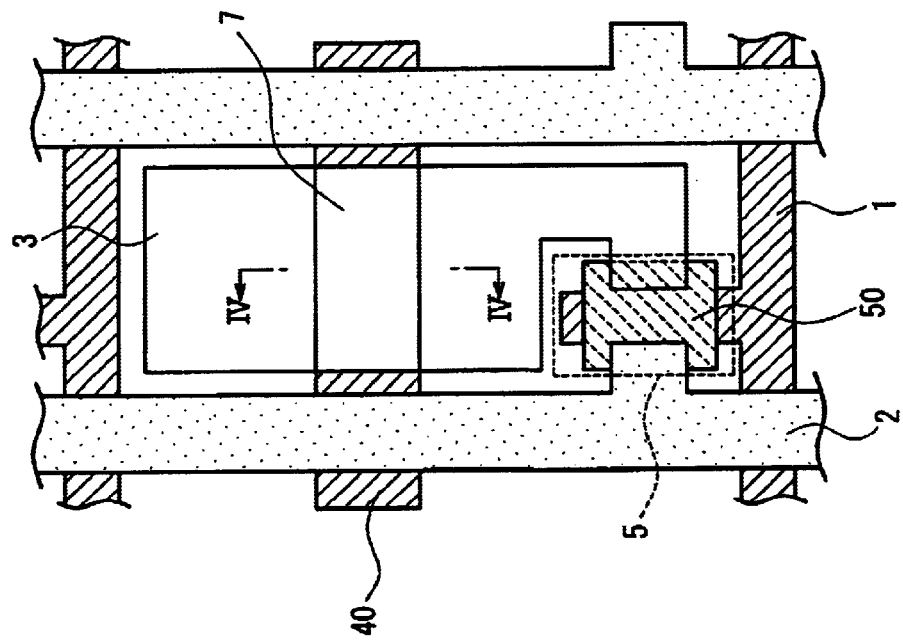
FIG. 25A is a plan view of a feeding side of a liquid crystal display device according to a fifteenth embodiment of the present invention.

FIGS. 25A–25B are plan views showing the configuration of a liquid crystal display device according a fifteenth embodiment of the present invention. FIGS. 26A–26B are cross-sectional views of the same.

In the First Embodiment, the interlayer insulating film 103 is disposed between the bus bar 40 of the common electrode and the pixel electrode 3 to form the capacitive accumulation portion 7, but in the present embodiment, a portion with a different thickness 105 is provided in the interlayer insulating film, and the storage capacity value is changed by changing an area thereof for each pixel.

An array substrate of the liquid crystal display device in the present embodiment can be produced, for example, in the following manner. First, a first conductive layer mainly composed of a metal such as aluminum (Al) is formed as a film on a glass serving as an array substrate by the sputtering method etc., and then, patterns are formed on the same plane by the photolithographic method to obtain a scanning wiring and a common electrode. Next, an insulating film such as silicon nitride (SiNx) is deposited as a first interlayer insulating film by the CVD method etc., and then, a semiconductor layer made of a-Si or the like is formed by the CVD method etc. Then, a second conductive layer is formed according to the same procedure as for the first conductive layer, which is patterned to obtain a source wiring, a pixel electrode, and a TFT. Thereafter, a second interlayer insulating film is formed according to the same procedure as for the first interlayer insulating film, and this interlayer insulating film is patterned by the photolithographic method to obtain an interlayer insulating film having a different thickness for each pixel. Simultaneously, a contact hole is formed. Furthermore, a third conductive layer is formed and patterned according to the same procedure as for the first conductive layer to obtain a pixel electrode and a capacitive accumulation portion, and the TFT and the pixel electrode are connected electrically through the contact hole.

According to the present embodiment, the storage capacity value can be changed without changing the shape of the pixel electrode 3 or the bus bar 40 of the common electrode for each pixel. Therefore, the same effect as that described in the First Embodiment can be obtained. In other words, the external shape of the electrode can be formed to be the same, so that the aperture ratio can be maintained constant even if the storage capacity value is varied for each pixel.

Sixteenth Embodiment

In the Fifteenth Embodiment, the same material was used for the first interlayer insulating film and the second interlayer insulating film comprising the capacitive accumulation portion 7. In the present embodiment, however, a first interlayer insulating film is made of silicon oxide (SiOx), and a second interlayer insulating film is made of silicon nitride (SiNx) as in the Fifteenth Embodiment.

According to the present embodiment, two different insulating layers are used, so that the selectivity for etching by the chemical dry etching method etc. can be provided, and the thickness of the insulating layer can be controlled more easily.

Seventeenth Embodiment

Figure 27B:
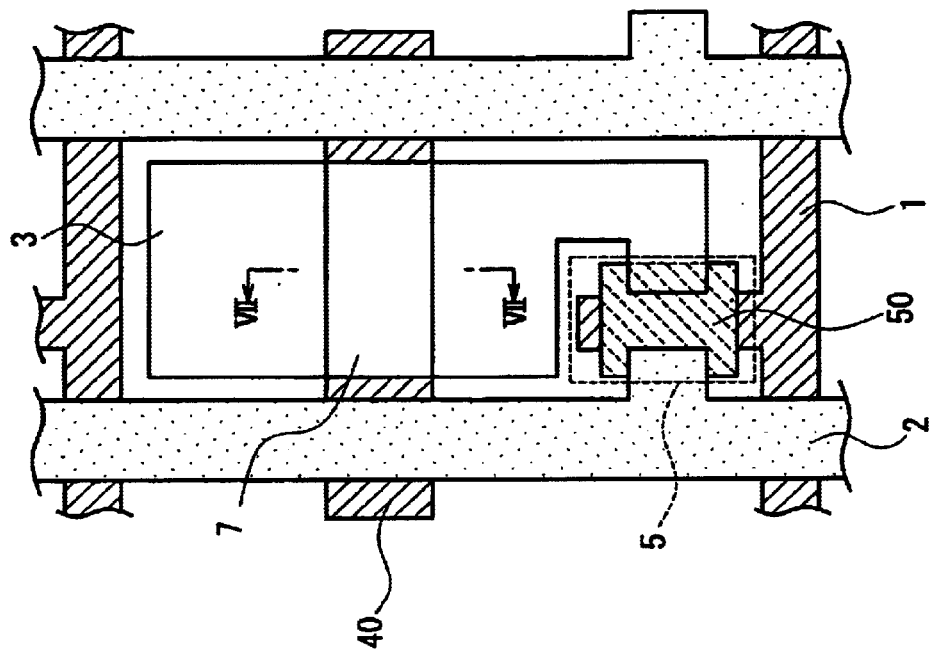
FIG. 27B is a plan view of a termination side of the same.
Figure 27A:
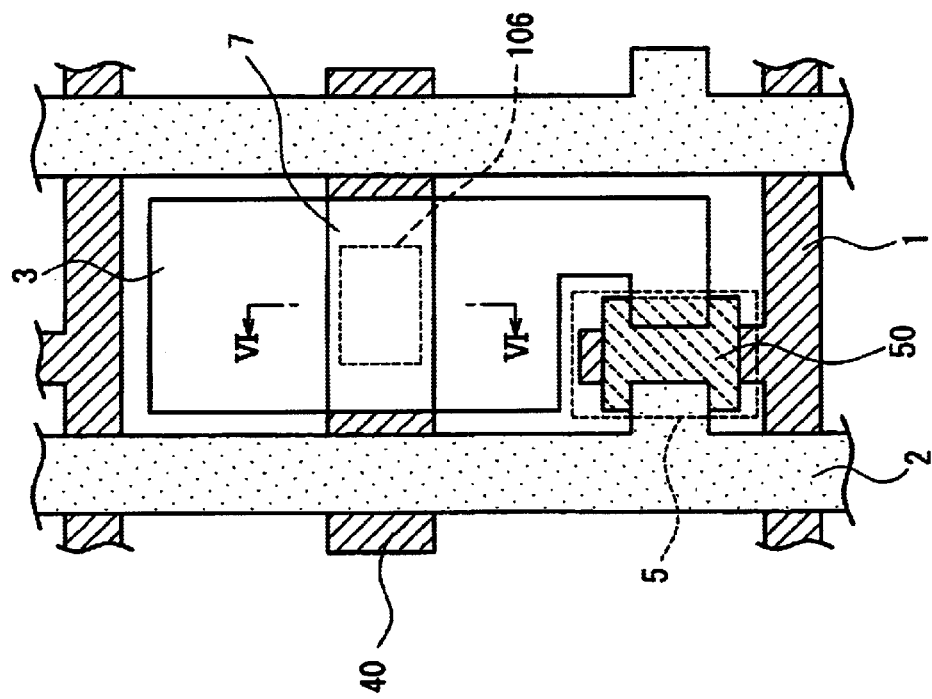
FIG. 27A is a plan view of a feeding side of a liquid crystal display device according to a seventeenth embodiment of the present invention.

FIGS. 27A–27B are plan views showing the configuration of a liquid crystal display device according a seventeenth embodiment of the present invention. FIGS. 28A–28B are cross-sectional views of the same.

In the Fifteenth and Sixteenth Embodiments, a protruding portion is provided in the interlayer insulating film between the electrodes comprising the capacitive accumulation portion 7 to change the storage capacity for each pixel. In the present embodiment, however, a concave portion is provided in an interlayer insulating film, and the storage capacity is changed by changing an area thereof.

According to the present embodiment, the storage capacity value can be changed without changing the shape of the pixel electrode 3 or the bus bar 40 of the common electrode for each pixel. Therefore, the external shape of the electrode can be formed to be the same, so that the aperture ratio can be maintained constant even if the storage capacity value is varied for each pixel. Furthermore, by forming the concave portion, the interlayer insulating film can become thicker in the edge portion of the bus bar of the common electrode, so that a short circuit that is likely to occur in edge portions of electrodes can be avoided.

Eighteenth Embodiment

Figure 29A:
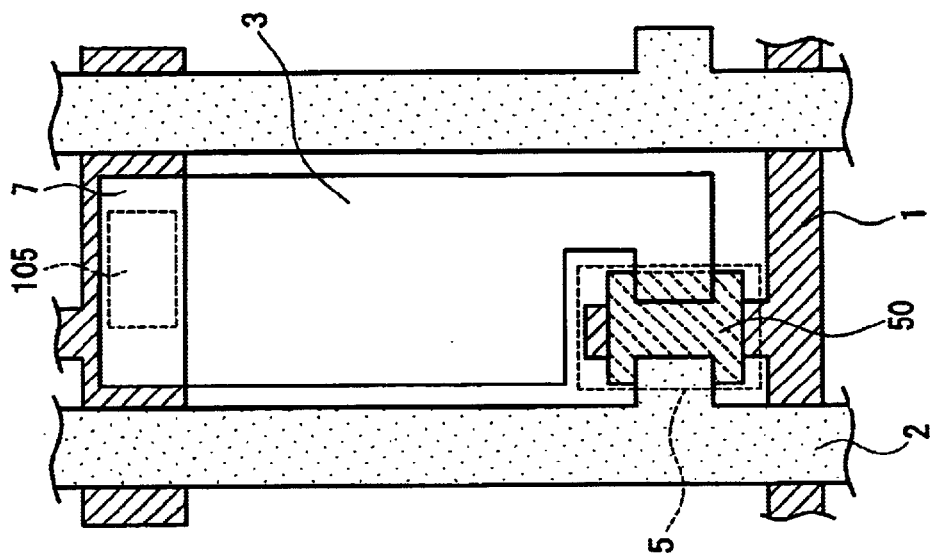
FIG. 29A is a plan view of a feeding side of a liquid crystal display device according to an eighteenth embodiment of the present invention.
Figure 29B:
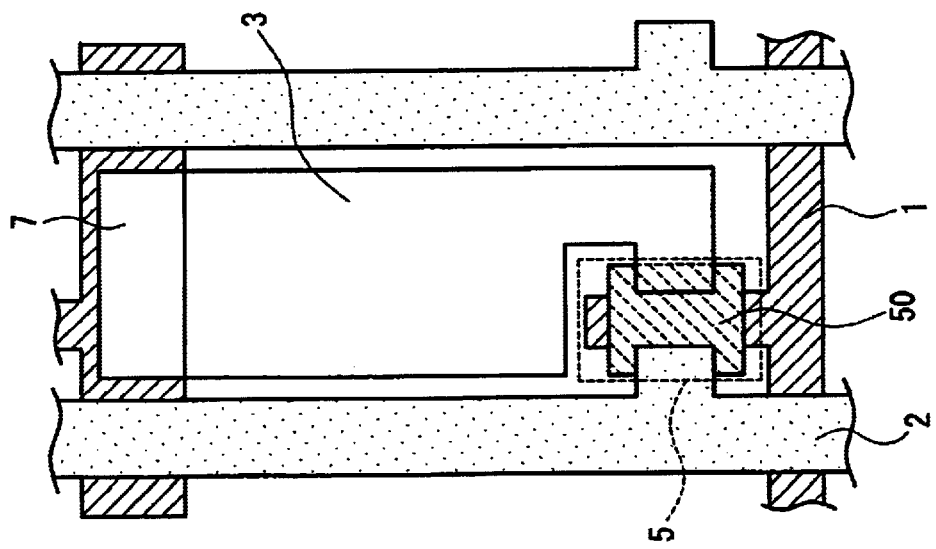
FIG. 29B is a plan view of a termination side of the same.

FIGS. 29A–29B are plan views showing the configuration of a liquid crystal display device according an eighteenth embodiment of the present invention.

In the present embodiment, a scanning electrode 1 is used instead of the bus bar 40 in the Fifteenth Embodiment as a place for forming the capacitive accumulation portion 7, and an interlayer insulating film is disposed between the scanning electrode 1 and a pixel electrode 3 to form the capacitive accumulation portion 7.

In the part where the capacitive accumulation portion 7 is formed, a protruding portion is provided in the interlayer insulating film, and an area thereof is increased gradually from the feeding side (FIG. 29A) to the termination side (FIG. 29B). As a result, the value of the storage capacity can be reduced gradually from the feeding end toward the termination, so that the same effect as that in the Fifteenth Embodiment can be obtained.

In the liquid crystal display device of the present embodiment, the capacitive accumulation portion 7 is formed on the scanning electrode 1, so that the bus bar of the common electrode does not need to be formed as in the devices described from the Sixth Embodiment to the Ninth Embodiment, and thus, there is an advantage that the aperture ratio is raised. Furthermore, due to its simple structure, the design and the processing procedure are advantageously easy.

Nineteenth Embodiment

Figure 30B:
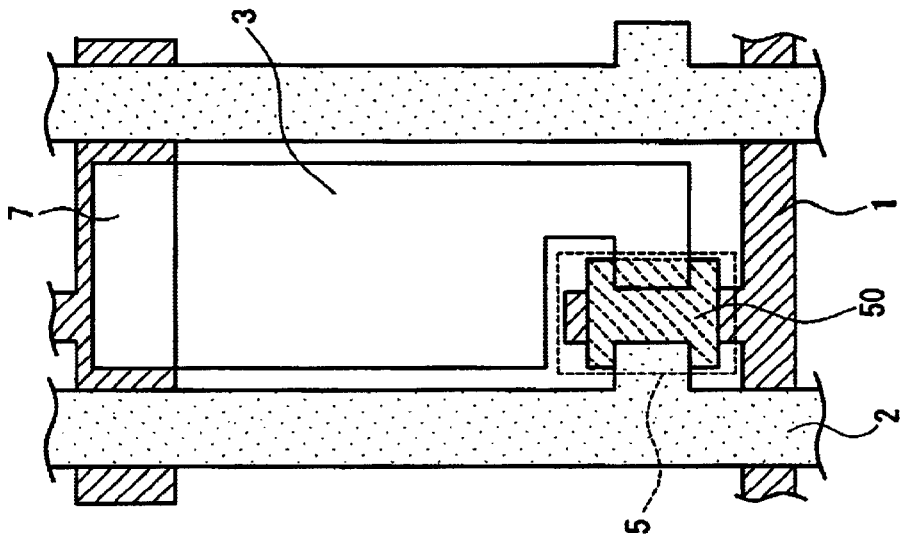
FIG. 30B is a plan view of a termination side of the same.
Figure 30A:
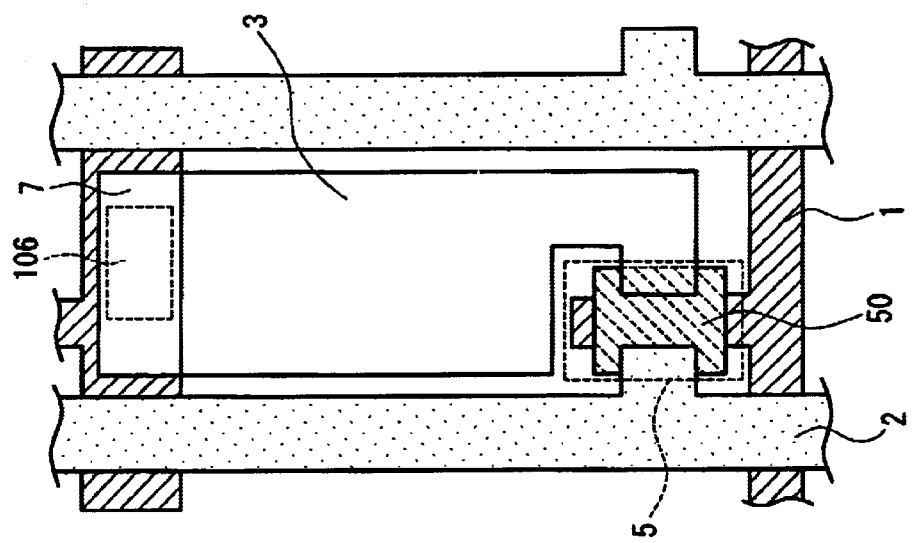
FIG. 30A is a plan view of a feeding side of a liquid crystal display device according to a nineteenth embodiment of the present invention.

FIGS. 30A–30B are plan views showing the configuration of a liquid crystal display device according a nineteenth embodiment of the present invention.

In the Eighteenth Embodiment, a protruding portion is provided in the interlayer insulating film between the electrodes comprising the capacitive accumulation portion 7 to change the storage capacity for each pixel. In the present embodiment, however, a concave portion is provided in an interlayer insulating film, and the storage capacity is changed by changing an area thereof. According to the present embodiment, the storage capacity value can be changed without changing the shape of the pixel electrode 3 or the scanning electrode 1 for each pixel. Therefore, the external shape of the electrode can be formed to be the same, so that the aperture ratio can be maintained constant even if the storage capacity value is varied for each pixel. Furthermore, by forming the concave portion, the interlayer insulating film in the edge portion of the bus bar of the common electrode can become thicker, so that a short circuit that is likely to occur in edge portions of electrodes can be avoided.

Twentieth Embodiment

Figure 31A:
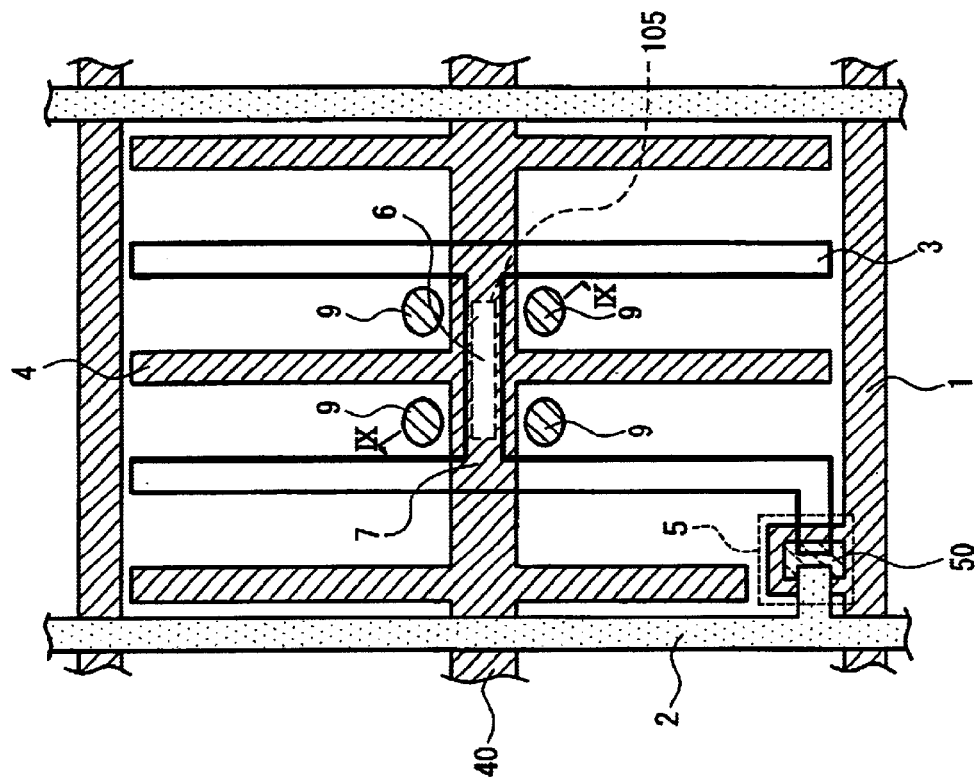
FIG. 31A is a plan view of a feeding side of a liquid crystal display device according to a twentieth embodiment of the present invention.
Figure 31B:
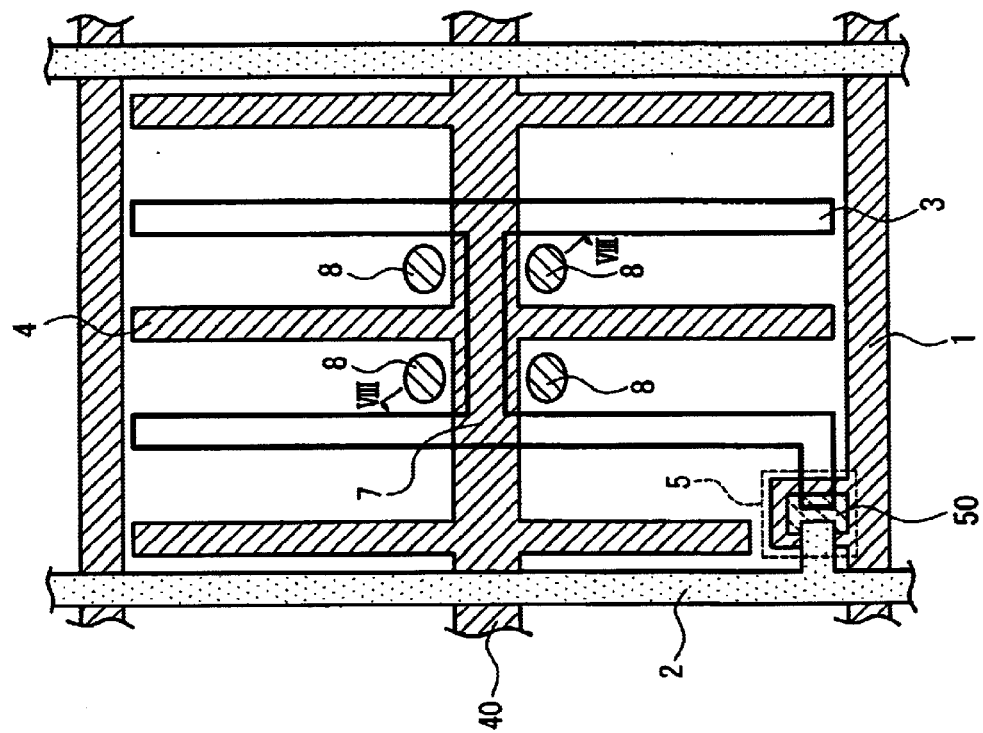
FIG. 31B is a plan view of a termination side of the same.

FIGS. 31A–31B are plan views showing the configuration of a lateral electric field method liquid crystal display device according a nineteenth embodiment of the present invention. FIGS. 32A–32B are cross-sectional views of the same.

In the Second Embodiment, the interlayer insulating film 103 is disposed between the bus bar 40 of the common electrode and the pixel electrode 3 to form the capacitive accumulation portion 7, but in the present embodiment, a portion with a different thickness 105 is provided in an interlayer insulating film, and the storage capacity value is changed by changing an area thereof for each pixel.

According to the present embodiment, the storage capacity value can be changed without changing the shape of the pixel electrode 3 or the bus bar 40 of the common electrode for each pixel. Therefore, the same effect as that described in the Second Embodiment can be obtained. In other words, the external shape of the electrode can be formed to be the same, so that the aperture ratio can be maintained constant even if the storage capacity value is varied for each pixel.

Twenty-first Embodiment

Figure 33B:
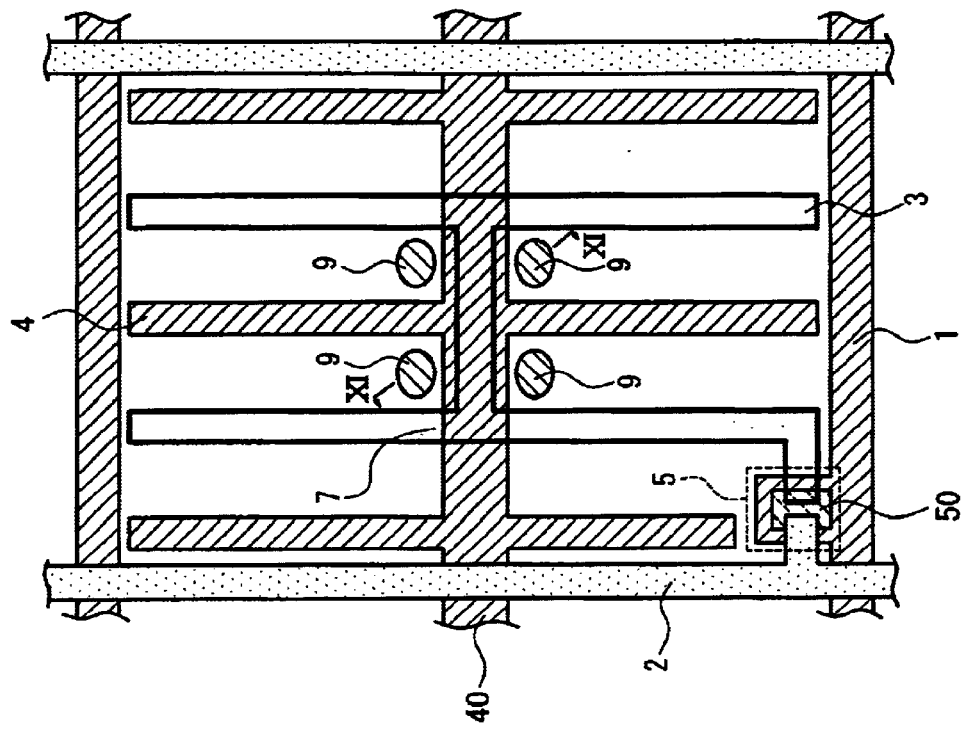
FIG. 33B is a plan view of a termination side of the same.
Figure 33A:
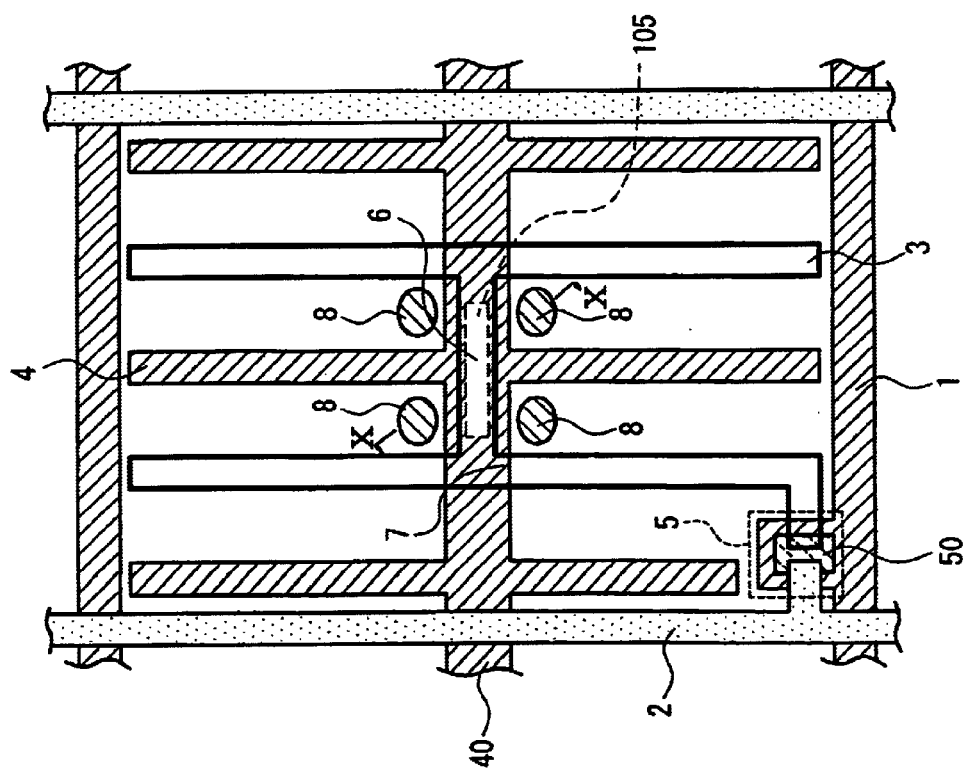
FIG. 33A is a plan view of a feeding side of a liquid crystal display device according to a twenty-first embodiment of the present invention.
Figures 34A, 34B:
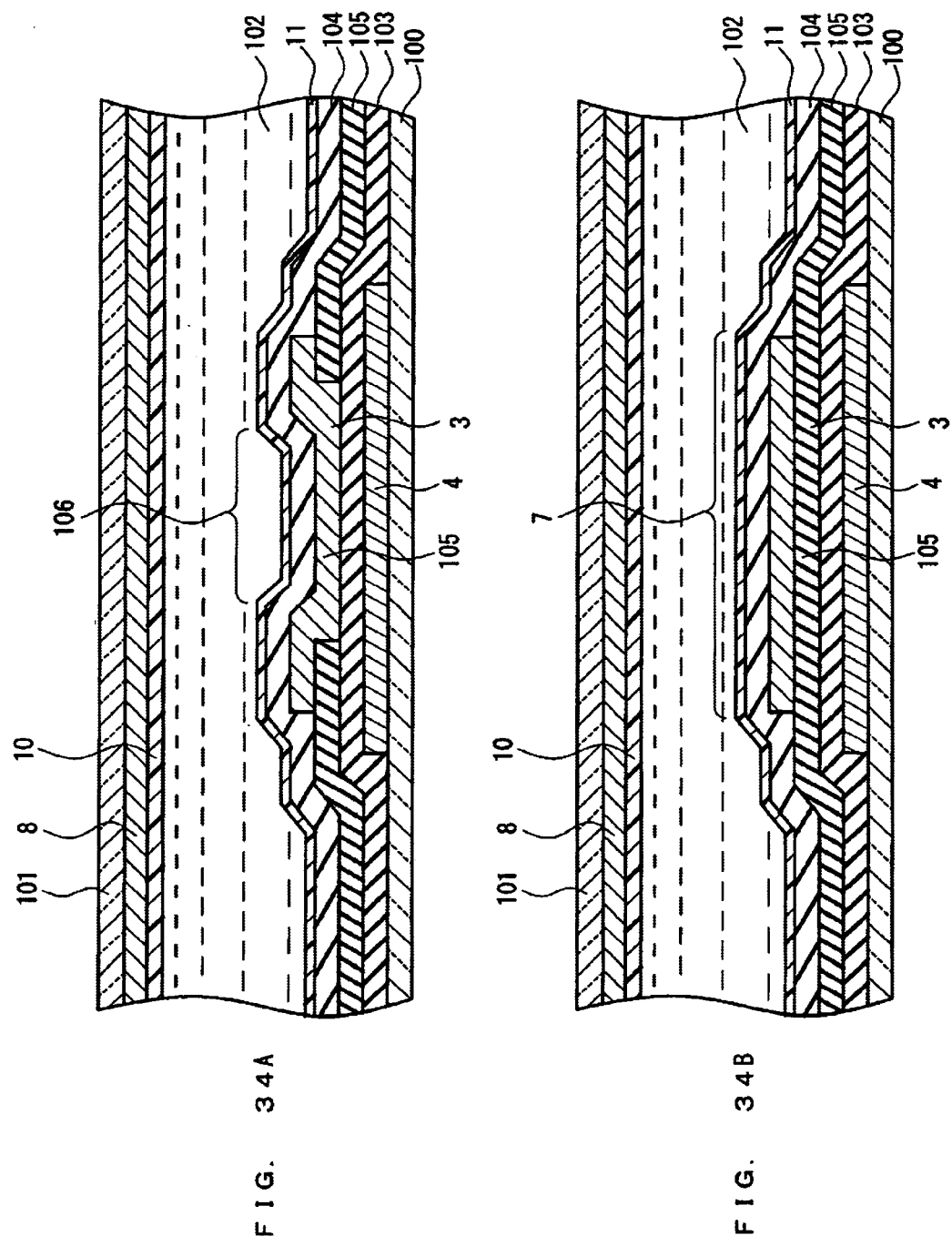
FIG. 34A is a cross-sectional view taken on line X—X of FIG. 33A.
FIG. 34B is a cross-sectional view taken on line XI—XI of FIG. 34B.

FIGS. 33A–33B are plan views showing the configuration of a liquid crystal display device according a fifteenth embodiment of the present invention. FIGS. 34A–34B are cross-sectional views of the same.

In the Twentieth Embodiment, a protruding portion is provided in the interlayer insulating film between the electrodes comprising the capacitive accumulation portion 7 to change the storage capacity for each pixel. In the present embodiment, however, a concave portion is provided in an interlayer insulating film, and the storage capacity is changed by changing an area thereof.

According to the present embodiment, the storage capacity value can be changed without changing the shape of the pixel electrode 3 or the bus bar 40 of the common electrode for each pixel. Therefore, the external shape of the electrode can be formed to be the same as described in the Twentieth Embodiment, so that the aperture ratio can be maintained constant even if the storage capacity value is varied for each pixel. Furthermore, by forming the concave portion, the interlayer insulating film in the edge portion of the bus bar of the common electrode can be thicker, so that a short circuit that is likely to occur in edge portions of electrodes can be avoided.

Figure 35A:
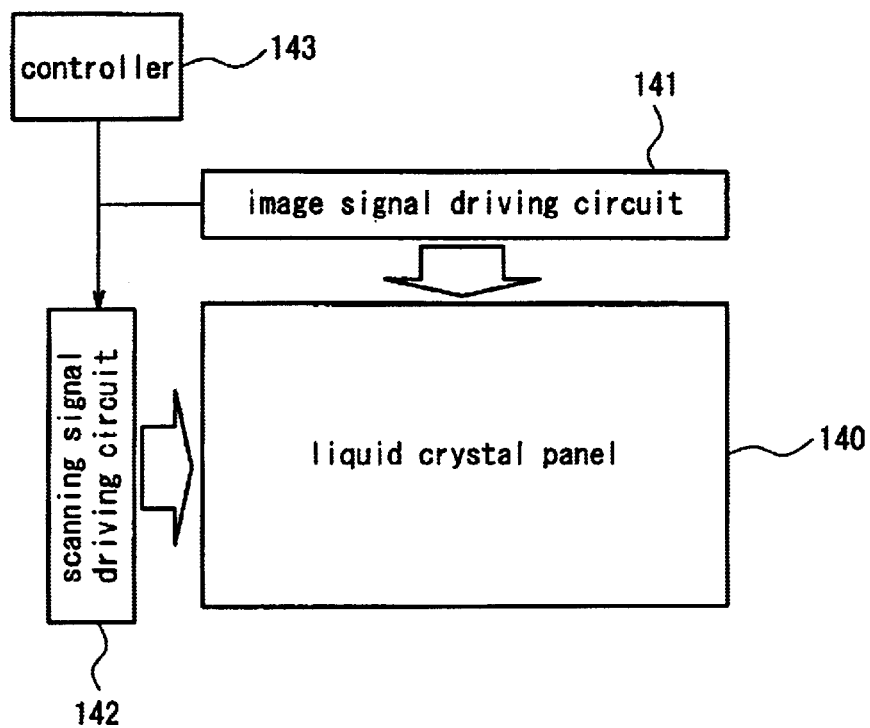
FIGS. 35A and 35B are block diagrams showing the configuration of a liquid crystal display device of the present invention.
Figure 35B:
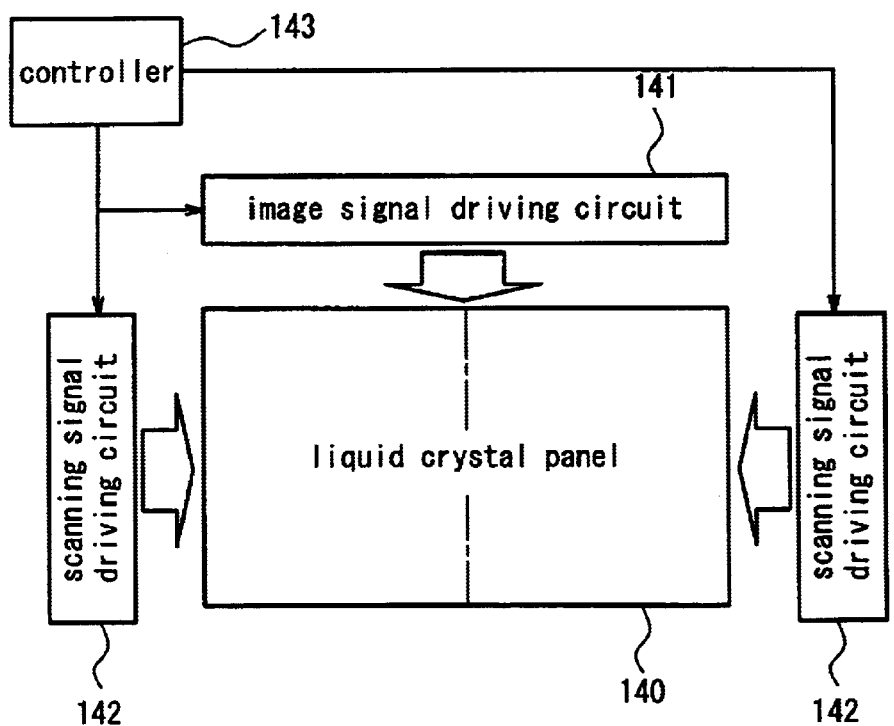
Figure 36:
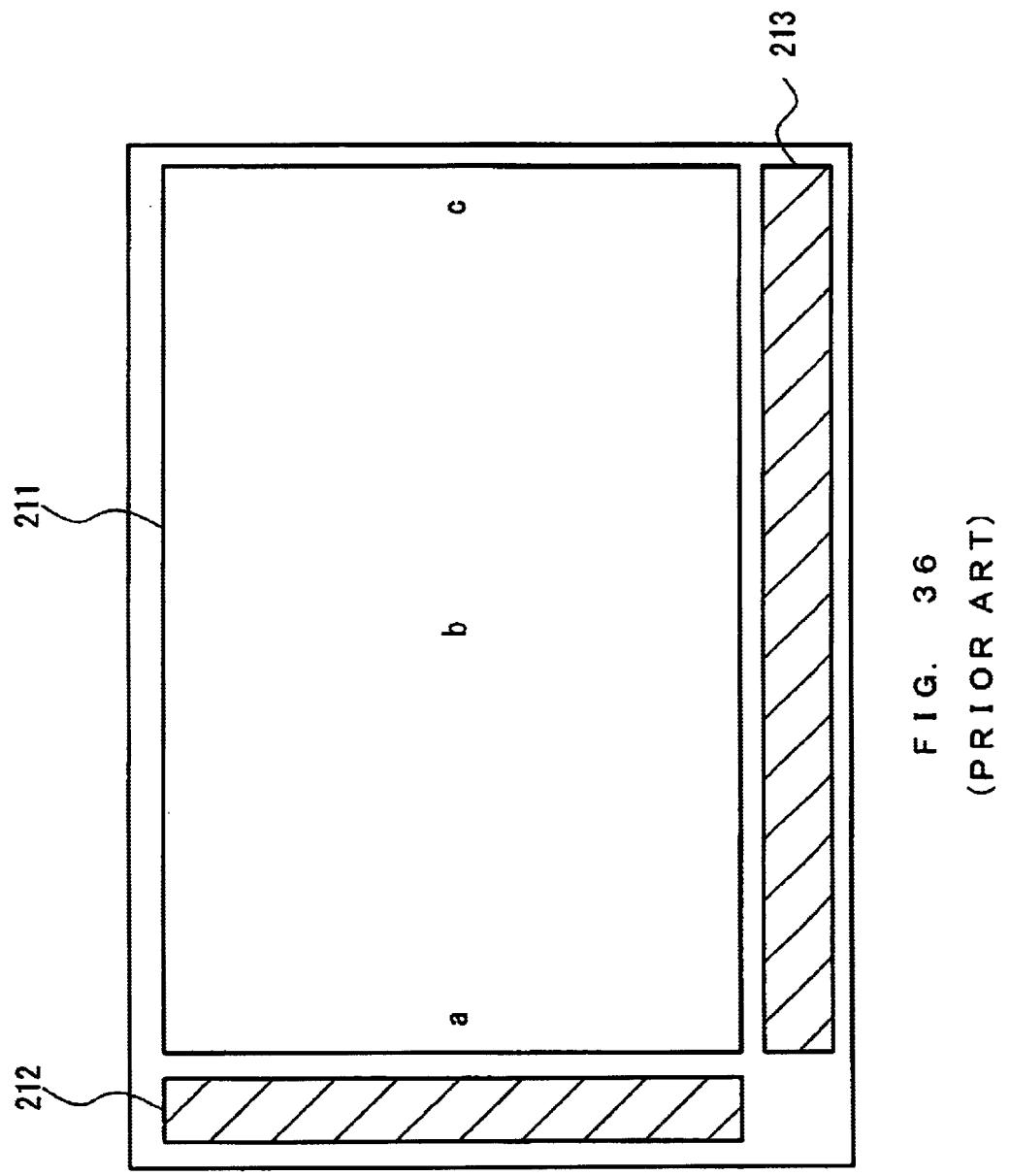
FIG. 36 is a plan view showing a conventional liquid crystal display device.
Figure 37A:
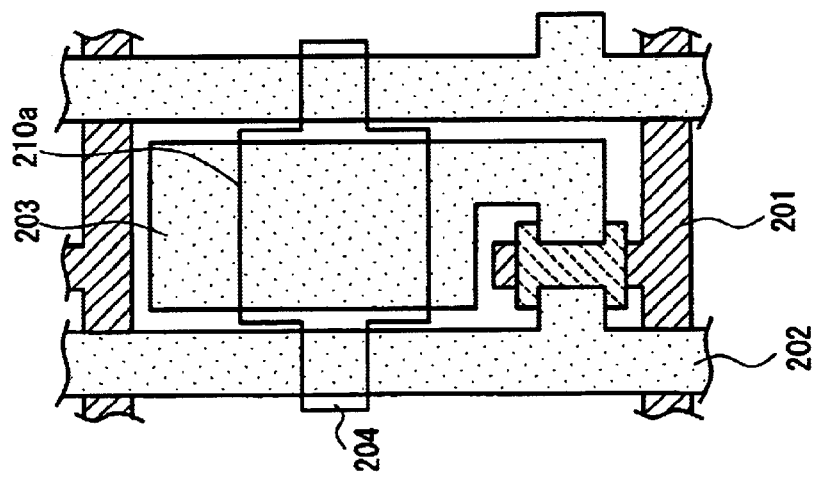
FIGS. 37A–37C are plan views showing the pixel structure of a conventional liquid crystal display device.
Figure 37B:
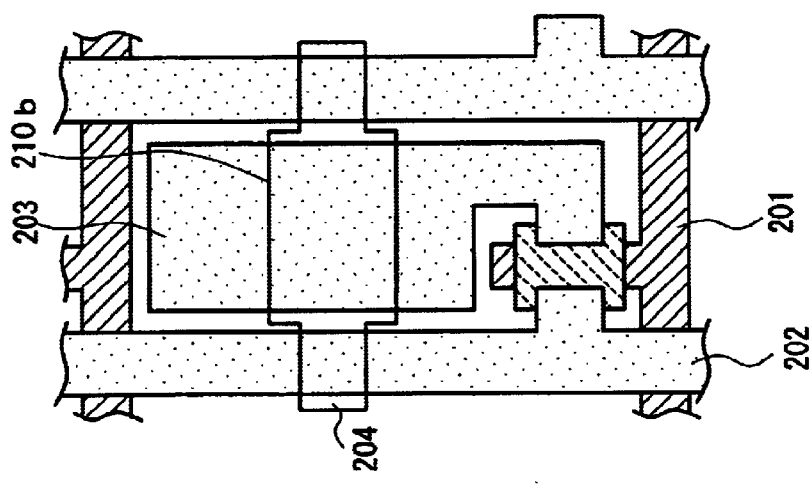
Figure 37C:
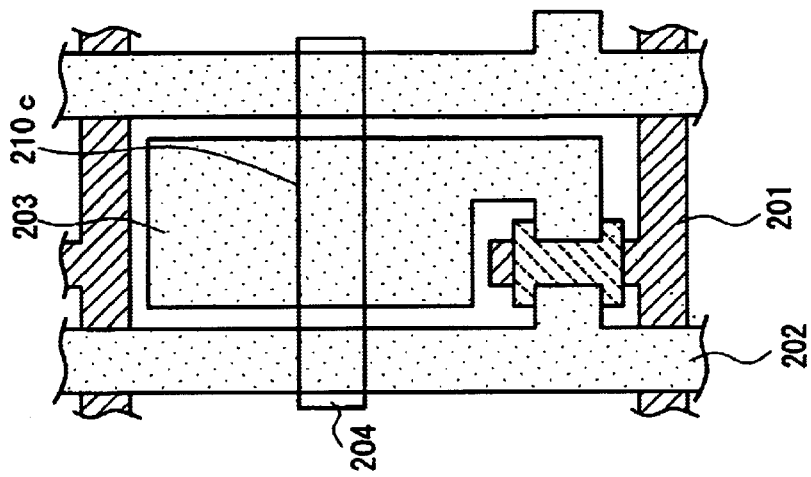
Figures 38A, 38B, 38C:
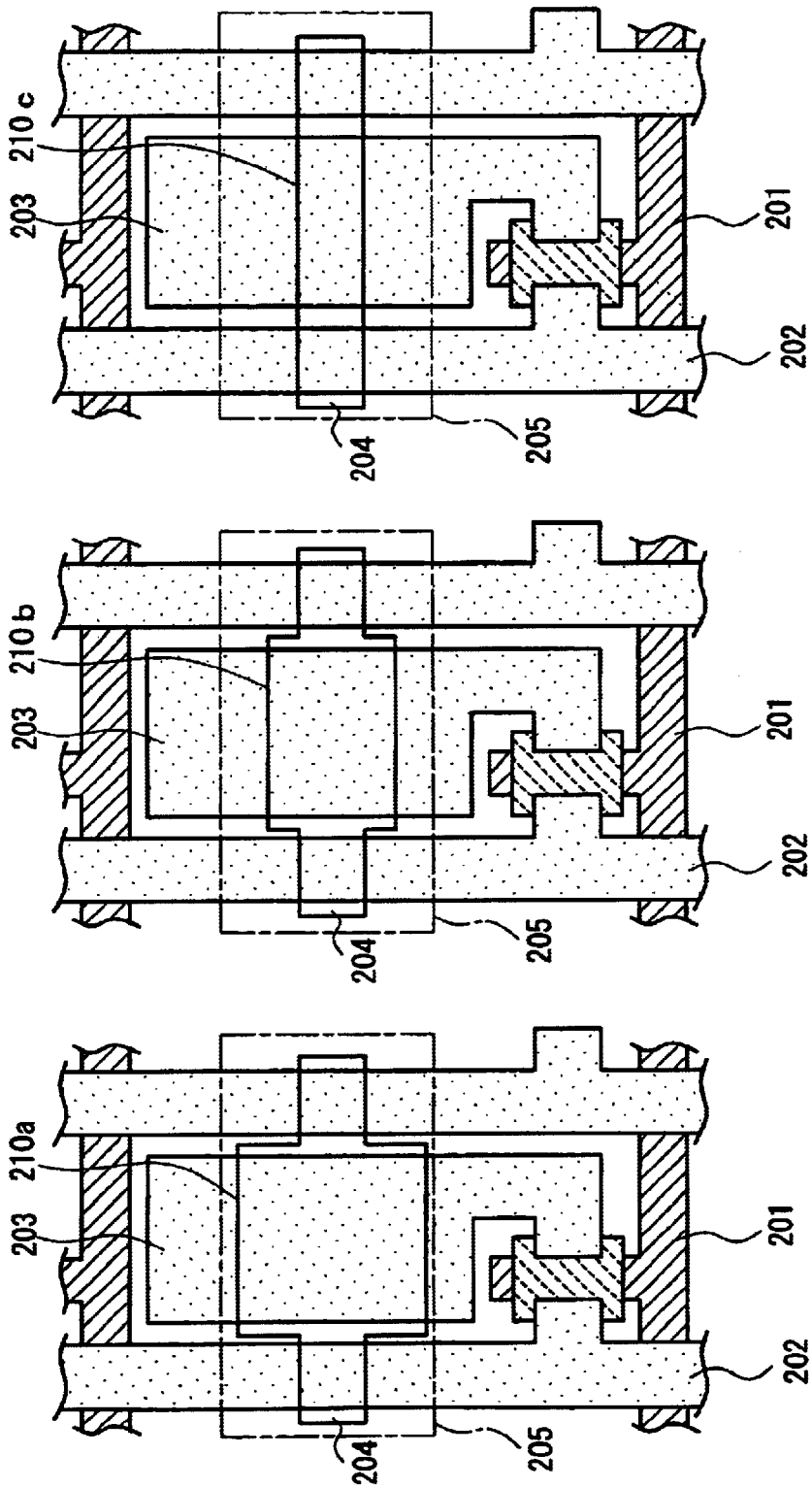
FIGS. 38A–38C are plan views showing a conventional liquid crystal display device.

As shown in FIGS. 35A–35B, a liquid crystal display device was constructed by mounting an image signal driving circuit 141 and a scanning signal driving circuit 142 on a liquid crystal panel 140 having an array configuration of the respective embodiments described above, and a controller 443 was used to control the device. FIG. 35A shows a single-sided feeding configuration in which the scanning signal driving circuit 142 is formed on one side of the liquid crystal panel 140, and FIG. 35B shows a double-sided feeding configuration in which the scanning signal driving circuit 142 is formed on both sides of the liquid crystal panel 140. For a large liquid crystal display device with a diagonal screen of 20 inches or larger and also for a high resolution liquid crystal display device with 1000 scanning lines or more, the double-sided feeding configuration of FIG. 35B is effective in reducing a time constant of scanning electrodes. When these liquid crystal display devices are driven, a display with more excellent evenness could be performed than that with the conventional device.

In these liquid crystal display devices, the storage capacity is changed by the position of the pixel, so that the storage capacity value may become larger than the usual value at the feeding end, thereby causing a charge shortage on the feeding side. In this case, instead of employing the usual driving method of driving scanning lines one by one, a combination with a driving method of selecting two scanning lines simultaneously and thus conducting a back-up charge could exhibit an excellent result.

In particular, in the case of operating a large liquid crystal display device with a diagonal screen of 20 inches or larger or a high resolution liquid crystal display device with 1000 scanning lines or more with the one-sided feeding configuration, a big change in the storage capacity needs to be taken into consideration, so that it is preferable to use the driving method of selecting two scanning lines simultaneously.

According to the configurations of the aforementioned embodiments, the storage capacity was reduced gradually from the feeding end toward the termination of the scanning electrode. However, it is not limited to these configurations, and as long as the liquid crystal display device has pixels with different storage capacity, the present invention also can be applied to other configurations and can exhibit the effect thereof sufficiently. For example, in order to compensate for the distortion of an image signal, the present invention can be applied to the configuration in which the storage capacity is reduced gradually from the feeding end toward the termination of the image signal. Moreover, the present invention can be applied even in the case of changing the storage capacity to compensate for the characteristic difference in driving circuits and for the difference in the external wiring resistance.

Furthermore, the display mode of the liquid crystal is not limited to the IPS method, and the present invention can be applied to any configuration as long as there is an area which is not covered with a pixel electrode in a part of the pixel area.

As described above, according to the liquid crystal display devices of the present invention, even if an area of the storage capacity differs for each pixel, the aperture ratio is maintained constant, and electric fields in the display portion are kept evenly. Therefore, deterioration and unevenness of display characteristics do not occur. Moreover, even in the case of forming a light shield film to improve contrast and so forth, a light shield film with a narrower width than that in a conventional configuration can be used, so that the aperture ratio does not drop drastically.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An active matrix liquid crystal display device comprising a capacitive accumulation portion formed by overlapping a pixel electrode, an insulating layer and a common electrode for each pixel area, and a non-electrode area in a part of the pixel area which is not covered with a pixel electrode, wherein a peripheral shape of said capacitive accumulation portion on a side contacting said non-electrode area is substantially the same between respective pixels, and a value of a storage capacity in said capacitive accumulation portion of one pixel at a signal feeding side is larger than that of an adjacent pixel at a termination side, wherein the value of the storage capacity in said capacitive accumulation portion of the one pixel is different from that of the adjacent pixel by varying an aperture in the common electrode of the adjacent pixel with respect to the aperture of the one pixel.

2. The liquid crystal display device according to claim 1, wherein the value of the storage capacity in said capacitive accumulation portion is in a range from 10 to less than 100 for the adjacent pixel on the termination side when the value of the one pixel on the feeding side is set to be 100.

3. The liquid crystal display device according to claim 1, wherein said display device is at least one liquid crystal display device selected from a lateral electric field type active matrix liquid crystal display device and a twisted nematic (TN) type active matrix liquid crystal display device.

* * * * *